(12) United States Patent
Shinohara et al.

(10) Patent No.: US 8,625,050 B2
(45) Date of Patent: Jan. 7, 2014

(54) SURFACE LIGHT SOURCE APPARATUS

(71) Applicant: OMRON Corporation, Kyoto (JP)

(72) Inventors: Masayuki Shinohara, Nagaokakyo (JP); Yasuhiro Tanoue, Otsu (JP); Kazuhide Hirota, Moriyama (JP); Koichi Takemura, Konan (JP); Takuma Iwase, Ritto (JP); Takako Ishikawa, Kusatsu (JP); Yoshihiro Ueno, Kusatsu (JP); Morihisa Ota, Kusatsu (JP); Jun Kishimoto, Ogaki (JP); Gouo Kurata, Kusatsu (JP); Yukihiro Takahashi, Nagaokakyo (JP); Hiroyuki Miyamoto, Yasu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 13/679,570

(22) Filed: Nov. 16, 2012

(65) Prior Publication Data
US 2013/0141669 A1  Jun. 6, 2013

Related U.S. Application Data

(63) Continuation of application No. 12/663,731, filed as application No. PCT/JP2008/060610 on Jun. 10, 2008, now Pat. No. 8,345,184.

(30) Foreign Application Priority Data

Jun. 12, 2007 (JP) .................................. 2007-155797

(51) Int. Cl.
*G02F 1/1335* (2006.01)
*F21V 7/04* (2006.01)

(52) U.S. Cl.
USPC ............................................ 349/62; 362/606

(58) Field of Classification Search
USPC ......... 349/61–66; 359/599, 831; 362/31, 611, 362/612, 617–628, 606–609
See application file for complete search history.

(56) References Cited

U.S. PATENT DOCUMENTS

| | | | | |
|---|---|---|---|---|
| 6,533,428 | B1* | 3/2003 | Nishida et al. | 362/631 |
| 7,484,873 | B2* | 2/2009 | Dejima et al. | 362/606 |
| 8,033,710 | B2* | 10/2011 | Omori et al. | 362/628 |
| 8,089,578 | B2* | 1/2012 | Kurata et al. | 349/61 |
| 8,167,474 | B2* | 5/2012 | Tanoue et al. | 362/607 |
| 2011/0292318 | A1* | 12/2011 | Nakamoto et al. | 349/62 |
| 2011/0304784 | A1* | 12/2011 | Hirota et al. | 349/15 |

* cited by examiner

*Primary Examiner* — Akm Enayet Ullah
(74) *Attorney, Agent, or Firm* — Osha Liang LLP

(57) ABSTRACT

A light guide plate has a light incident surface configured to be arranged facing a point light source for introducing light from the point light source, a light outputting surface that outputs the light to an outside of the light guide plate, a light introducing section for confining the light from the point light source entered from the light incident surface, and a light guide plate main body having a thickness smaller than a maximum thickness of the light introducing section and being arranged to be continuous with the light introducing section, for outputting the confined light to the outside of the light guide plate from the light outputting surface by a light outputting element.

15 Claims, 90 Drawing Sheets

Fig. 4

| | Acrylic resin | PC resin |
|---|---|---|
| Index of refraction n | 1.49 | 1.59 |
| Height T of tapered portion (mm) | 4.10 | 4.10 |
| Maximum incident angle α (°) | 42.16 | 38.97 |
| Inclination angle θ of tapered portion (°) | 2.84 | 6.03 |
| Length X in horizontal direction of inclined surface (mm) | 7.10 | 6.11 |
| High and low difference Y of inclined surface (mm) | 0.35 | 0.65 |
| Thickness t of light guide plate main body (mm) | 3.75 | 3.45 |

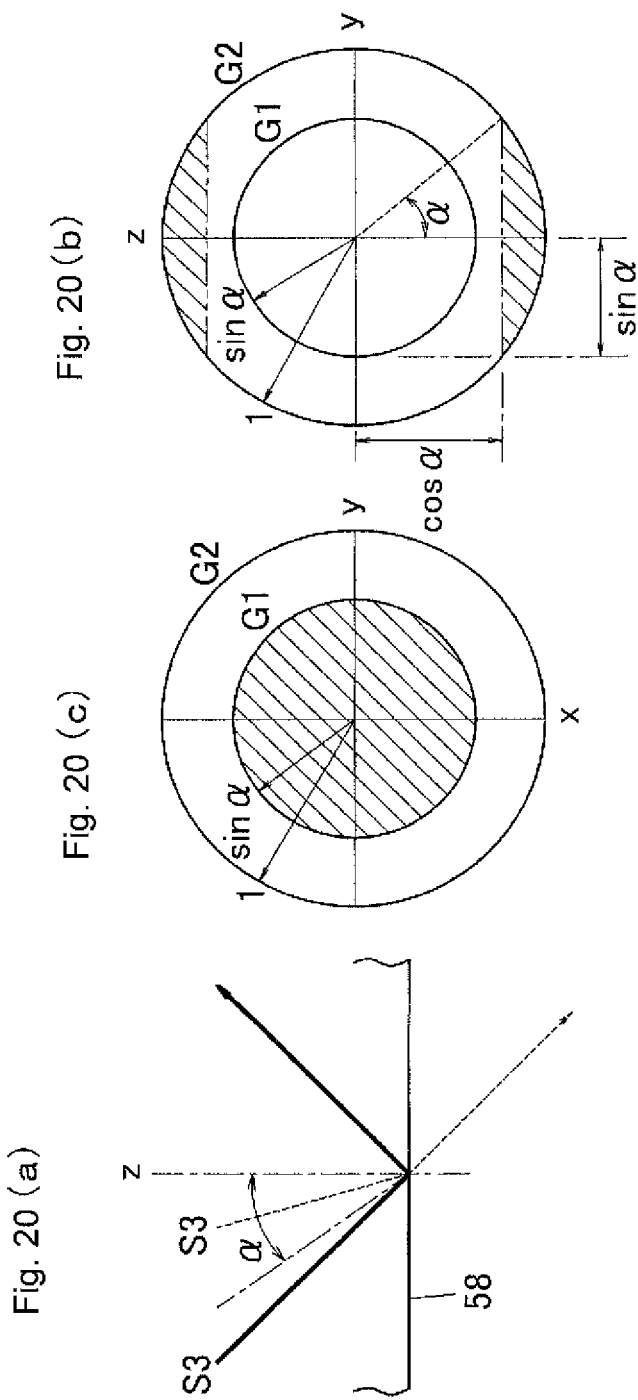

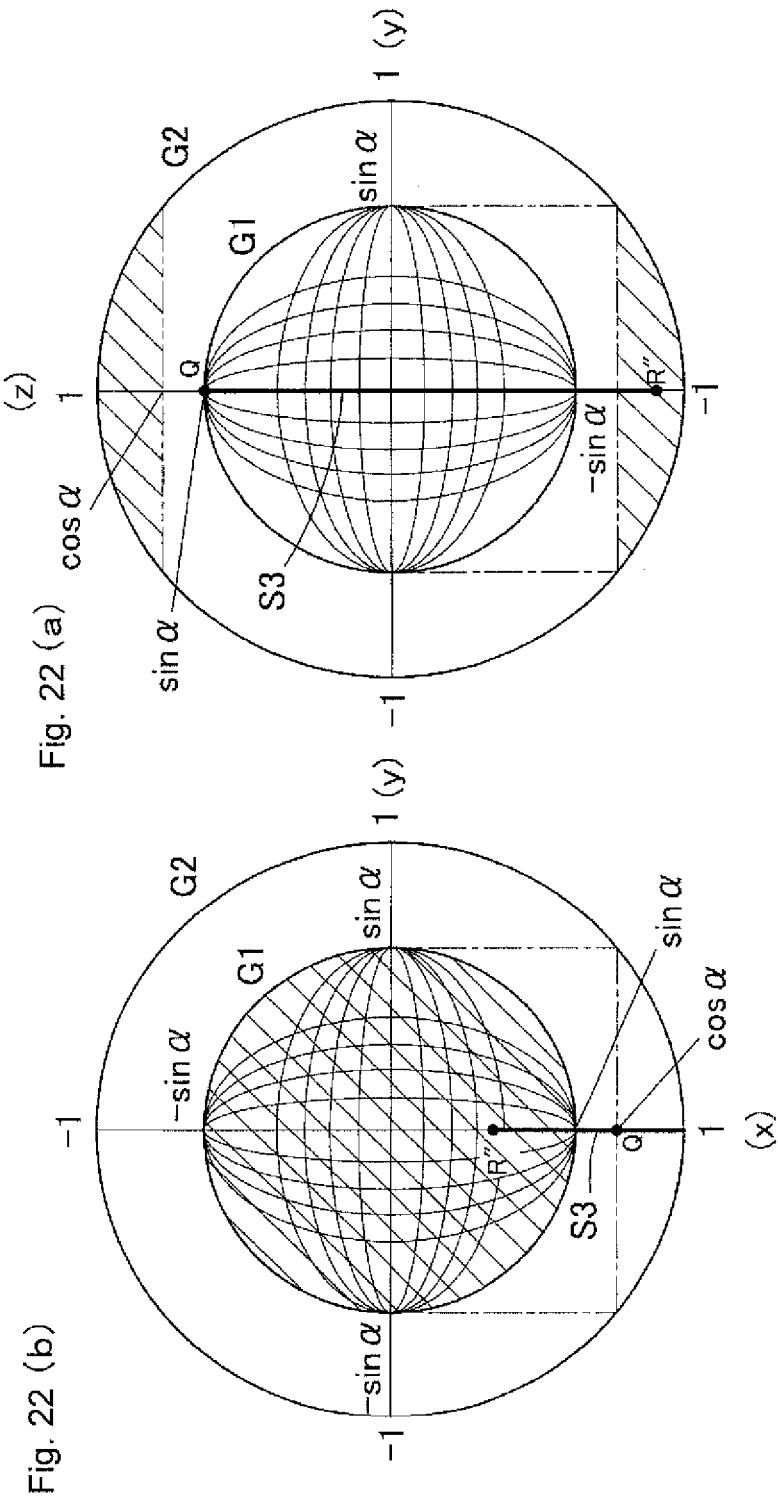

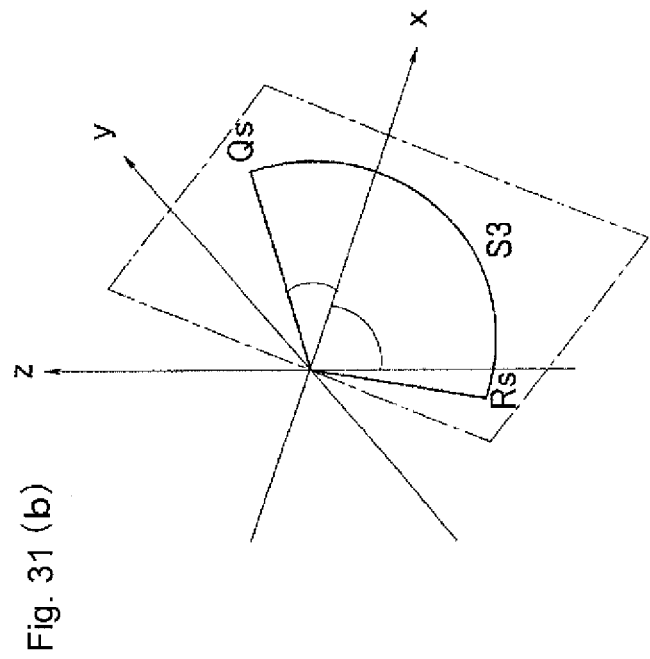
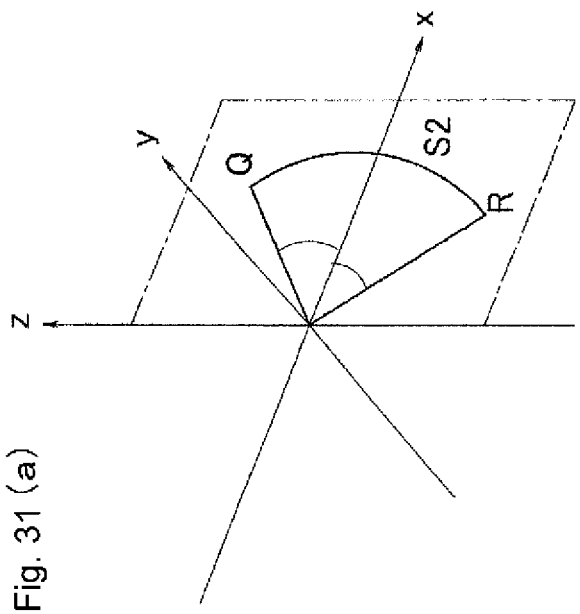

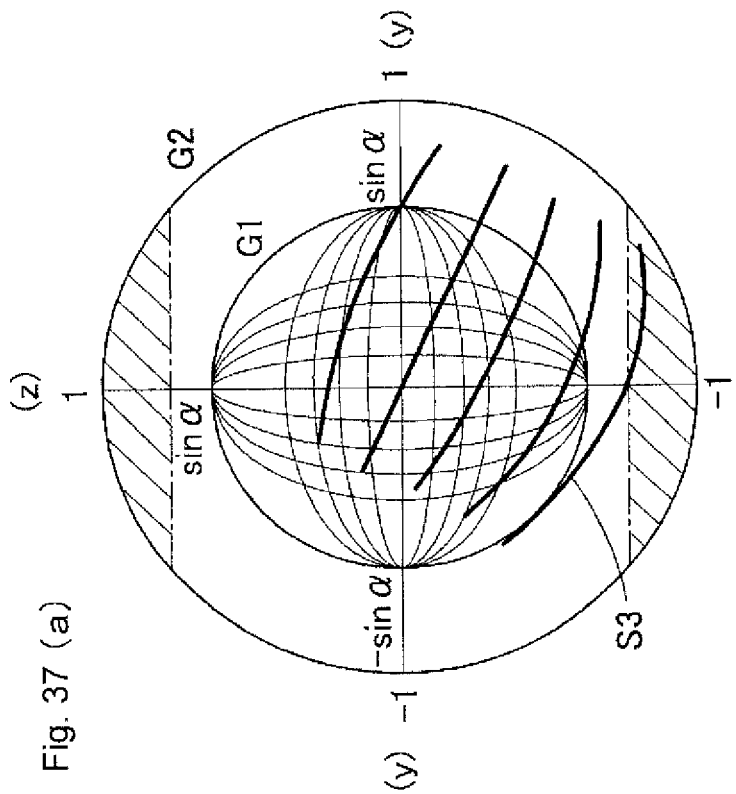
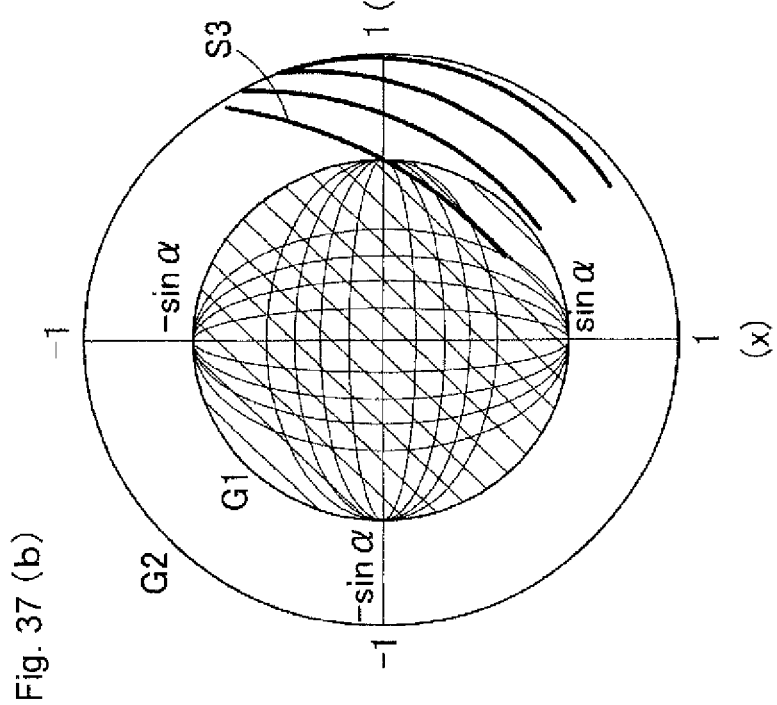
Fig. 37 (a)
Fig. 37 (b)

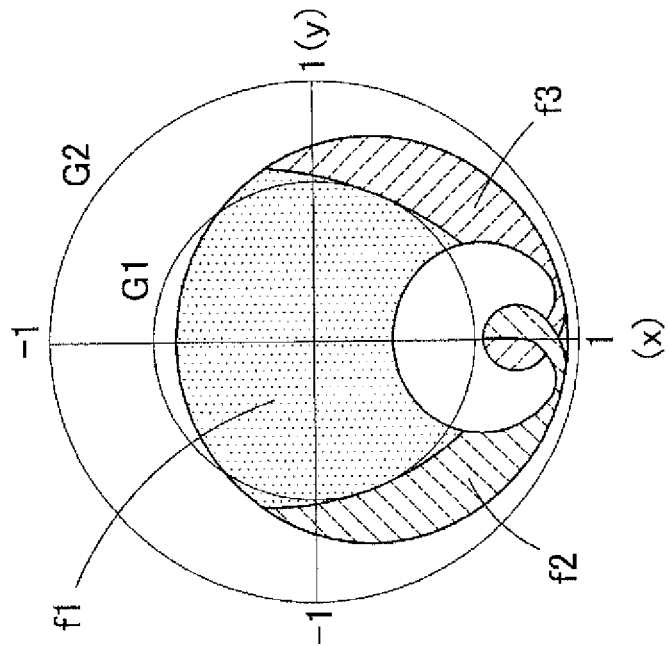
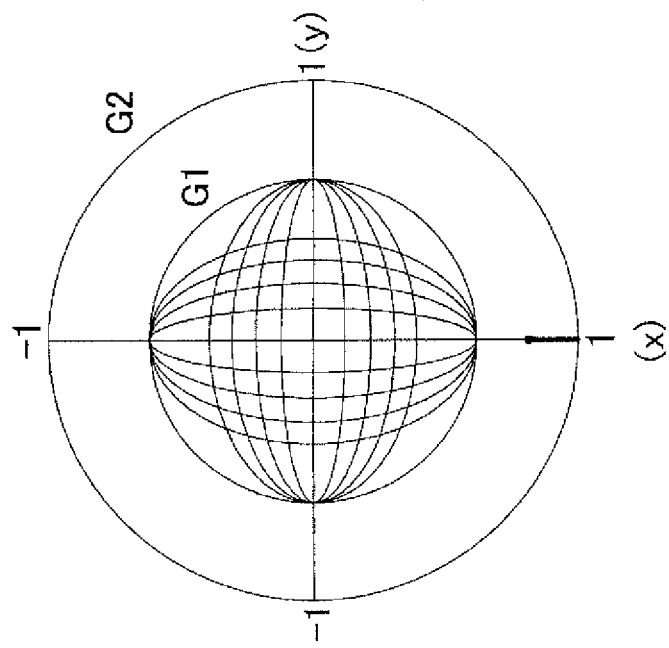

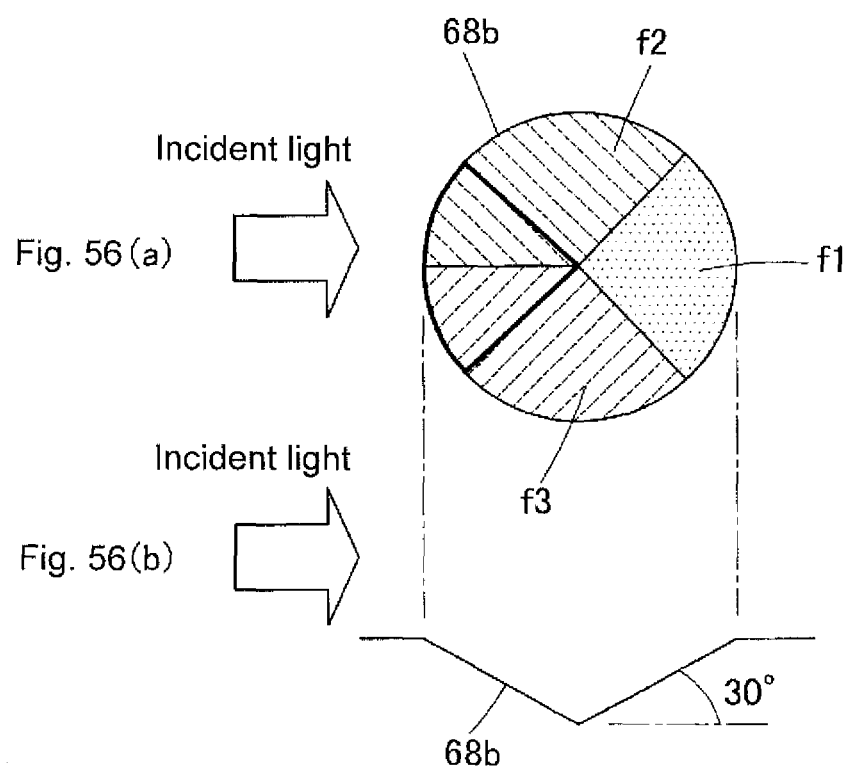

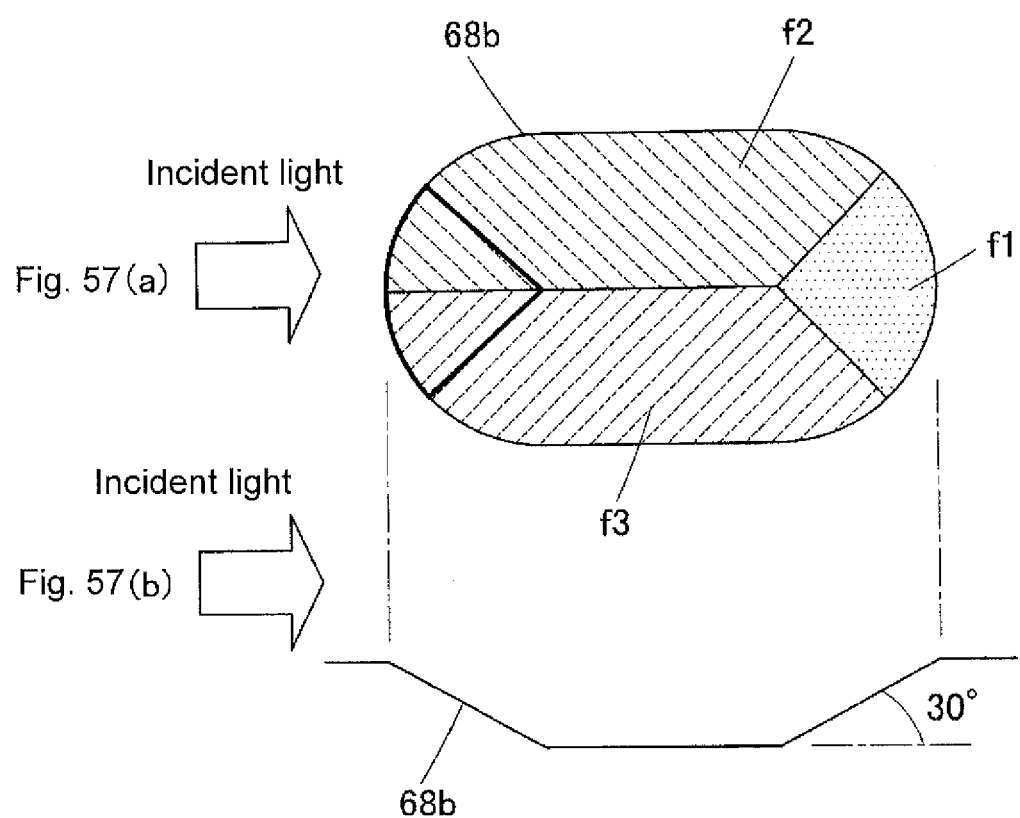

$\theta * = 5°$ $\theta * = 3°$ $\theta * = 3.75°$ $\theta * = 3°$

Pattern scanned in direction orthogonal to light source direction

Pattern scanned in light source direction

US 8,625,050 B2

SURFACE LIGHT SOURCE APPARATUS

TECHNICAL FIELD

The present invention relates to a surface light source apparatus and a liquid crystal display device, and in particular, to a structure of a surface light source apparatus for efficiently entering light to a light guide plate having a thickness smaller than a thickness of a light source.

BACKGROUND ART

FIG. 1 shows a schematic view of a conventional liquid crystal display device using an edge light surface light source apparatus. A liquid crystal display device 11 is configured by a surface light source apparatus 12 and a liquid crystal panel 15.

The surface light source apparatus 12 has a point light source 18 using an LED arranged facing an end face (light incident surface) of a light guide plate 17 molded by a transparent resin, a diffusion plate 13 and two prism sheets 14 stacked on an upper surface (light outputting surface) of the light guide plate 17, and a reflection plate 16 arranged facing a lower surface of the light guide plate 17. The point light source 18 is mounted on a substrate 20. The liquid crystal panel 15 is arranged on the prism sheet 14 through a rim sheet 19 (black frame).

Light emitted from the point light source 18 enters into the light guide plate 17 from the end face of the light guide plate 17, propagates and expands in the light guide plate 17, and exits from substantially the entire upper surface of the light guide plate 17. The light outputted from the upper surface of the light guide plate 17 is transmitted through the diffusion plate 13 and the prism sheet 14 to illuminate the liquid crystal panel 15 from a back surface side. The light leaked from the lower surface of the light guide plate 17 is reflected by the reflection plate 16 to again return into the light guide plate 17, so that the light is reused.

Such a surface light source apparatus 12 is desired to have an even luminance, high luminance, inexpensive cost, large light outputting area (small area other than light outputting surface), and small thickness. In particular, in a case of being incorporated to a portable device, a demand for a thinner area light source apparatus 12 is increasing more and more with thinning of the portable device.

The size of each part of a general surface light source apparatus is as follows.

Sum of thicknesses of substrate and point light source 600 μm
Height of light outputting window of point light source 300 μm
  Thickness of prism sheet 62 μm (per one sheet)
  Thickness of diffusion plate 55 μm
  Thickness of light guide plate 300 to 650 μm
  Thickness of reflection plate 60 μm
  Thickness of rim sheet 55 μm The thickness of the surface light source apparatus is about 600 μm on the point light source side, and is between 539 μm and 889 μm on the light guide plate side even when the thickness of the rim sheet is excluded. Therefore, the thickness on the light guide plate side occupying the majority of the area of the surface light source apparatus is desirably reduced.

The light guide plate occupies the majority of the thickness of the surface light source apparatus (hereinafter, when referring simply to thickness of surface light source apparatus, this refers to the thickness on the light guide plate side of the surface light source apparatus). However, if the thickness of the light guide plate is made smaller than the height of the light outputting window of the point light source, the light that does not enter the light guide plate of the light emitted from the point light source increases and the light usage efficiency of the surface light source apparatus lowers. Thus, the thickness of the light guide plate is subjected to restriction by the height of the light outputting window of the point light source, and it is difficult to have the thickness of the surface light source apparatus smaller than the height of the light outputting window of the point light source. Similarly, if the light source is a cold cathode tube, it is difficult to have the thickness of the light guide plate smaller than the diameter of the cold cathode tube.

(Regarding Patent Document 1)

FIG. 2 is a side view of a liquid crystal display device 21 disclosed in Japanese Unexamined Patent Publication No. 5-53111 (Patent Document 1). In a surface light source apparatus 22 used in the liquid crystal display device 21, a tapered portion 25 is provided at the portion of small thickness of the light guide plate, that is, the end of the light guide plate main body 24 to efficiently enter light from a fluorescent tube 23 to the light guide plate having a thickness smaller than the fluorescent tube 23. The end face of the tapered portion 25 has a height substantially equal to the diameter of the fluorescent tube 23, and the fluorescent tube 23 faces the relevant end face. The light entered from the end face of the tapered portion 25 is introduced into the light guide plate main body 24 by being totally reflected at the front and back surfaces of the tapered portion 25, and outputted from the upper surface of the light guide plate main body 24 toward a liquid crystal panel 26.

The surface light source apparatus 22 disclosed in Patent Document 1 aims to introduce the light of the fluorescent tube 23 to the light guide plate without leakage. To this end, the height of the end face of the tapered portion 25 is made substantially equal to the diameter of the fluorescent tube 23, and the light of the fluorescent tube 23 is introduced to the tapered portion 25 without leakage. However, in the surface light source apparatus 22, the leakage of light at the tapered portion 25 cannot be prevented. Thus, the light leaked from the tapered portion 25 appears shining from an observer side, and hence the edge of the display unit (screen) of the liquid crystal display device 21 emits light at high luminance, and the quality of the display unit degrades.

A reason that the leakage of light from the tapered portion 25 cannot be prevented in the structure of the surface light source apparatus 22, for example, will be described with reference to FIG. 3. Assume that the light tends to leak out the most at the tapered portion 25. If the leakage of such light that tends to leak out the most is prevented, the leakage of light at the tapered portion 25 can be eliminated in the surface light source apparatus 22. The light that tends to leak out the most is a light ray L having a largest incident angle α of the light emitted from the fluorescent tube 23 and entered the tapered portion 25, and thus a structure in which the light ray L with the maximum incident angle α measured from a direction perpendicular to the end face of the tapered portion 25 does not leak out at the tapered portion 25 and the thickness of the light guide plat main body 24 is reduced as much as possible is considered. To obtain such a structure, a condition for totally reflecting the light ray L having the maximum incident angle α at the upper end (point A) of an inclined surface of the tapered portion 25, again totally reflecting at point B at the lower surface of the light guide plate, and reflecting at the upper surface (point C) adjacent to the tapered portion 25 of the light guide plate main body 24 is to be considered. In FIG.

3, a flat plate-shaped short portion is shown at the end face portion of the tapered portion 25, but this is shown for the sake of illustration, and the length can be assumed as infinitely short.

First, the maximum incident angle α of the light ray that entered the light guide plate is determined by, $$\sin \alpha = 1/n \qquad \text{(equation 1)}$$

(where n is index of refraction of light guide plate).

The incident angle at which the light ray L having the maximum incident angle α enters point A having an inclination angle θ is 90°−θ−α, and thus a condition that the light ray totally reflects at the inclined surface is, $$\theta \leq 90° - 2\alpha \qquad \text{(equation 2)}.$$

The incident angle at which the light totally reflected at point A enters the lower surface of the tapered portion 25 is 90°−2θ−α, and thus a condition that the light ray totally reflects at point B of the lower surface is, $$\theta \leq 45° - \alpha \qquad \text{(equation 3)}.$$

If the equation 3 is satisfied, the light totally reflected at point B will also be totally reflected at point C of the light guide plate main body 24.

Therefore, according to the equations 2 and 3, θ≤45°−α is to be satisfied in order for the light ray to be totally reflected at point A, point B, and point C.

$$\theta \leq 45° - \alpha \qquad \text{(equation 4)}.$$

However, if the inclination angle θ of the tapered portion 25 is small, the light totally reflected at the lower surface of the light guide plate after being totally reflected at the upper end of the inclined surface of the tapered portion 25 may again enter the inclined surface of the tapered portion 25 and leak out from the tapered portion 25, and furthermore, the length of the tapered portion 25 becomes long if the inclination angle θ is small, and hence the inclination angle θ is desirably large as possible within a range satisfying the equation 4. Therefore, the inclination angle θ is a value large as possible at a limit satisfying the equation 4. In other words, $$\theta = 45° - \alpha \qquad \text{(equation 5)}.$$

Assuming a height of the end face of the tapered portion 25 is T, a length of the tapered portion 25 is X, and a high and low difference of the inclined surface of the tapered portion 25 is Y, the length X and the high and low difference Y of the tapered portion 25 are as follows from FIG. 3.

$$X = T\cot(\alpha + 2\theta) + (T - Y)\cot(\alpha + 2\theta)$$
$$= (2T - Y)\cot(\alpha + 2\theta)$$
$$Y = X\tan\theta$$

Solving such equations for X and Y, and using the equation 5, the following equation 6 and equation 7 are obtained.

$$X = \frac{2a(1+a) \times T}{1 + 2a - a^2} \qquad \text{(equation 6)}$$

$$Y = \frac{2a(1-a) \times T}{1 + 2a - a^2} \qquad \text{(equation 7)}$$

where, $a = \tan \alpha = \tan(45° - \theta)$.

The thickness t of the light guide plate mainbody 24 is expressed with the following equation 8.

$$t = T - Y = \frac{(1 + a^2) \times T}{1 + 2a - a^2} \qquad \text{(equation 8)}$$

Considering acrylic resin or polycarbonate resin (PC resin), which are representative light guide plate materials, for the light guide plate material, and calculating with the index of refraction of the light guide plate as,
n=1.49 (in the case of acrylic resin)
n=1.59 (in the case of polycarbonate resin),
the maximum incident angle α is, from the equation 1,
α=42.16° (in the case of acrylic resin)
α=38.97° (in the case of polycarbonate resin).
The inclination angle α of the tapered portion 25 is, from the equation 3,
θ=2.84° (in the case of acrylic resin)
θ=6.03° (in the case of polycarbonate resin).

In Patent Document 1, the height of the end face of the tapered portion 25 is described as T=4.10 mm, and thus the length X and the high and low difference Y of the tapered portion 25, and the thickness t of the light guide plate main body 24 can be obtained as below from the equations 6 to 8 using the value of the height T and the value of α. If the light guide plate material is acrylic resin, T=4.10 mm and α=42.16° (a=tan α=0.91), and thus
X=7.10 mm
Y=0.35 mm
t=3.75 mm,
Similarly, if the light guide plate material is polycarbonate resin, T=4.10 mm and α=38.97° (a=tan α=0.81), and thus
X=6.11 mm
Y=0.65 mm
t=3.45 mm.

FIG. 4 summarizes the above calculation results.

According to FIG. 4, the thickness t of the light guide plate main body 24 is 3.75 mm (in the case of acrylic resin) or 3.45 mm (in the case of polycarbonate resin). In the liquid crystal display device 21 disclosed in Patent Document 1, on the contrary, the thickness of the light guide plate main body 24 is described as t=2.2 mm with respect to the height of the end face of the tapered portion 25 of T=4.10 mm. The value t=2.2 mm is significantly smaller than the value (in FIG. 4) of the thickness t obtained through the above calculation, and thus the light will always leak out from the tapered portion 25.

Therefore, in the surface light source apparatus 22 disclosed in Patent Document 1, the leakage of light from the tapered portion 25 cannot be prevented. Alternatively, in the surface light source apparatus 22 disclosed in Patent Document 1, the leakage of light at least from the tapered portion 25 is not taken into consideration at all.

(Regarding Patent Document 2)

FIG. 5 is a perspective view showing a surface light source apparatus disclosed in FIG. 1 of Japanese Unexamined Patent Publication No. 2004-69751 (Patent Document 2). The surface light source apparatus 31 has a conical light introducing section 33 arranged at the end of a light guiding sheet 32, and a point light source 35 arranged facing the end face (light receiving section 34) of the light guiding section 33. In the surface light source apparatus 31 as well, the point light source 35 and the light receiving section 34 of the light introducing section 33 have a height of the same extent, so that the light of the point light source 35 is entered from the light guiding section 33 and introduced to the light guiding sheet 32.

The surface light source apparatus 31 disclosed in Patent Document 2 aims to introduce the light of the point light source 35 to the light guiding sheet 32 without leakage. Thus, the height of the light receiving section 34 is made substantially equal to the height of the point light source 35, and the light of the point light source 35 is introduced to the light guiding sheet 32 by the tapering of the light introducing section 33. However, in this surface light source apparatus 31 as well, the leakage of light at the conical light introducing section 33 cannot be prevented. Thus, the light leaked from the light introducing section 33 appears shining from the observer side, and hence the edge of the display unit (screen) of the liquid crystal display device emits light at high luminance, and the quality of the display unit degrades.

FIG. 6 is a view showing the cross-section of the light introducing section 33 and the light receiving section 34 taken along a perpendicular plane passing through an axis center of the light introducing section 33. The reason the leakage of the light from the light introducing section 33 cannot be prevented in the surface light source apparatus 31 of Patent Document 2 (FIG. 1) will now be described with reference to FIG. 6. Since the acrylic resin is used for the light guide plate material in the surface light source apparatus 31 of the Patent Document 2, the maximum incident angle α of the light ray L entered to the light guiding section 33 is α=42.16° from FIG. 4, and thus the inclination angle θ of the surface of the light introducing section 33 in this case is θ=2.84°. However, the height of the light receiving section 34 is 3 mm and the thickness of the light guiding sheet 32 is 1 mm in the surface light source apparatus 31 of Patent Document 2, and thus the length of the light introducing section 33 is X=20.16 mm if the inclination angle of the light introducing section 33 is θ=2.84°. Therefore, as shown in FIG. 6, the light totally reflected at the upper end of one inclined surface of the light introducing section 33 enters the other inclined surface at an incident angle of $$90°-(α+3θ)=39.32°.$$

This incident angle 39.82° is an angle smaller than the critical angle (42.16°) of total reflection, and thus the light ray L that entered the other inclined surface leaks to the outside, as shown in FIG. 6.

Therefore, in the surface light source apparatus 31 disclosed in Patent Document 2, light of a certain extent can be confined but light of about a few dozen percent leaks out from the light introducing section 33, whereby the leaked light shines at the display surface and the quality of the liquid crystal display device degrades. In Patent Document 2, consideration is not made in preventing such leakage of light.

FIG. 3 of Patent Document 2 discloses a light guide plate in which the end face (light receiving section 34) of the light introducing section 33 is circular and the light introducing section 33 flatly expands and becomes thinner toward the side opposite to the light receiving section 34. This is shown in FIG. 7. In such a surface light source apparatus as well, the surface on the upper surface side of the light introducing section 33 and the surface on the lower surface side face each other substantially in parallel in view of the cross-section taken along K-K of FIG. 8, as apparent when seen from the light receiving section 34 side as in FIG. 8. Therefore, the light leaks out from the light introducing section 33 same as in the case of FIG. 1 of Patent Document 2 even in the light guide plate of such a mode.

(Regarding Patent Document 3)

FIG. 9 is a cross-sectional view of a surface light source apparatus disclosed in Japanese Unexamined Patent Publication No. 2005-285389 (Patent Document 3). A surface light source apparatus 41 has a light entering section 44 of step-form that gradually becomes thinner from the light incident surface side arranged at the end of the light guide plate main body 43 to efficiently enter the light to the light guide plate main body 43 having a thickness smaller than the light source 42. A light reflection plate 45 is arranged at the surface of the light entering section 44.

In the surface light source apparatus 41 of such a structure, the light ray leaked from the light entering section 44 is reflected by the light reflection plate 45 to re-enter the light entering section 44, and introduced to the light guide plate main body 43 by repeating reflecting at the interface of the light entering section 44 and the light reflection plate 45, as with a light ray L1 shown in FIG. 10.

However, in such a structure, some of the light is absorbed by the light reflection plate 45 and the usage efficiency of the light lowers as with a light ray L2 shown in FIG. 10. Furthermore, when fixing the light reflection plate 45 to the light entering section 44 with an adhesive, a considerable amount of light is absorbed and lost by the adhesive. Furthermore, since the light entering section 44 has a step-form, the reflected light ray leaks out from the light incident surface as with the light ray L1 of FIG. 10. Therefore, the usage efficiency of the light is not satisfactory in such structure compared to the surface light source apparatus that confines the light by total reflection.

In such a surface light source apparatus, the thickness of the light entering section 44 may increase by the thickness of the light reflection plate 45 since the light reflection plate 45 is arranged on the light entering section 44. Furthermore, the assembly cost in attaching the light reflection plate 45 to each surface of the light entering section 44 is also required, which leads to an increase in cost of the surface light source apparatus.

Patent Document 1: Japanese Unexamined Patent Publication No. 5-53111
Patent Document 2: Japanese Unexamined Patent Publication No. 2004-69751
Patent Document 3: Japanese Unexamined Patent Publication No. 2005-285389

DISCLOSURE OF THE INVENTION

Problems to be Solved by the Invention

In view of the above technical problems, it is an object of the present invention to provide a surface light source apparatus in which a thickness of an end face of a light introducing section is substantially equal to a height of a light outputting window of a point light source so that light can be introduced to the light guide plate that is thin compared to the height of the light outputting window of the point light source, where a leakage of the light from the light introducing section can be further reduced.

To achieve the above object, a surface light source apparatus according to the present invention is a surface light source apparatus including a point light source, and a light guide plate for introducing light of the point light source from a light incident surface and outputting to an outside from a light outputting surface; wherein the point light source is arranged at a position facing the light incident surface of the light guide plate; the light guide plate includes a light introducing section for confining the light from the point light source entered from the light incident surface, and a light guide plate main body, which has a thickness smaller than a maximum thickness of the light introducing section and being arranged to continue with the light introducing section, for outputting the confined light to the outside from the light outputting surface by a light outputting means; the light introducing section has an inclined surface, which is inclined toward an end of a surface of the light guide plate main body from a surface of a portion having a greater thickness than the light guide plate main body, on a surface on the light outputting side of the light guide plate or on an opposite surface thereof; and the light guide plate has a directivity converting pattern, for converting a directivity expansion in a thickness direction of the light guide plate of the light entered to the light introducing section to directivity characteristics tilted toward a direction parallel to a surface direction of the light guide plate, on the surface on the light outputting side or on the opposite surface thereof.

In the surface light source apparatus of the present invention, the light emitted from the point light source can be efficiently introduced into the light guide plate main body of small thickness since the light introducing section of large thickness is arranged at a position of entering the light from the point light source of the light guide plate. Furthermore, since the light introducing section includes the directivity converting pattern for converting the directivity expansion in the thickness direction of the light guide plate of the light entered to the light introducing section to the directivity characteristics tilted toward the direction parallel to the surface direction of the light guide plate, the light entered to the light introducing section can be introduced to the light guide plate main body of small thickness with a small leakage or preferably no leakage even if an inclination angle of the inclined surface is large. The thickness of the light guide plate thus can be reduced while suppressing a loss of light to a small extent.

According to one aspect of the surface light source apparatus according to the present invention, the light guide plate has the directivity converting pattern, which is configured by a plurality of planes radially extending with a vicinity of the point light source as a center when seen from a direction perpendicular to the light outputting surface of the light guide plate, on the surface on the light outputting side or on the opposite surface thereof. In this aspect, since the directivity converting pattern, which is configured by a plurality of planes radially extending with the point light source as the center when seen from the direction perpendicular to the light outputting surface of the light guide plate, is arranged on the light guide plate, the light entered to the light introducing section can be introduced to the light guide plate main body of small thickness with a small leakage or preferably no leakage even if the inclination angle of the inclined surface is large. The thickness of the light guide plate can be reduced while minimizing the loss of light.

According to another aspect of the surface light source apparatus according to the present invention, an average inclination angle of a cross-section of the directivity converting pattern cut along a plane, which includes a line radially extending with the point light source as a center and which is parallel to the thickness direction of the light guide plate, is smaller than an average inclination angle of a cross-section of the directivity converting pattern cut along a plane, which is orthogonal to the plane and which is parallel to the thickness direction of the light guide plate. The line radially extending with the point light source as the center means the line connecting a point passing the center of a finite width of the point light source and a point of a predetermined pattern when the light guide plate is seen from the light outputting surface side. According to such an aspect, the leakage of light from the light guide plate can be evaluated using a concept of average inclination angle, which contributes to designing a surface light source apparatus of small leakage.

According to another aspect of the surface light source apparatus according to the present invention, the directivity converting pattern is formed by a convex-concave structure including a concave portion and/or a convex portion; and the number of the concave portion and/or the convex portion passed when scanning a length from a certain point in a region formed with the convex-concave structure in a direction of a light source is less than the number of the concave portion and/or the convex portion passed when scanning the same length in a direction orthogonal to the scanning direction. The length in the direction of the light source is a length extending toward the center of the light source. According to such an aspect, the leakage of light from the light guide plate can be evaluated by the number of concave-convex portions, which contributes to designing a surface light source apparatus of small leakage.

According to still another aspect of the surface light source apparatus according to the present invention, the directivity converting pattern is formed by arranging a concave portion and/or a convex portion extending in one direction in at least two or more extending directions; and the concave portion and/or the convex portion have the respective extending direction within ±°20 with respect to a direction connecting the respective position and the point light source. The direction connecting with the point light source is the direction connecting with the center of the point light source. When exceeding ±°20, the effect of reducing the leakage of light and improving light usage efficiency lowers.

According to another aspect of the surface light source apparatus according to the present invention, the directivity converting pattern is formed by repeating a concave portion and/or a convex portion extending in one direction; and when a region formed with directivity converting pattern is seen from the point light source, an expansion of the region is smaller than or equal to 80°. The description "seen from the point light source" means "seen from the center of the point light source". When the expansion exceeds 80°, the effect of reducing the leakage of light and improving the light usage efficiency lowers.

According to another aspect of the surface light source apparatus according to the present invention, the directivity converting pattern is configured by a plurality of V-shaped groove structures. In this aspect, the directivity expansion in the thickness direction of the light guide plate of the light entered to the light introducing section can be converted to a direction parallel to the surface direction of the light guide plate since the directivity converting pattern is configured by a plurality of V-shaped groove structures.

According to yet another aspect of the surface light source apparatus according to the present invention, the directivity converting pattern is formed in an arcuate region when seen from a direction perpendicular to the light outputting surface of the light guide plate. According to such an aspect, the leakage at the light introducing section of the light outputted in each direction from the point light source can be minimized since the directivity converting pattern is arranged in the arcuate region having the point light source as the center.

According to yet another aspect of the surface light source apparatus according to the present invention, the directivity converting pattern is arranged in at least one part of the inclined surface formed in the light introducing section. Manufacturing of the light guide plate is facilitated since the inclined surface and the directivity converting pattern are formed in the same plane of the light guide plate by arranging the directivity converting pattern in the inclined surface.

According to yet another aspect of the surface light source apparatus according to the present invention, the directivity converting pattern is arranged in at least one part of a merged region of the light introducing section and an adjacent region of the light guide plate main body adjacent to the light introducing section at a surface opposite to the surface formed with the inclined surface of the light guide plate. The light which directivity is converted by the directivity converting pattern can enter the inclined surface and the leakage of light at the inclined surface can be suppressed to a minimum by arranging the directivity converting pattern in at least one part of the light introducing section and the adjacent region of the light guide plate main body adjacent to the light introducing section.

According to yet another aspect of the surface light source apparatus according to the present invention, the directivity converting pattern is arranged in a region on a side close to the point light source than a position where the light totally reflected by the inclined surface is totally reflected for a second time at a surface on an opposite side of the light outputting surface at a surface opposite to the surface formed with the inclined surface of the light guide plate. According to this aspect, the light reflected at the inclined surface of the light introducing section is prevented from entering the directivity converting pattern a plurality of times, and prevented from leaking outside by entering the directivity converting pattern a plurality of times, whereby the loss of light can be reduced.

According to yet another aspect of the surface light source apparatus according to the present invention, the directivity converting pattern is formed on a surface opposite to the surface formed with the inclined surface of the light guide plate; and the directivity converting pattern is arranged on a side close to the point light source than a position defined at a distance $$D = (3 \cdot t)/\tan \theta$$

from a position facing an edge on the light guide plate main body side of the inclined surface toward an interior of the light guide plate main body, where t is the thickness of the light guide main body and $\theta$ is the inclination angle of the inclined surface. If such a condition is satisfied, the light reflected at the inclined surface of the light introducing section is prevented from entering the directivity converting pattern a plurality of times, and prevented from leaking outside by entering the directivity converting pattern a plurality of times, whereby the loss of light can be reduced, In the aspect of including the V-shaped groove structure of the surface light source apparatus according to the present invention, each of the V-shaped groove structures configuring the directivity converting pattern preferably forms an angle of greater than or equal to 100° and smaller than or equal to 140°. If the angle between the planes forming the V-shaped groove structure is greater than or equal to 100° and smaller than or equal to 140°, a ratio of leakage light (=leakage light/input light) can be reduced.

According to yet another aspect of the surface light source apparatus according to the present invention, an angle formed by a direction extended from an arbitrary point on an edge on a side close to the point light source of the directivity converting pattern to one end of a light outputting window of the point light source, and a direction extended from the arbitrary point to a middle of the light outputting window is smaller than or equal to 30°; and an angle formed by a direction extended from an arbitrary point on an edge on the side close to the point light source of the directivity converting pattern to the other end of the light outputting window of the point light source, and a direction extended from the arbitrary point to the middle of the light outputting window is smaller than or equal to 30°. According to such an aspect, the light outputted from an arbitrary point of the light outputting surface can be confined in the light introducing section and the leakage from the light introducing section can be suppressed to a minimum even when the light outputting window of the light source has a finite size.

According to yet another aspect of the surface light source apparatus according to the present invention, an aspect ratio in a vertical direction and a horizontal direction in plan view of a concave portion and/or a convex portion configuring the directivity converting pattern is smaller than or equal to 0.5. The aspect ratio in the vertical direction and the horizontal direction in plan view means a ratio of the length in the direction orthogonal to the vertical direction (direction the cross-sectional shape changes or short direction; horizontal direction) with respect to the length in the direction the cross-sectional shape of the concave portion and/or the convex portion configuring the directivity converting pattern does not change or longitudinal direction (vertical direction), and the leakage of light from the light guide plate can be reduced by having the value of the aspect ratio to smaller than 0.5.

A liquid crystal display device according to the present invention includes the surface light source apparatus according to the present invention, and a liquid crystal panel. Since the liquid crystal display device uses the surface light source apparatus according to the present invention, the thickness of the liquid crystal display device can be reduced by thinning the light guide plate, and the display surface of the liquid crystal panel can be made brighter by suppressing the loss of light in the surface light source apparatus.

The means for solving the problems in the present invention has characteristics in which the above-described components are appropriately combined, and the present invention enables a great number of variations by combining the components.

BRIEF DESCRIPTION OF THE DRAWINGS

FIG. 4 shows a design example of the surface light source apparatus of FIG. 2.

FIGS. 20(a) to 20(c) are views describing a relationship between the direction cosine space and the leakage of light.

FIG. 22 (a)-(b) are views showing the directivity characteristics S3 of the light guide plate shown in FIG. 17 in the direction cosine space.

FIG. 31(a) is a view showing the directivity characteristics S2 before being reflected at the three-dimensional tapered portion, and FIG. 31(b) is a view showing the directivity characteristics S2 after being reflected at the three-dimensional tapered portion.

FIG. 37(a) is a view showing the directivity characteristics S3 with wider directivity expansion in the horizontal direction in the yz plane of the direction cosine space, and FIG. 37(b) is a view showing the directivity characteristics S3 in the xy plane of the direction cosine space.

FIG. 55(a) is a direction cosine space diagram showing the directivity characteristics of the light entered to the light introducing section, and FIG. 55(b) is a direction cosine space diagram showing the directivity characteristics of the light reflected by the conical directivity converting pattern.

FIGS. 56(a) and 56(b) are plan view and schematic cross-sectional view of a conical convex-concave structure.

FIGS. 57(a) and 57(b) are a plan view and a schematic cross-sectional view of a convex-concave structure in which the conical convex-concave structure is extended to an oval shape.

Figure 1:
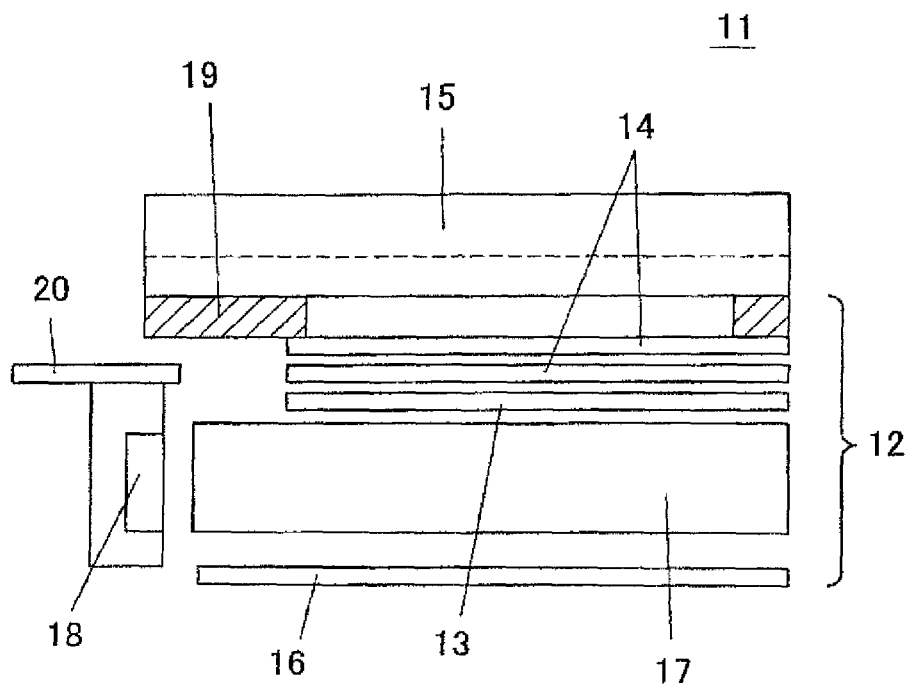
FIG. 1 is a schematic view of a conventional liquid crystal display device using an edge light surface light source apparatus.
Figure 2:
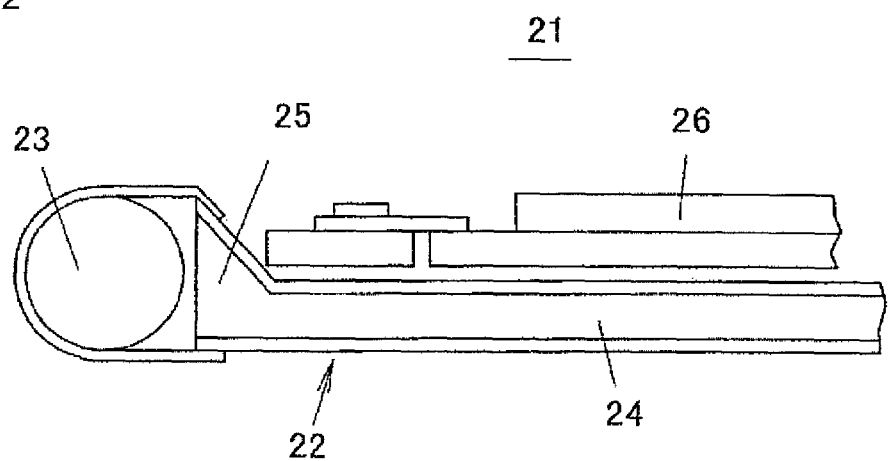
FIG. 2 is a side view of a liquid crystal display device disclosed in Patent Document 1.
Figure 3:
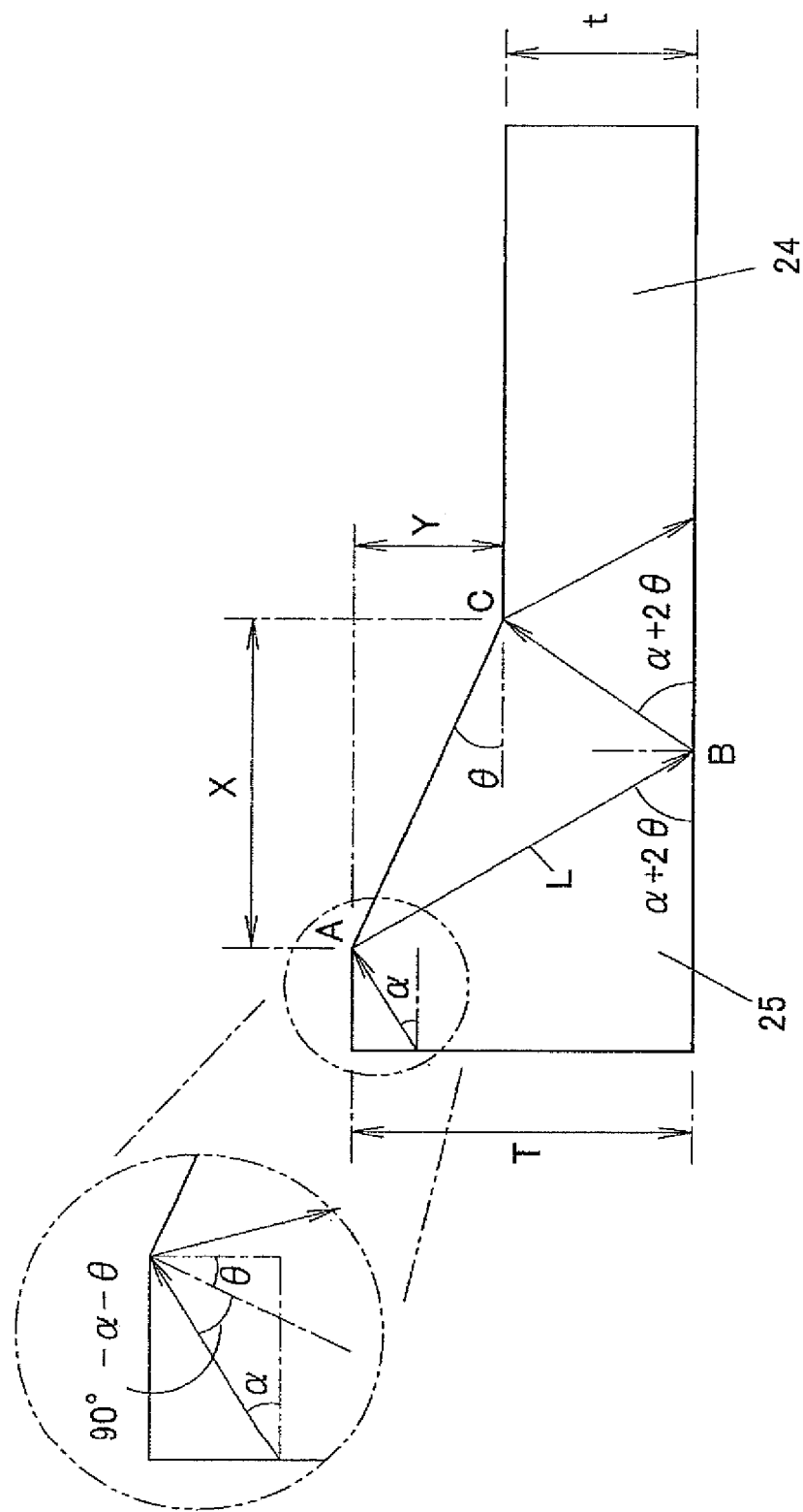
FIG. 3 is a view describing reasons of a leakage of light at a tapered portion in the surface light source apparatus of FIG. 2.
Figure 5:
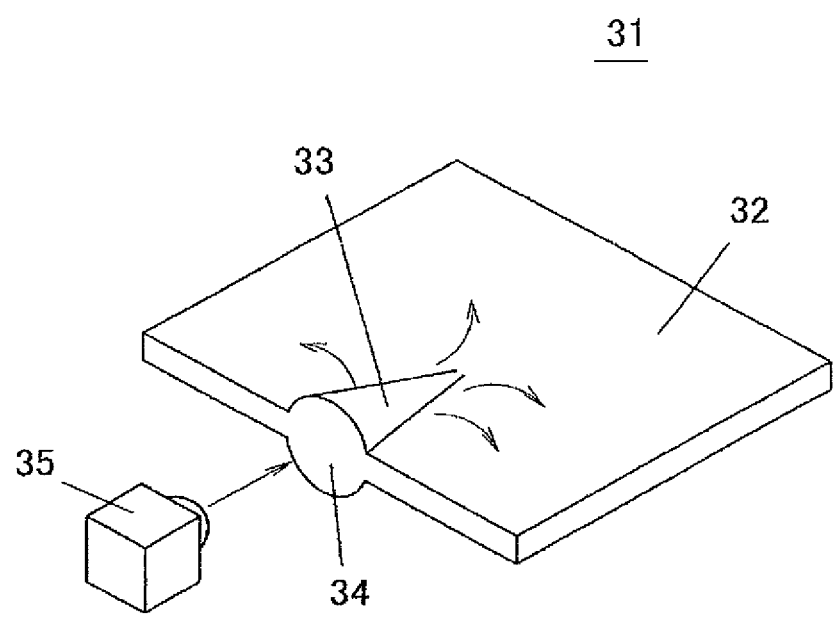
FIG. 5 is a perspective view showing a surface light source apparatus disclosed in FIG. 1 of Patent Document 2.
Figure 6:
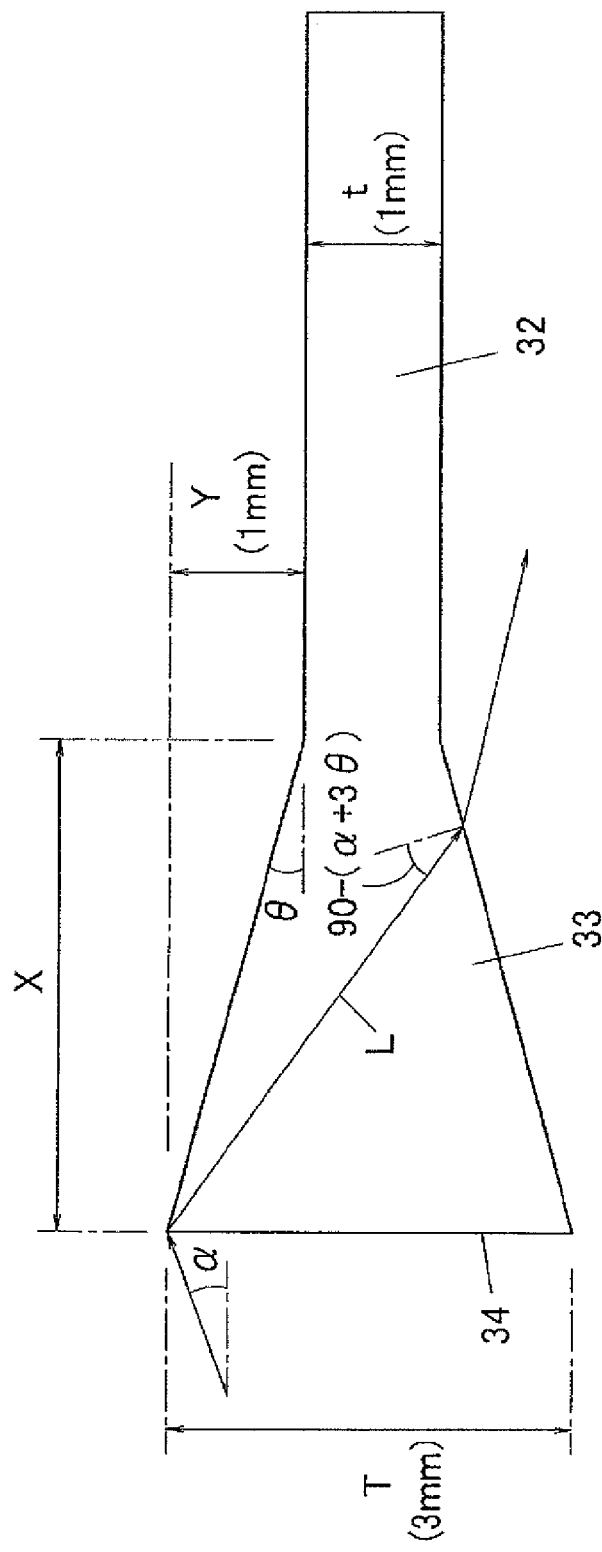
FIG. 6 is a view showing a cross-section of a light introducing section and a light receiving section taken along a perpendicular plane passing through an axis center of the light introducing section in the surface light source apparatus of FIG. 5.
Figure 7:
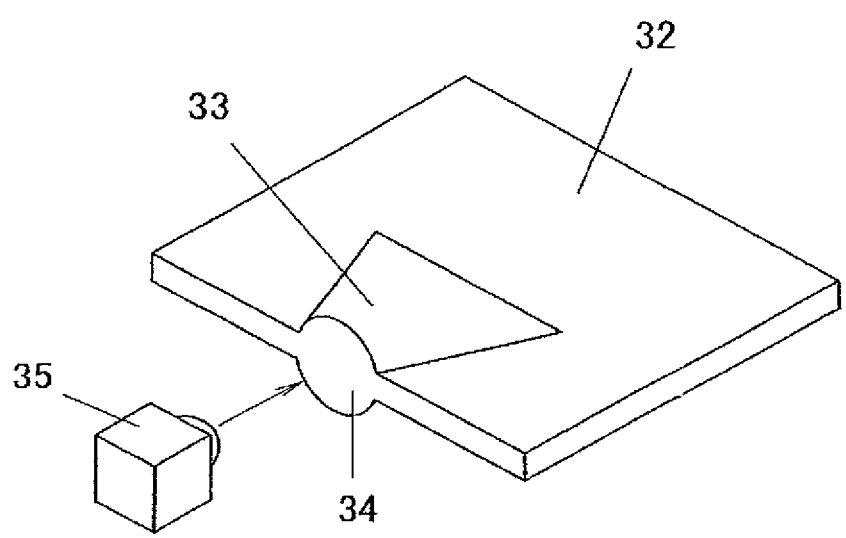
FIG. 7 is a perspective view showing a surface light source apparatus disclosed in FIG. 3 of Patent Document 2.
Figure 8:
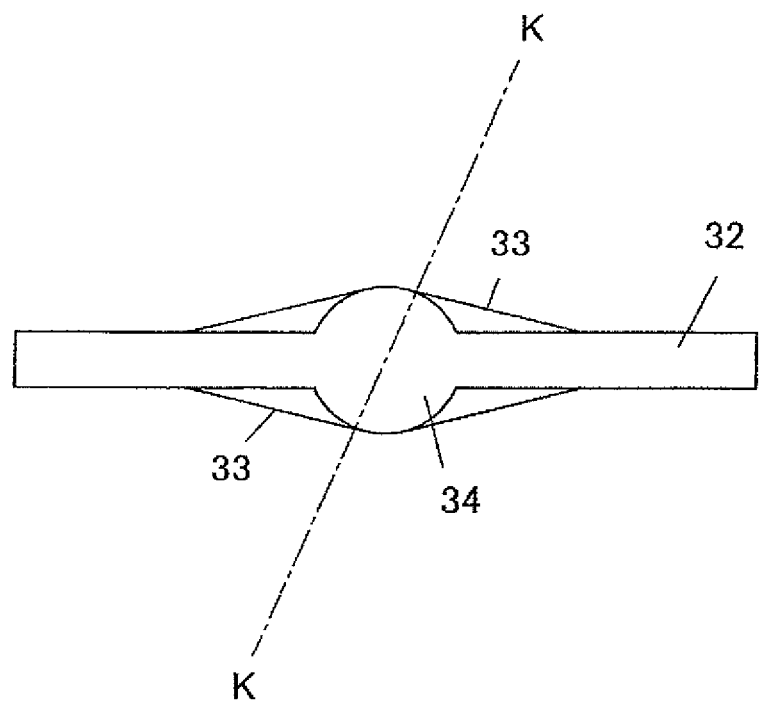
FIG. 8 is a view describing reasons of a leakage of light in the surface light source apparatus of FIG. 7.
Figure 9:
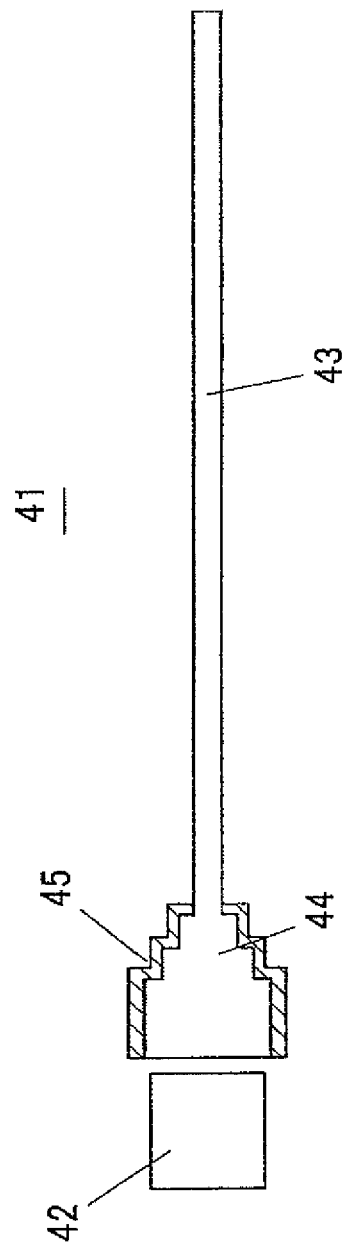
FIG. 9 is a cross-sectional view of a surface light source apparatus disclosed in Patent Document 3.
Figure 10:
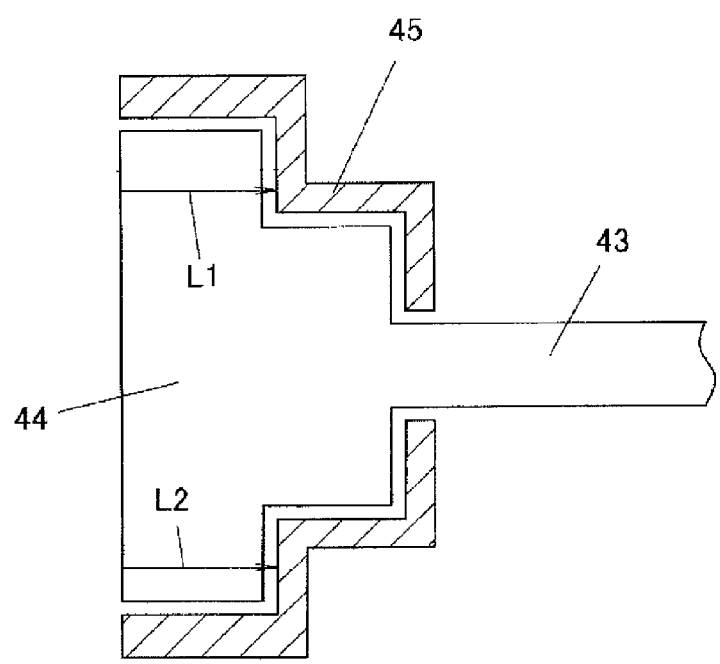
FIG. 10 is a view describing problems of the surface light source apparatus of FIG. 9.

DESCRIPTION OF THE REFERENCE SYMBOLS 51 point light source
52 light guide plate
53 light incident end face
54 light outputting surface
55 tapered portion
56 light guide plate main body
57 inclined surface
58 lower surface
61 surface light source apparatus
62 point light source
62a light outputting window
63 light guide plate
64 light guide plate main body
65 light introducing section
66 light incident end face
67 inclined surface
68 directivity conversion pattern
68a V-shaped groove structure
68b concave-convex structure
69 light outputting surface
70 light outputting means
71 surface light source apparatus
81 surface light source apparatus
92 concave portion
93 reflection plate
98 linear light source
121 liquid crystal display device

BEST MODE FOR CARRYING OUT THE INVENTION

The present invention will now be described below with reference to the accompanied drawings. First, a behavior of light in a conventional surface light source apparatus will be described in detail to facilitate an understanding of direction cosine space that becomes a basic concept of the present invention.

Figure 11:
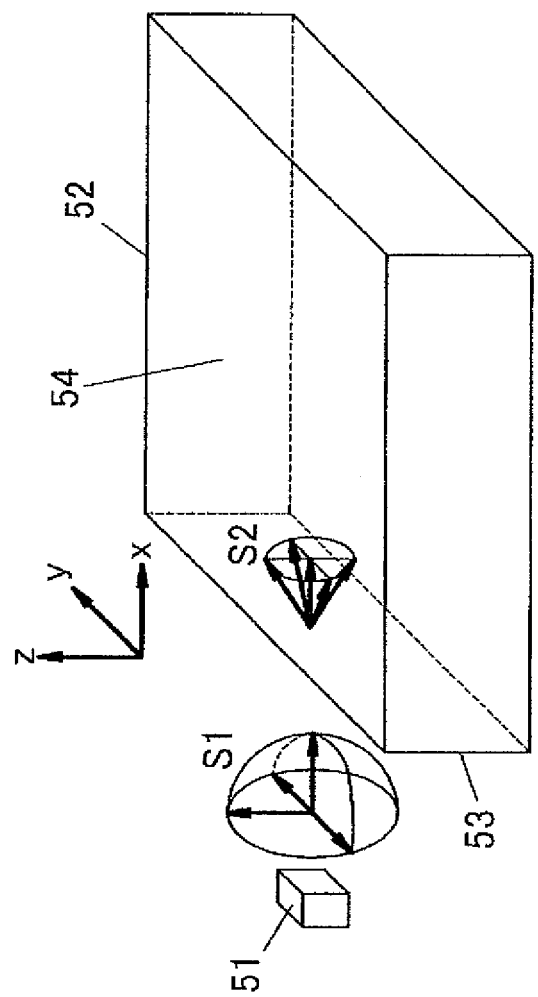
FIG. 11 is a view showing directivity characteristics S1 of light emitted from a point light source and directivity characteristics S2 of light entered to a light guide plate.

FIG. 11 is a view showing directivity characteristics S1 of light (in air) emitted from a point light source 51 and directivity characteristics S2 of light entered to a light guide plate 52. The point light source 51 uses an LED, and is small compared to the width of the light guide plate 52. The light guide plate 52 has a rectangular plate shape, and an index of refraction thereof is expressed as n. An x-axis is defined in a direction perpendicular to a light incident end face 53 of the light guide plate 52 and directed toward the interior of the light guide plate, a z-axis is defined in a direction perpendicular to a light outputting surface 54 of the light guide plate 52, and a y-axis is defined in a direction perpendicular to the x-axis and the z-axis (direction parallel to the light incident end face 53).

Figure 12A:
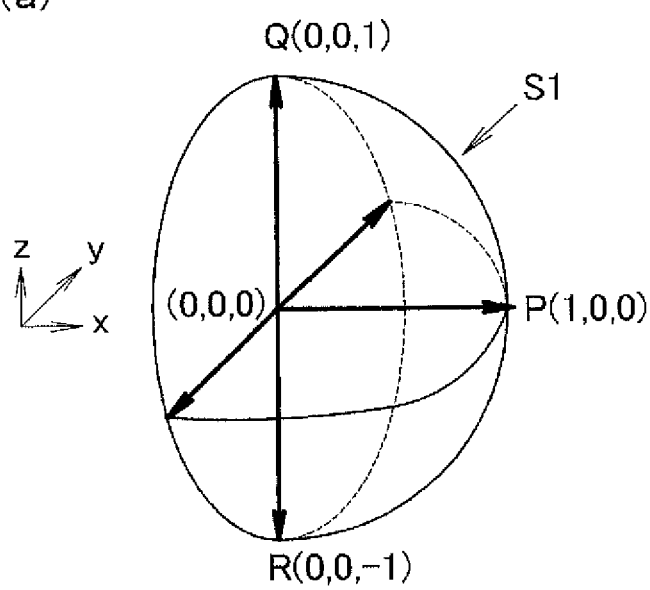
FIG. 12(a) is a view of the directivity characteristics S1 seen from a diagonal direction.
Figure 12B:
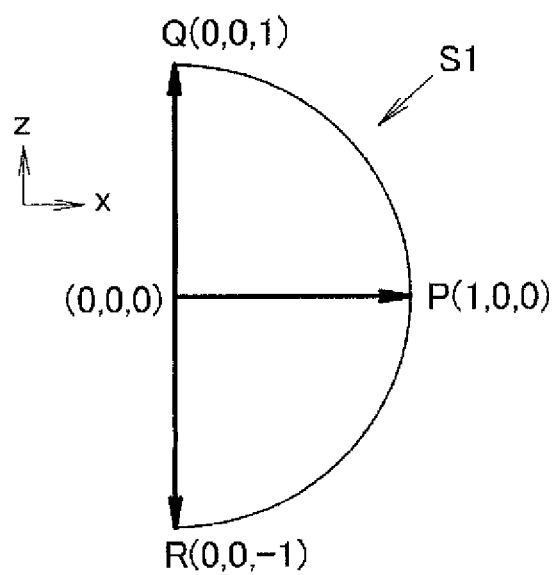
FIG. 12(b) is a view of the directivity characteristics S1 seen from a direction of negative to positive of a y-axis.

Since the light emitted from the LED is an isotropic Lambert distribution having an even light intensity in each direction, the directivity characteristics S1 of the light emitted from the point light source 51 also has the isotropic Lambert distribution. However, the light is represented with semi-spherical directivity characteristics assuming that the light is emitted only toward the front side of the point light source 51, and the directivity characteristics has an expansion of 180° within an arbitrary plane passing through the x-axis. FIG. 12(a) is a view of the directivity characteristics S1 seen from a diagonal direction, and FIG. 12(b) is a view of the directivity characteristics S1 seen from a direction of negative to positive of the y-axis.

Figure 13A:
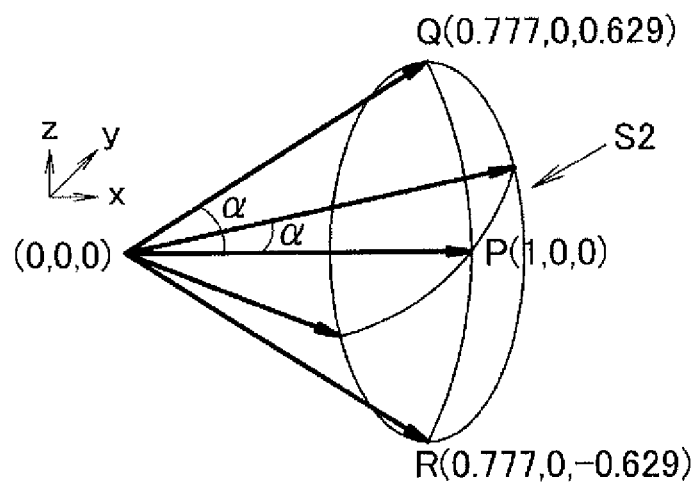
FIG. 13(a) is a view of the directivity characteristics S2 seen from the diagonal direction.
Figure 13B:
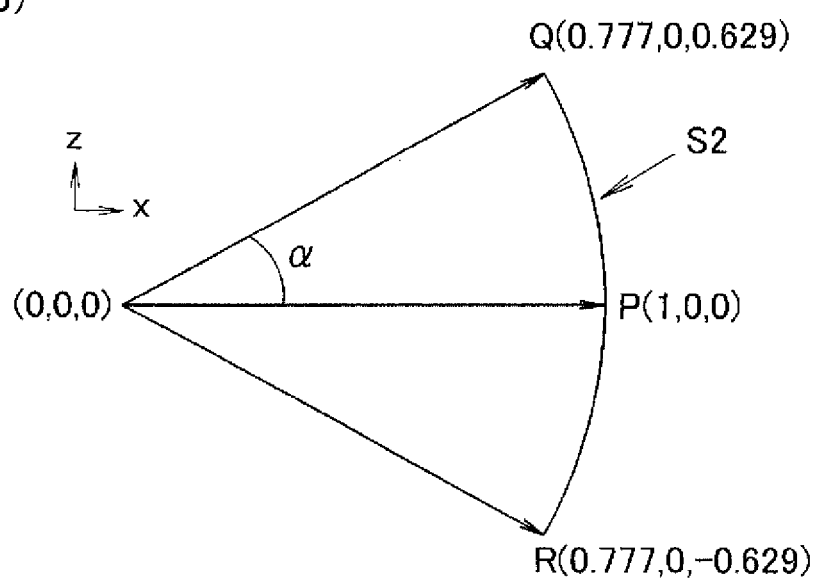
FIG. 13(b) is a view of the directivity characteristics S2 seen from the direction of negative to positive of the y-axis.

When the light of such directivity characteristics S1 advances through the light guide plate 52 from the light incident end face 53, the light ray refracts (Snell's law), and the directivity characteristics S2 of the light in the light guide plate 52 is restricted to the expansion of $2\alpha=2\times\arcsin(1/n)$, as shown in FIG. 13(a) and FIG. 13(b). For example, if the light guide plate 52 is made of polycarbonate resin, the index of refraction is $n=1.59$, and thus $\alpha=38.97°$ (hereinafter, $\alpha=39°$ for the sake of simplifying the description). As shown in FIGS. 13(a) and 13(b), x, y, z components in a Q direction and an R direction of the directivity characteristics S2 are also with respect to the light guide plate 52 made of polycarbonate resin. The directivity characteristics is generally expressed by an emitting direction and an intensity of the light, but a length of a light ray vector in the directivity characteristics is all set as one, and only a light ray direction is shown since the present invention addresses only the presence of leakage of light, that is, the light ray direction.

Figure 14:
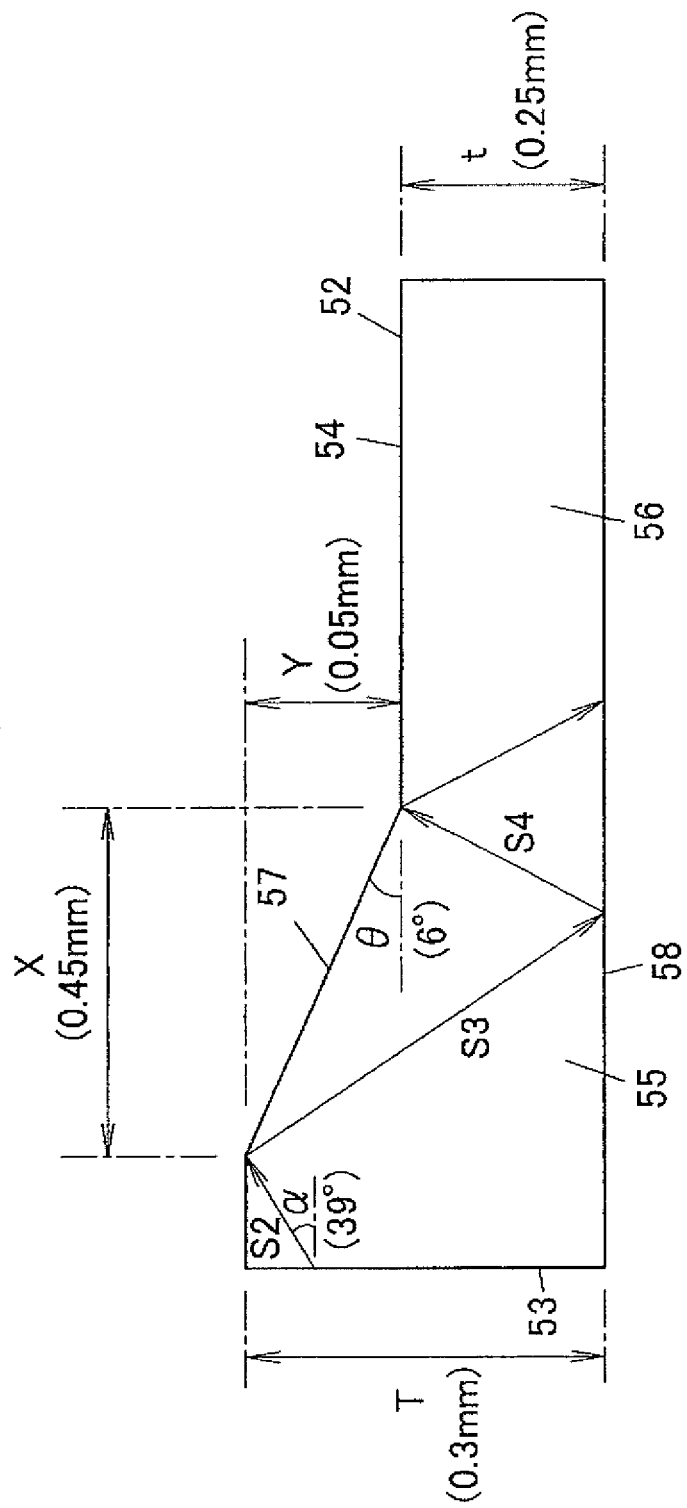
FIG. 14 is a schematic cross-sectional view of the light guide plate designed so that a leakage of light does not occur at a light introducing section.

Next, consider confining the light inside the light guide plate 52 shown in FIG. 14. If the light guide plate is made of polycarbonate resin (index of refraction $n=1.59$), and the height of the end face of the tapered portion 55 is $T=0.3$ mm, a condition that the light does not leak out from the light guide plate 52 can be calculated using the equations 1 to 8, and is as follows.

Maximum incident angle $\alpha=39°$
Inclination angle $\theta$ of inclined surface 57 of tapered portion 55=6°
Length X of tapered portion 55=0.45 mm
High and low difference Y of inclined surface 57 of tapered portion 55=0.05 mm
Thickness t of light guide plate main body 56=0.25 mm.

In FIG. 14, a flat plate shaped short portion is shown at the end face portion of the tapered portion 55, but this is shown for the sake of illustration, and the length can be assumed as infinitely short.

Figure 15A:
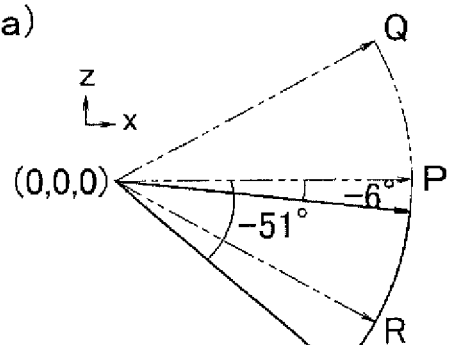
FIGS. 15(a) to 15(d) are views describing directivity characteristics in the light guide plate of FIG. 14.
Figure 15B:
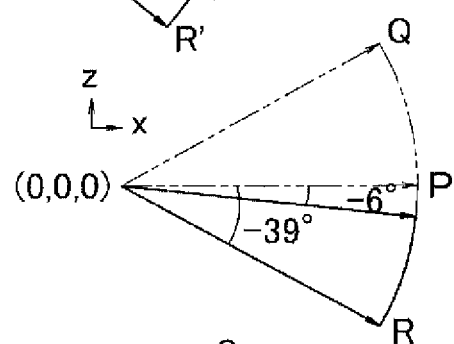
Figure 15C:
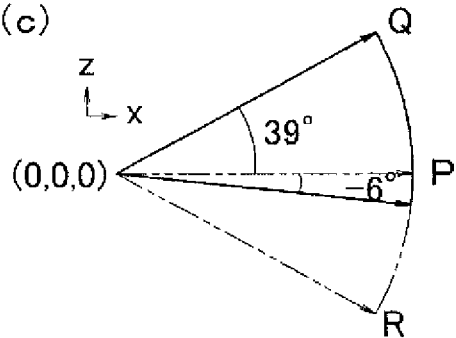
Figure 15D:
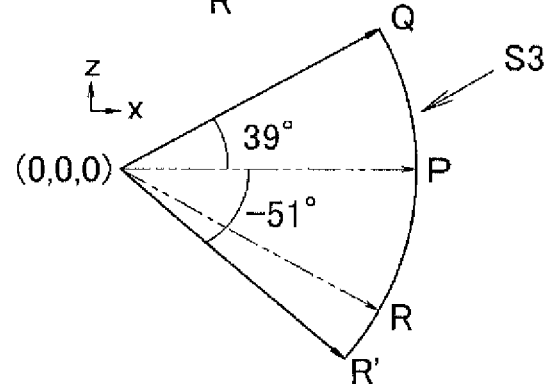

Consider the change in directivity characteristics of the light in a zx plane in the light guide plate 52. If the light ray in the light ray direction (angle with x-axis; hereinafter, light ray direction refers to angle formed with x-axis) $\xi(-\alpha\leq\xi\leq\alpha)$ that entered the light guide plate 52 is totally reflected at the inclined surface 57 of inclination angle $\theta$, the light ray direction after the reflection becomes $-\xi-2\theta$. Therefore, if the light ray in the light ray direction between −6° and +39° of the light of the directivity characteristics S2 in the range of between −39° and +39° that entered the light guide plate 52 enters the inclined surface 57, all light rays are totally reflected, and the directivity characteristics after the reflection is in the range of between −51° and −6° (FIG. 15(a)). Since the light in the range of between −39° and −6° does not enter the inclined surface 57, the directivity characteristics of between −39° and −6° is maintained (FIG. 15(b)). Furthermore, some light in the range of between −6° and +39° maintain the directivity characteristics of between −6° and +39° without entering the inclined surface 57 (FIG. 15(c)). Combining the light of each direction, the directivity characteristics S3 of the light between the inclined surface 57 and a lower surface 58 of the tapered portion 55 has the light ray direction in the range of between −51° and +39°, as shown in FIG. 15(d).

Figure 16A:
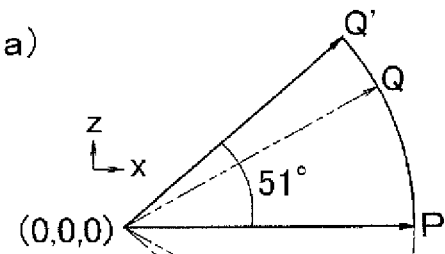
FIGS. 16(a) to 16(d) are views describing the directivity characteristics in the light guide plate of FIG. 14.
Figure 16B:
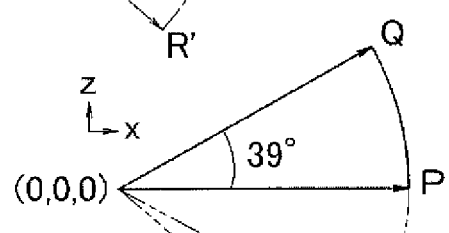
Figure 16C:
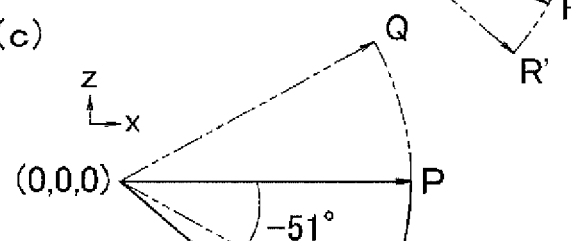
Figure 16D:
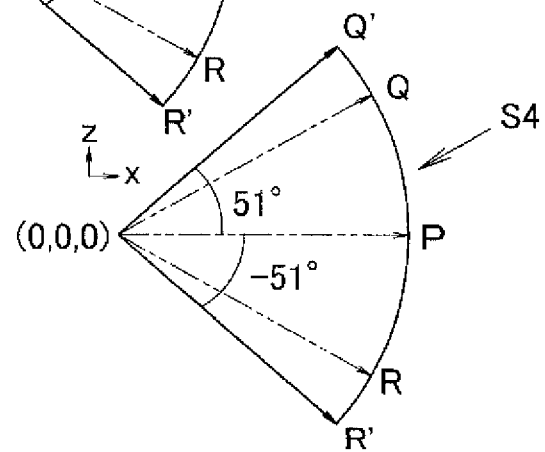

At the lower surface 58 of the tapered portion 55, the light of between −51 and 0° of the light of the directivity characteristics S3 of between −51° and +39° is totally reflected without leaking at the lower surface 58, and becomes the light in the range of between 0° and +51° (FIG. 16(a)). Since the light of between 0° and +39° do not enter the lower surface 58, such light maintains the directivity characteristics of between 0° and +39° (FIG. 16(b)). Furthermore, some light of between −51° and 0° may enter the light guide plate main body 56 while maintaining the directivity characteristics of between −51° and 0° without entering the lower surface 58 of the tapered portion 55 (FIG. 16(c)). Combining the light of each direction, the directivity characteristics S4 of the light between the lower surface 58 of the tapered portion 55 and the light guide plate main body 56 has the light ray direction in the range of between −51° and +51°, as shown in FIG. 16(d).

Therefore, according to the tapered portion 55 as shown in FIG. 14, the light of between −39° and 39° advanced from the point light source 51 expands to the directivity characteristics of between −51° and +51° within the zx plane, but the light can be introduced to the light guide plate main body 56 without leaking from the inclined surface 57 nor the lower surface 58 of the tapered portion 55.

Figure 17:
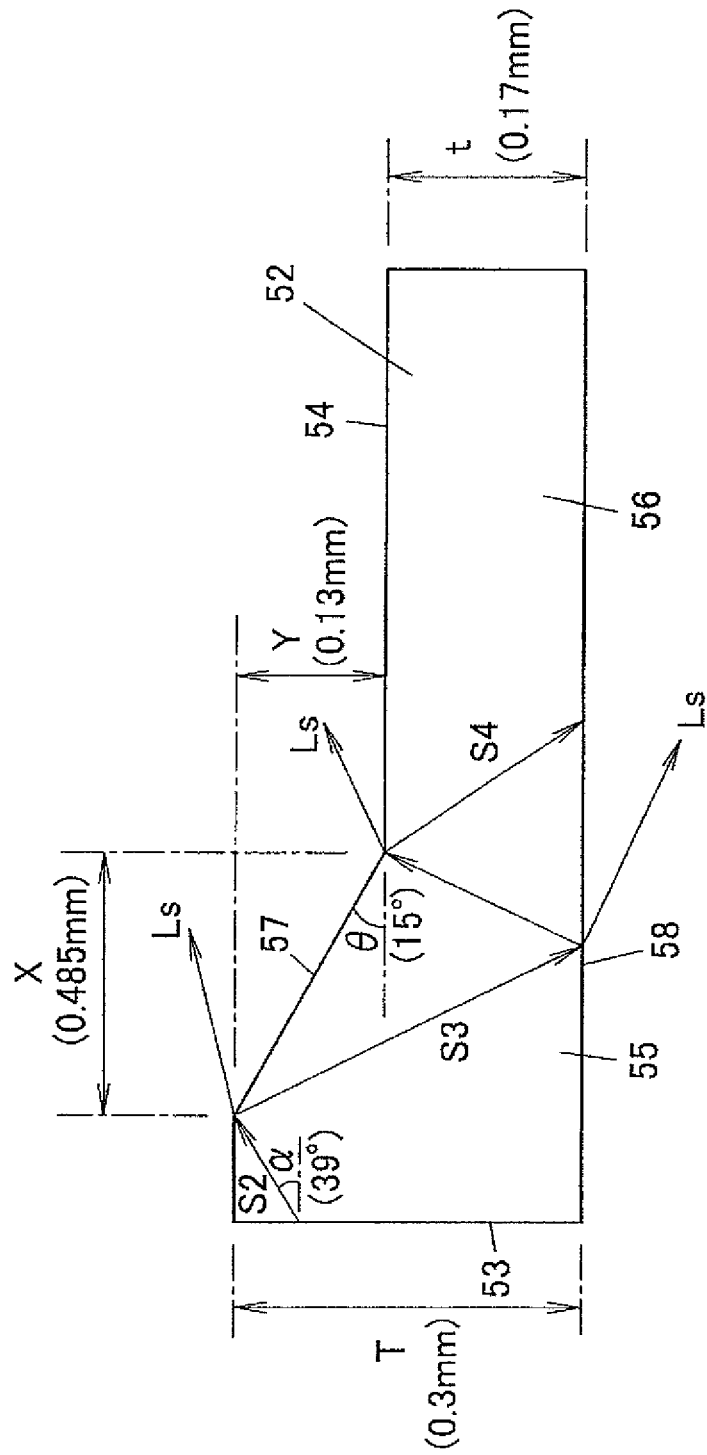
FIG. 17 is a schematic cross-sectional view of the light guide plate in which the leakage of light occurs at the light introducing section.

A case in which the inclination angle θ is increased and the thickness t of the light guide plate main body 56 is further reduced without taking the conditions of the equations 1 to 8 into consideration in the light guide plate 52 shown in FIG. 17 will be considered. The value of each portion is defined as below.

Index of refraction n=1.59 (polycarbonate resin)
Height T of end face of tapered portion 55=0.3 mm
Maximum inclination angle α=39°
Inclination angle θ of inclined surface 57 of tapered portion 55=15°
Length X of tapered portion 55=0.485 mm
High and low difference Y of inclined surface 57 of tapered portion 55=0.13 mm
Thickness t of light guide plate main body 56=0.17 mm.

Figure 18:
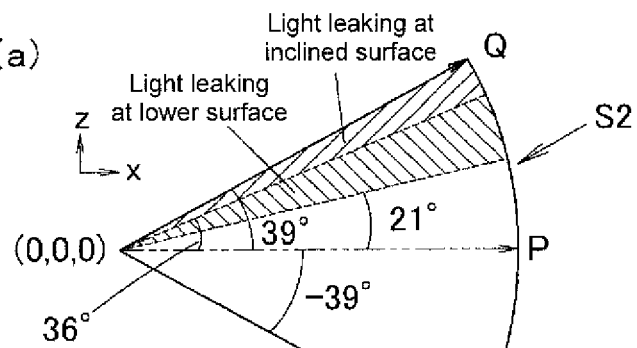
FIGS. 18(a) to 18(c) are views describing directivity characteristics in the light guide plate of FIG. 17.
Figure 18:
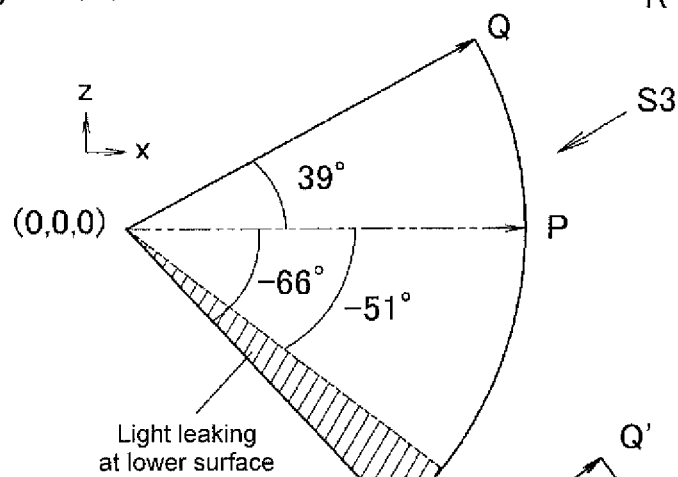
Figure 18:
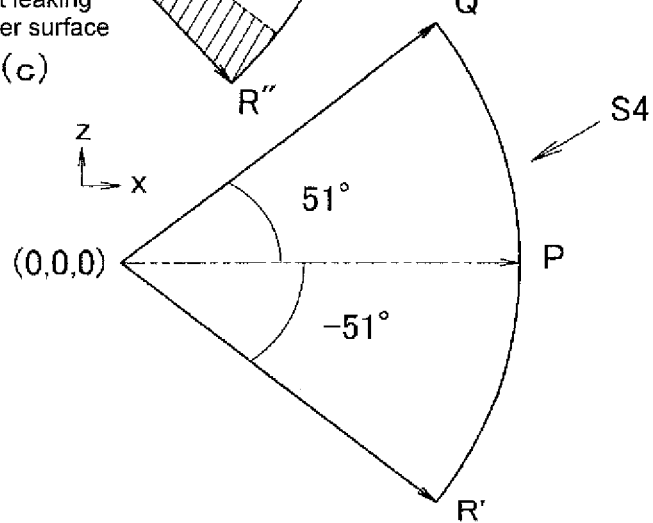

The change in the directivity characteristics in the zx plane will be followed up for the light guide plate 52 shown in FIG. 17, same as in the light guide plate 52 of FIG. 14. As shown in FIG. 18(a), the directivity characteristics S2 of the light of the point light source 51 that entered the light guide plate 52 is between −39° and +39°. The incident angle of the light ray in the light ray direction ξ is 90−θ−ξ, and thus the incident angle is between 36° and 114° when the light having the directivity characteristics of between −39° and 39° enter the inclined surface 57. The critical angle of total reflection at the inclined surface 57 is 39°, and thus the light having an incident angle of between 36° and 39° (between 39° and 36° in the original light ray direction ξ) at the inclined surface 57 leaks outside from the inclined surface 57 and becomes loss light Ls.

Directivity of light reflected at inclined surface 57 −66° to −15°
Directivity of light not entered to inclined surface 57 −39° to −15°
Directivity of some light not entered to inclined surface 57 −15° to 39°

Therefore, combining such lights, the directivity characteristics S3 between the inclined surface 57 and the lower surface 58 of the tapered portion 55 is between −66° and 39°.

The light of between −66° and 0° of the light of directivity characteristics S3 enter the lower surface 58 of the tapered portion 55, but since an incident angle thereof is between 24° and 39°, the light having an incident angle to the lower surface 58 of between 24° and 39° (36° to 21° in original light ray direction ξ) leaks outside from the lower surface 58 and becomes the loss light Ls. Therefore, only the light between −51° and 0° of the light between −66° and 0° is totally reflected at the lower surface 58 and becomes the light of between 0° and +51°, and becomes the light of directivity characteristics of between −66° and +51° in combination with the light of between −66° and 39° that is not reflected at the lower surface 58, and the light is introduced to the light guide plate main body 56. The light again leaks out at the upper surface of the light guide plate main body 56 and becomes the loss light Ls, and the light of directivity characteristics S4 of between −51° and +51° is guided through the light guide plate main body 56, as shown in FIG. 18(b).

Therefore, in such a light guide plate 52, the light (light of between 21° and 39°) of the shaded region of the light of between −39° and 39° that entered the light guide plate 52 leaks out from the inclined surface 57 and the lower surface 58 of the tapered portion 55 and becomes a loss, as shown in FIG. 18(a).

Therefore, in the surface light source apparatus including a two-dimensional tapered portion having a uniform shape in the width direction of the light guide plate 52, the design is to be made such that the equation 1 and the equations 5 to 8 are satisfied if the light is not to leak out from the tapered portion, and the leakage of light occurs if the thickness of the light guide plate main body is made smaller than the thickness t determined by the equation 8. Thus, in the light guide plate having the structure of the related art, the thickness of the light guide plate main body cannot be reduced while having a leakage of light from the tapered portion to a minimum.

The present invention avoids the above restriction and obtains a minimum leakage of light at the tapered portion and preferably prevents the leakage of light, and enables to reduce the thickness of the light guide plate.

A concept of direction cosine space useful in understanding the present invention will be described, and the presence of the leakage of light in the light guide plate shown in FIGS. 14 and 17 is associated with the directivity characteristics in the direction cosine space.

Figure 19A:
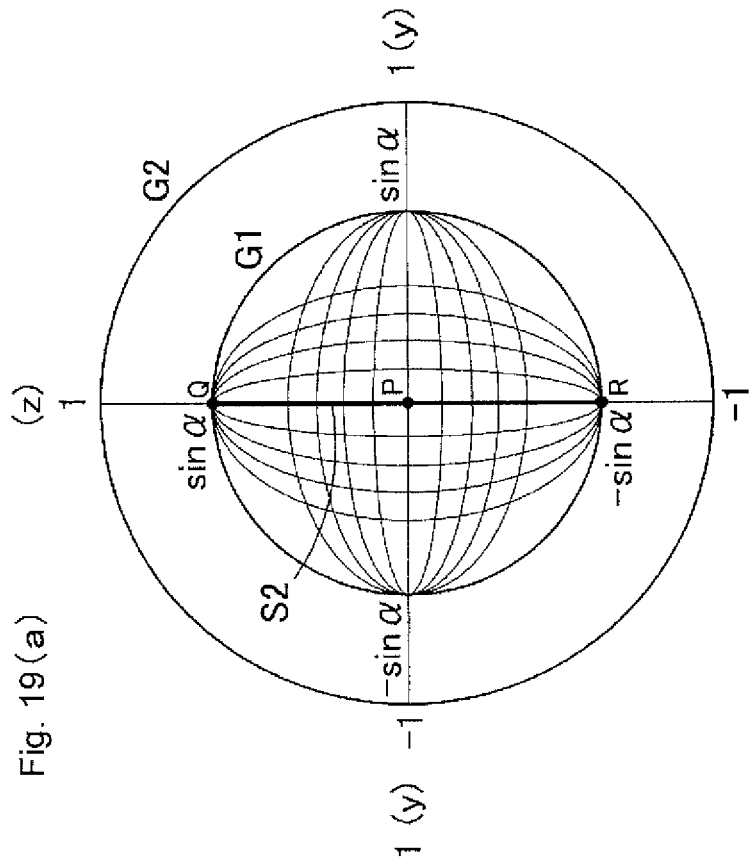
FIGS. 19(a) and 19(b) are views showing the directivity characteristics S2 in direction cosine space.
Figure 19B:
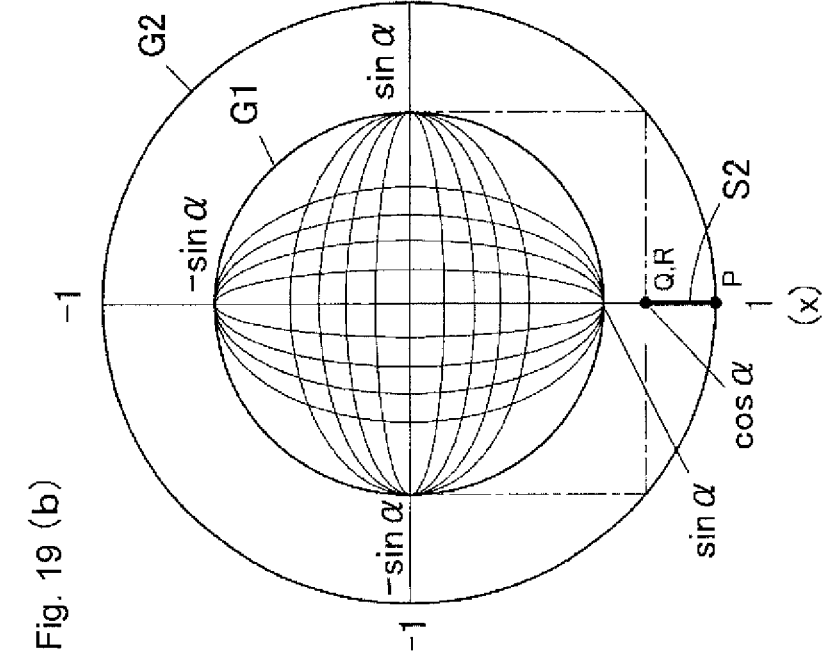

The direction cosine space represents the directivity characteristics (direction of light ray) of the light with a region at a surface of a sphere having a radius of one. For example, directivity characteristics QR within the zx plane of the directivity characteristics S2 shown in FIG. 13 can be expressed with the yz plane and the xy plane of the direction cosine space, as shown in FIG. 19(a) and FIG. 19(b), respectively. A large circle on the outer side in the direction cosine space represents a sphere G2 having a radius of one, and a small circle on the inner side represents a sphere G1 having a radius of sin α=1/n.

The directivity characteristics are generally expressed as a surface region at the surface of the sphere G2 having a radius of one. However, in the light expansion in the y-axis direction as in the light within the xy plane of the directivity characteristics S2, the light ray direction within the zx plane merely changes even if totally reflected at the inclined surface 57 or the lower surface 58 of the tapered portion 55 and the expansion of the light does not change, and thus is not directly related to a leakage of light. Therefore, only the directivity characteristics in the zx plane is taken into consideration when considering the directivity characteristics S2, S3, and the like below since only the directivity characteristics in the zx plane needs to be taken into consideration when considering the presence of a leakage of light in the light guide plate having a two-dimensional tapered portion.

Through the use of such direction cosine space, whether or not the light leaks out from the light guide plate 52 can be determined by whether or not the directivity characteristics S3 of the light between the inclined surface 57 and the lower surface 58 of the tapered portion 55 overlaps the shaded region of FIGS. 20(b) and 20(c). The reason therefor will be described with FIG. 20(a).

Assuming the light ray direction of the light entering the inclined surface 57 is ξ (−α≤ξ≤α), the condition that the light does not leak at the inclined surface 57 is, $$90°-\theta-\xi>\alpha, \text{ that is, } 90°-\theta-\alpha>\xi \qquad \text{(equation 9)}.$$

The condition that the light totally reflected at the inclined surface 57 enters the lower surface 58 and does not leak out from the lower surface 58 is, $$90°-2\theta-\xi>\alpha, \text{ that is, } 90°-2\theta-\alpha>\xi \qquad \text{(equation 10)}.$$

Comparing the equation 9 and the equation 10, if the leakage of light does not occur at the lower surface 58 of the tapered portion 55, the leakage of light also does not occur at the inclined surface 57 of the tapered portion 55.

Consider the light entering the lower surface 58 of the tapered portion 55. As with the light of the directivity characteristics S3 shown with a solid line arrow in FIG. 20(a), the light that entered at an incident angle greater than α (critical angle) with respect to a normal line (z-axis) at the lower surface 58 is totally reflected at the lower surface 58, and does not leak outside. On the contrary, as with the light of the directivity characteristics S3 shown with a broken line arrow in FIG. 20(a), the light that entered at an incident angle smaller than α (critical angle) with respect to a normal line (z-axis) at the lower surface 58 leaks outside from the lower surface 58.

A region of light forming an angle smaller than α with respect to the z-axis is a region of broken lines in FIGS. 20(b) and 20(c) when expressed with the direction cosine space. Therefore, the light leaks to the outside when the directivity characteristics S3 overlaps the shaded region of FIGS. 20(b) and 20(c).

Figure 21A:
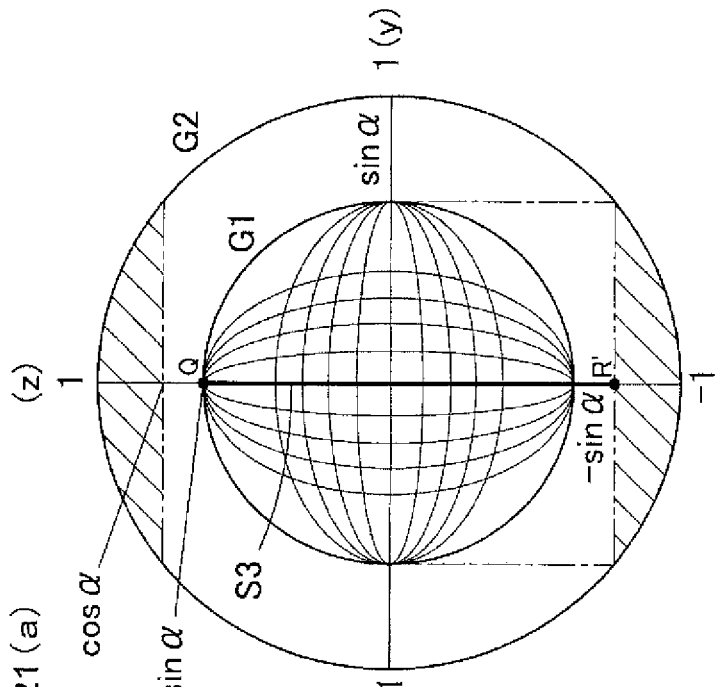
FIGS. 21(a) and 21(b) are views showing directivity characteristics S3 of the light guide plate shown in FIG. 14 in the direction cosine space.
Figure 21B:
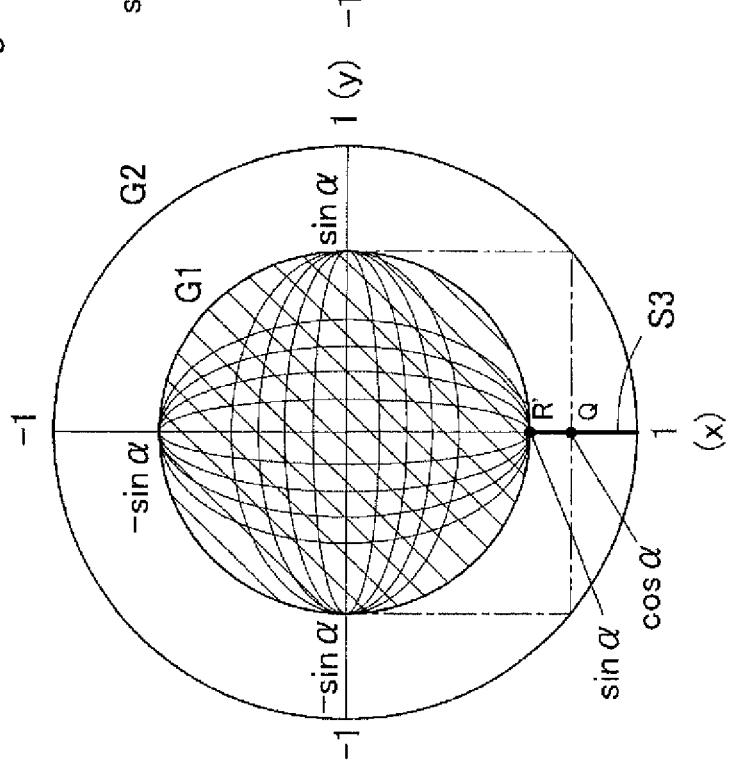

Representing the directivity characteristics S3 in the light guide plate 52 shown in FIG. 14 with the yz plane and the xy plane of the direction cosine space, QR' of FIGS. 21(a) and 21(b) is obtained. In the light guide plate 52 of FIG. 14, the directivity characteristics 53 is deviated to a lower side, and a point R' contacts the shaded region. Therefore, the leakage of light at the tapered portion 55 does not exist, but the light is at the limit of leaking outside.

Similarly, representing the directivity characteristics S3 in the light guide plate 52 shown in FIG. 17 with the yz plane and the xy plane of the direction cosine space, QR" of FIGS. 22(a) and 22(b) is obtained. In the light guide plate 52 of FIG. 17, some of the light of the directivity characteristics S3 overlaps the shaded region of FIGS. 22(a) and 22(b), and the light overlapping the shaded region (light near R") leaks outside.

First Embodiment

Figure 23:
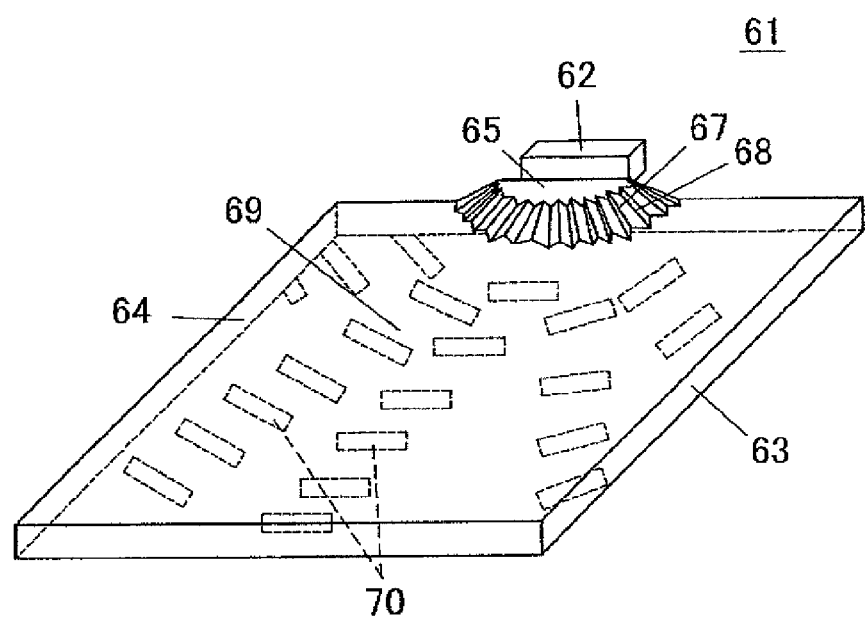
FIG. 23 is a perspective view showing a surface light source apparatus according to a first embodiment of the present invention.
Figure 24:
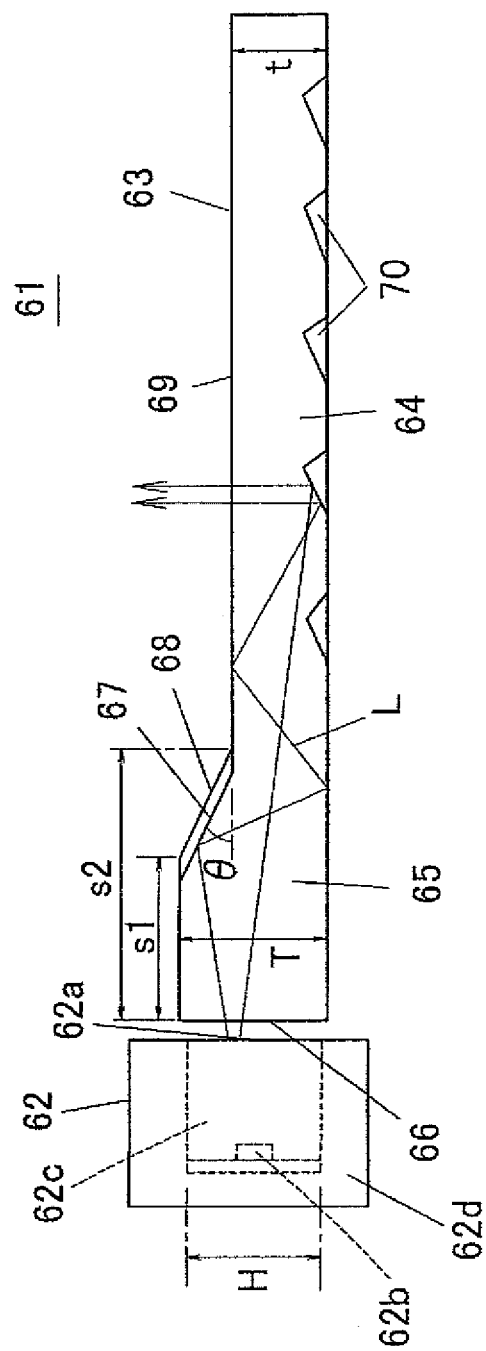
FIG. 24 is a schematic cross-sectional view of the surface light source apparatus according to the first embodiment of the present invention.

First embodiment of the present invention will be described. FIG. 23 is a perspective view showing a surface light source apparatus 61 according to a first embodiment of the present invention, and FIG. 24 is a schematic cross-sectional view thereof. The surface light source apparatus 61 includes a point light source 62 and a light guide plate 63. The point light source 62 incorporates one or a plurality of LEDs, and emits white light. An LED 62b is sealed in a transparent sealing resin 62c, and the transparent sealing resin 62c is covered by a white resin 62d excluding a front surface, where the front surface exposed from the white resin 62d of the transparent sealing resin 62c is a light outputting window 62a. The point light source 62 is small compared to the width of the light guide plate 63 (dimension in a depth direction in the plane of FIG. 24), and thus is referred to as a point light source as opposed to a cold cathode tube being referred to as a linear light source.

The point light source is not a point light source in strict meaning. The point light source has a finite width, but does not have a width of greater than or equal to 10 mm as in the cold cathode tube. For example, the point light source includes a side view LED. One or more LED chips may be arranged in one package, and a plurality of LED chips may be simultaneously sealed. That in which a plurality of chips are simultaneously arranged may have an opening size in the width direction (y-axis direction) of about 5 mm, but is assumed as a point light source since it is sufficiently small with respect to the light outputting surface size of the light guide plate of about two inches. The point light source that emits parallel light such as a semiconductor laser element may also be used. Furthermore, the light guided using an optical fiber may be introduced to the light guide plate. In this case, the light output end of the optical fiber is assumed as the point light source.

The light guide plate 63 has a light introducing section 65 arranged at the end of a light guide plate main body 64, and is molded by a transparent resin having a high index of refraction such as an acrylic resin, a polycarbonate resin (PC), a cycloolefin material, polymethylmethacrylate (PMMA) and the like. In the following, the light guide plate 63 is made of a polycarbonate resin.

The light introducing section 65 is a portion of large thickness of the light guide plate 63, and has the point light source 62 opposingly arranged at an end face thereof (light incident end face 66). The thickness T of the end face of the light introducing section 65 is equal to or thicker than the height H of the light outputting window 62a, and thus the light emitted from the point light source 62 efficiently enters from the light incident end face 66 into the light introducing section 65, and the light usage efficiency of the surface light source apparatus 61 becomes high. In the light introducing section 65, a projection having a shape of substantially a half of a circular truncated cone shape projects out at the surface on the same side as the light outputting surface 69 of the light guide plate main body 64 so that the thickness of the light introducing section 65 becomes greater, where the outer circumferential surface of the projection becomes an inclined surface 67 and a directivity converting pattern 68 forms along the inclined surface 67.

The inclined surface 67 is inclined from the surface of the portion having greater thickness than the light guide plate main body 64 toward the end of the light guide plate main body 64 in the light introducing section 65. That is, the edge on the far side from the point light source 62 of the inclined surface 67 is at a boundary of the light introducing section 65 and the light guide plate main body 64, and the light introducing section 65 is defined from a portion facing the point light source 62 to an edge on a far side from the point light source 62 of the inclined surface 67 when seen from a direction perpendicular to the light guide plate 63.

The light guide plate main body 64 occupies a majority of the area of the light guide plate 63, and the thickness t thereof is smaller than the thickness T of the light introducing section 65, whereby the thickness of the light guide plate 63 can be reduced. In the embodiment described herein, the light guide plate main body 64 has a flat plate shape in which front and back surfaces are parallel, and the thickness of the light guide plate main body 64 is substantially even. Light outputting means 70 is arranged on a surface opposite to the light outputting surface 69 of the light guide plate main body 64. In FIGS. 23 and 24, a triangular groove-shaped pattern is shown for the light outputting means 70, but the light outputting means 70 which is subjected to sandblast processing, photograph printed with a diffusion ink, the light outputting means 70 with a diffraction pattern or an arbitrary concave-convex pattern, the light outputting means 70 which surface on the side opposite to the light outputting surface 69 of the light guide plate main body 64 is inclined (wedge-shaped light guide plate main body) and the like may be used. In addition, the light outputting means 70 may be arranged on the light outputting surface 69 or on both the light outputting surface 69 and the surface opposite thereto.

Therefore, as shown in FIG. 24, in the surface light source apparatus 61, light L emitted from the point light source 62 enters the light introducing section 65 from the light incident end face 66, is totally reflected by the directivity converting pattern 68 or the lower surface of the light introducing section 65 or passed through the light introducing section 65 and introduced to the light guide plate main body 64 having small thickness. The light introduced to the light guide plate main body 64 is totally reflected or diffused by the light outputting means 70, and substantially evenly outputted from the light outputting surface 69.

Figure 25:
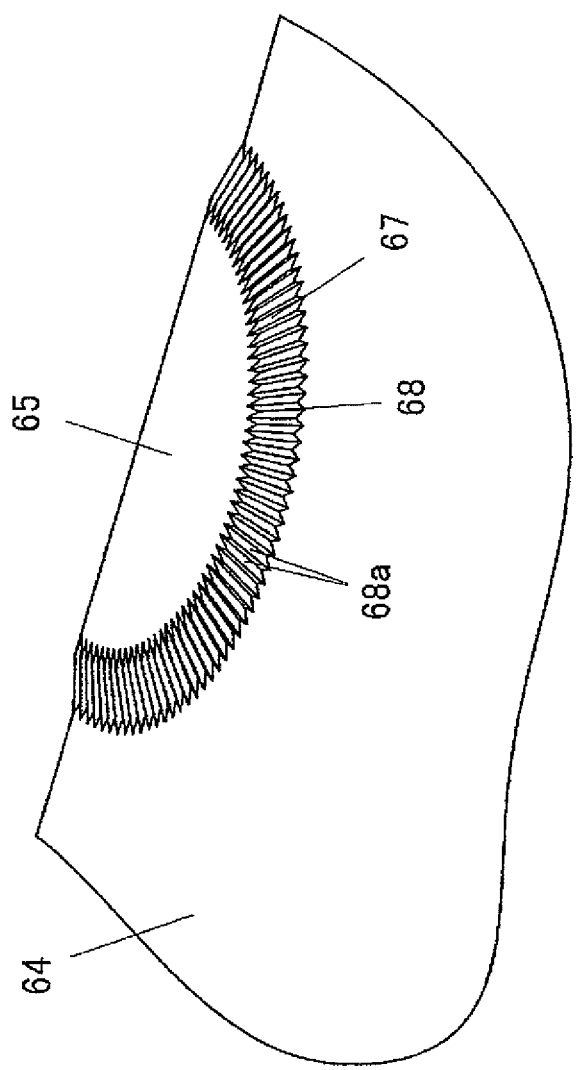
FIG. 25 is an enlarged perspective view showing a light introducing section of the surface light source apparatus according to the first embodiment.
Figure 26:
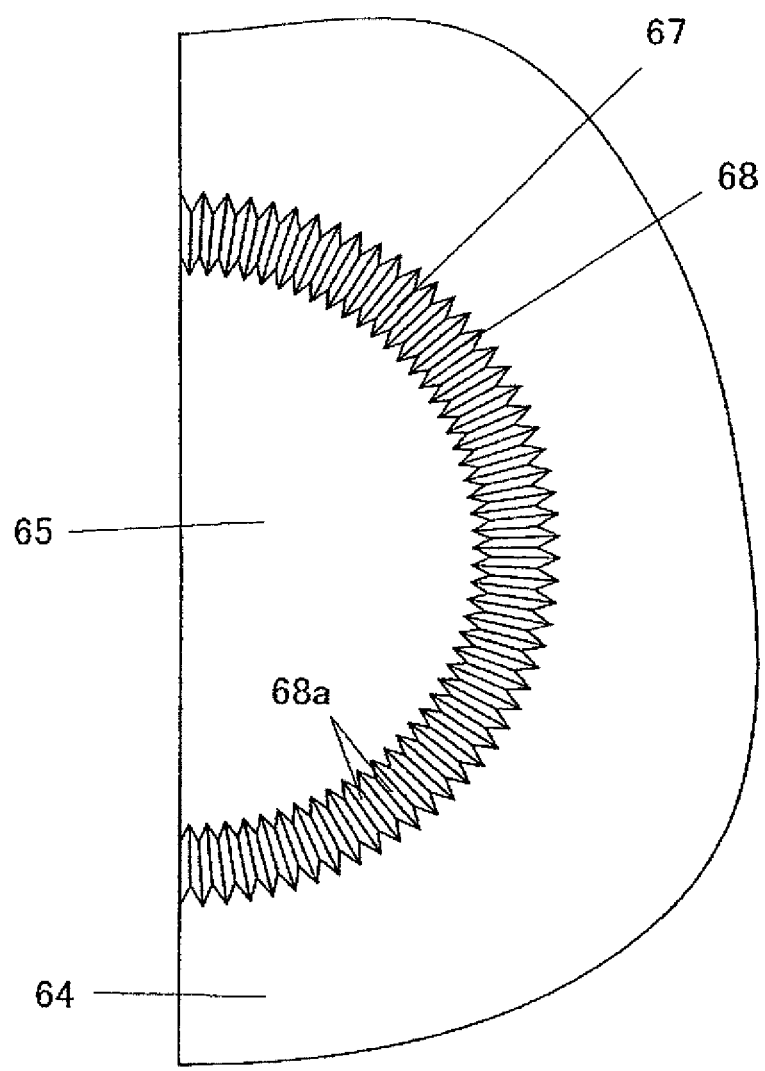
FIG. 26 is a plan view showing the light introducing section of the surface light source apparatus according to the first embodiment.

FIG. 25 is an enlarged perspective view showing the light introducing section 65, and FIG. 26 is a plan view showing the light introducing section 65 in detail. The light introducing section 65 has a structure in which the projection, which is one part of the circular truncated cone shape, is projected from the portion of same thickness as the light guide plate main body 64. The outer circumferential surface of the projection is the inclined surface 67 inclined from the upper surface of the light introducing section 65 toward the light outputting surface 69 of the light guide plate main body 64, and the directivity converting pattern 68 in which a plurality of V-shaped groove structures 68a are lined is formed at the inclined surface 67.

Figure 27:
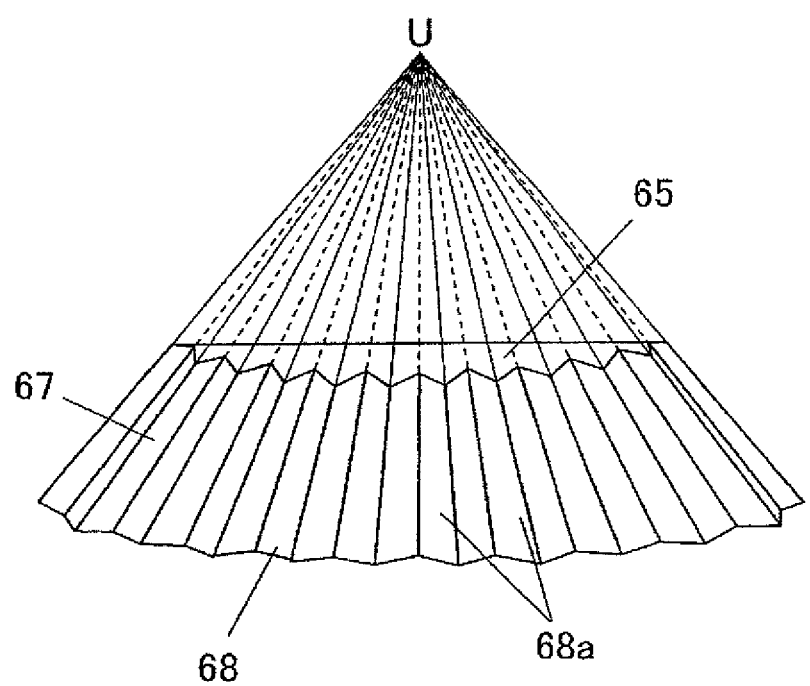
FIG. 27 is a view showing the surface light source apparatus showing that, three-dimensionally, if the ridge line and the valley line of the V-shaped groove structure are extended upward, each extended line gather near one point.

The directivity converting pattern 68 is an arcuate band-shaped region when seen from a direction perpendicular to the light outputting surface 69, where the V-shaped groove structure 68a of the same shape are radially lined. A case in which one part is surrounded with an arcuate envelope curve and one part is surrounded with a line, as shown in FIG. 43, is also assumed as being formed to the arcuate region. Considering a variant two-dimensionally, if a length direction of each V-shaped groove structure 68a is extended, each extended line gathers at a close point at the central part of the end face of the light introducing section 65. As shown in FIG. 27, three-dimensionally, if the ridge line and the valley line of the V-shaped groove structure 68a are extended upward, each extended line gather near one point U.

If a vertex angle (maximum narrow angle formed by a plane configuring V-shaped groove structure 68a) $\phi 3$ of a hill part when seen from the ridge line direction of the V-shaped groove structure 68a is 120°, the effect of preventing light leakage by directivity conversion, as hereinafter described, becomes the highest. If the vertex angle $\phi 3$ is between 100° and 140°, Leakage light/input light≤20%, and furthermore, if the vertex angle $\phi 3$ is between 110° and 130°, Leakage light/input light≤15%.

An example in which the vertex angle $\phi 3$ is 120° will be described. With reference to FIG. 24, specific numerical values are as follows.

Thickness T of end face of light introducing section 65=0.31 mm

Thickness t of light guide plate main body 64=0.18 mm

Length s1 of upper surface of light introducing section 65=2.50 mm

Length s2 of light introducing section 65=3.19 mm

Inclination angle θ of inclined surface 67=15.3°

If the directivity converting pattern 68 is formed on the inclined surface 67, the enveloping surface passing the edge (e.g., ridge line) on the outer side of the directivity converting pattern 68, the enveloping surface passing the edge (e.g., valley line) on the inner side of the directivity converting pattern 68, or the enveloping surface passing the middle of the enveloping surface on the outer side and the enveloping surface on the inner side is assumed as the inclined surface 67 before given the directivity converting pattern, and a tilt of intersecting lines when the plane perpendicular to the upper surface of the light guide plate 63 intersects the inclined surface 67 obtained in such a manner is the inclination angle θ.

Figure 28:
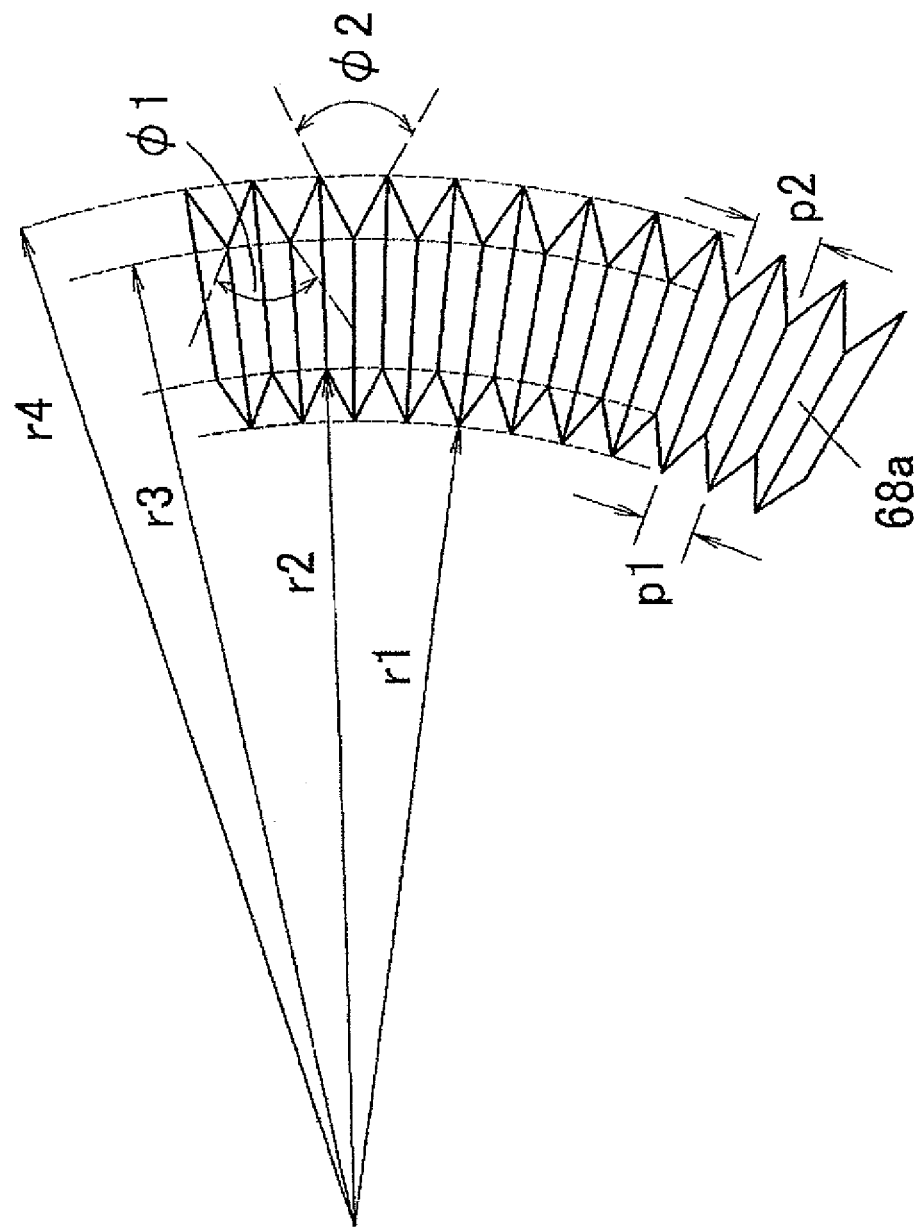
FIG. 28 is a view describing a dimension of the light introducing section of the surface light source apparatus according to the first embodiment.

Furthermore, as shown in FIG. 28, the envelope curve passing the upper end of each V-shaped groove structure 68a is a circular arc, a radius r1 of the envelope curve passing the upper end of the valley line is 2.50 mm, and a radius r2 of the envelope curve passing the upper end of the ridge line is 2.68 mm. The envelope curve passing the lower end of each V-shaped groove structure 68a is also a circular arc, a radius r3 of the envelope curve passing the lower end of the valley line is 2.98 mm, and a radius r4 of the envelope curve passing the lower end of the ridge line is 3.19 mm. A pitch p1 on the upper end side of the V-shaped groove structure 68a is 0.17 mm, and a pitch p2 on the lower end side of the V-shaped groove structure 68a is 0.20 mm. Furthermore, a vertex angle $\phi 1$ of the hill part in plan view at the lower end of the V-shaped groove structure 68a is 50°, and a vertex angle $\phi 2$ of the valley part in plan view at the lower end of the V-shaped groove structure 68a is 46.5°.

In the surface light source apparatus 61 of the first embodiment, the inclination angle θ of the inclined surface 67 is designed as a large angle such as 15.3°, and the thickness of the light guide plate main body 64 is thin or 0.18 mm. The leakage of light from the tapered portion cannot be prevented if the inclination angle and the thickness of the light guide plate main body are set to such values in the surface light source apparatus having a two-dimensional tapered portion of the related art, but the leakage of light at the light introducing section 65 can be prevented from occurring in the surface light source apparatus 61 of the present embodiment. The reason therefor will be described below.

In the surface light source apparatus 61 of the first embodiment, a three-dimensional tapered structure is configured by lining the V-shaped groove structures 68a. In other words, each surface (total reflection surface) of the directivity converting pattern 68 is rotatable not only about the y-axis but also about the z-axis. An inclined surface inclined three-dimensionally will now be considered.

Figure 29:
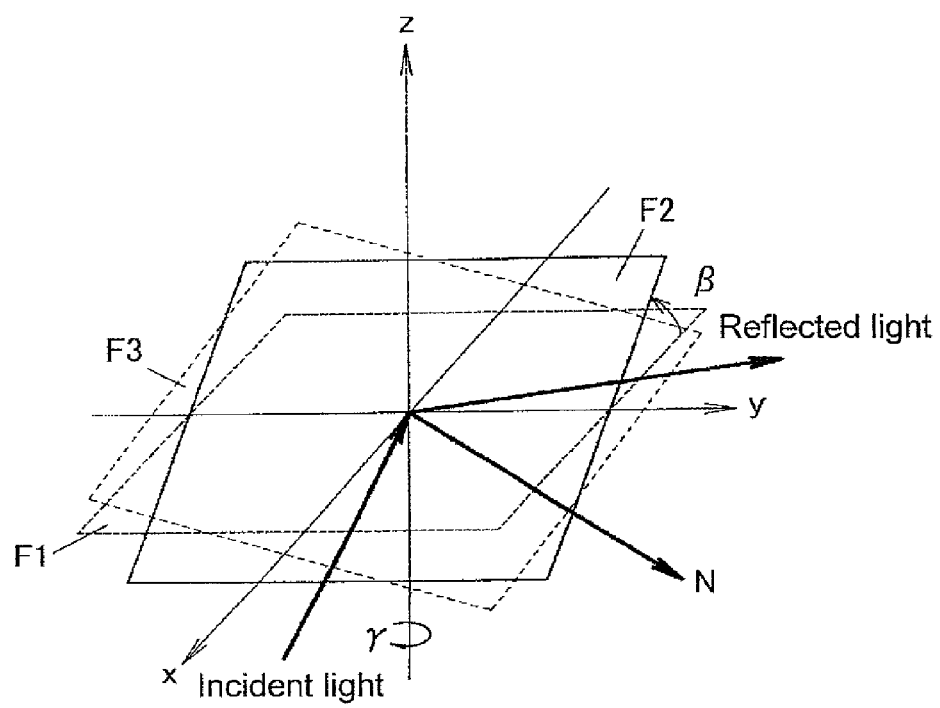
FIG. 29 is a view describing a method of specifying a direction of a tilted surface.

FIG. 29 is a view describing a method of specifying the direction of the tilted surface. In FIG. 29, a plane F1 represents a surface parallel to the xy plane. A plane F2 is such that the plane F1 is tilted by an angle β about the y-axis. A plane F3 is such that the plane F2 is rotated by an angle γ about the z-axis, and a normal line N is a normal line perpendicular to the plane F3. The plane directed in the arbitrary direction can be specified by the tilt (inclination angle) β about the y-axis and the rotation angle γ about the z-axis. For example, if β=0°, the plane F3 is the same as when not tilted, and the direction of the normal line N in this case is (0, 0, −1). If β=30°, and γ=0°, the direction of the normal line N is (−0.5, 0, −0.87).

Figure 32:
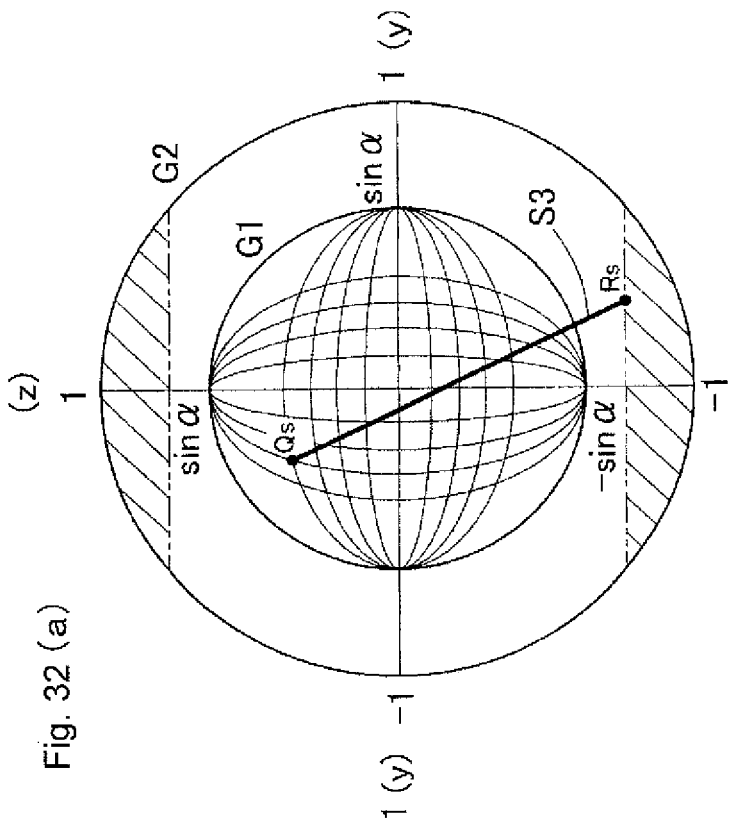
FIG. 32(a) is a view showing the directivity characteristics S3 of FIG. 31(b) in a yz plane of the direction cosine space.
FIG. 32(b) is a view showing the directivity characteristics S3 in an xy plane of the direction cosine space.
Figure 32:
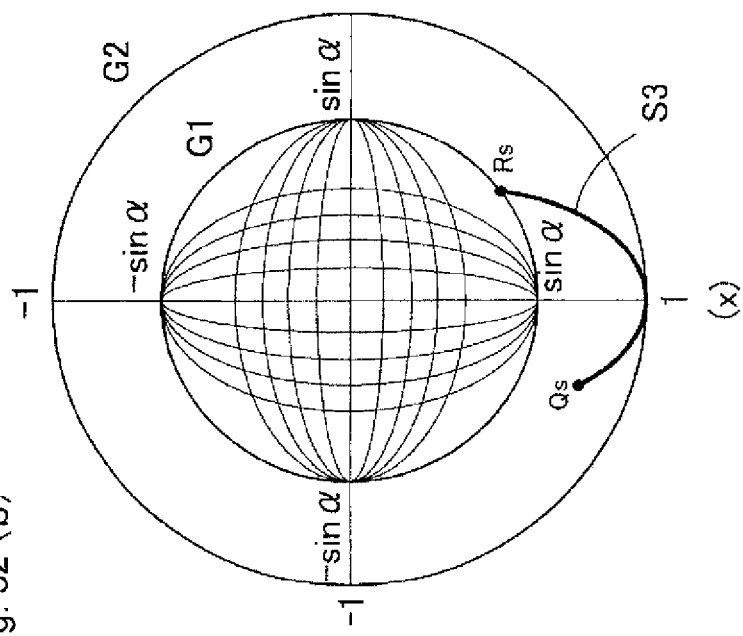

When the direction of the normal line N of the plane F3 changes, the directivity characteristics of the reflected light reflected at the surface F3 changes. Assuming a three-dimensional flat plane tilted by β about the y-axis as with the plane F3 shown in FIG. 30, and then rotated by γ about the z-axis as the inclined surface 57 of the tapered portion 55 of the light guide plate 52, the directivity characteristics rotates by totally reflecting at the inclined surface 57 of the tapered portion 55. That is, considering the directivity characteristics QR within the zx plane shown in FIG. 31(*a*) for the directivity characteristics S2 of the light entered to the tapered portion 55, the directivity characteristics S3 after such incident light is totally reflected at the inclined surface 57 of the three-dimensional tapered portion 55 expands to the lower side (Rs side) and rotates about the x-axis to be QsRs of FIG. 31(b). FIG. 32(a) shows the directivity characteristics S3 of FIG. 31(b) in the yz plane of the direction cosine space, and FIG. 32(b) shows the directivity characteristics S3 in the xy plane of the direction cosine space.

Figure 30:
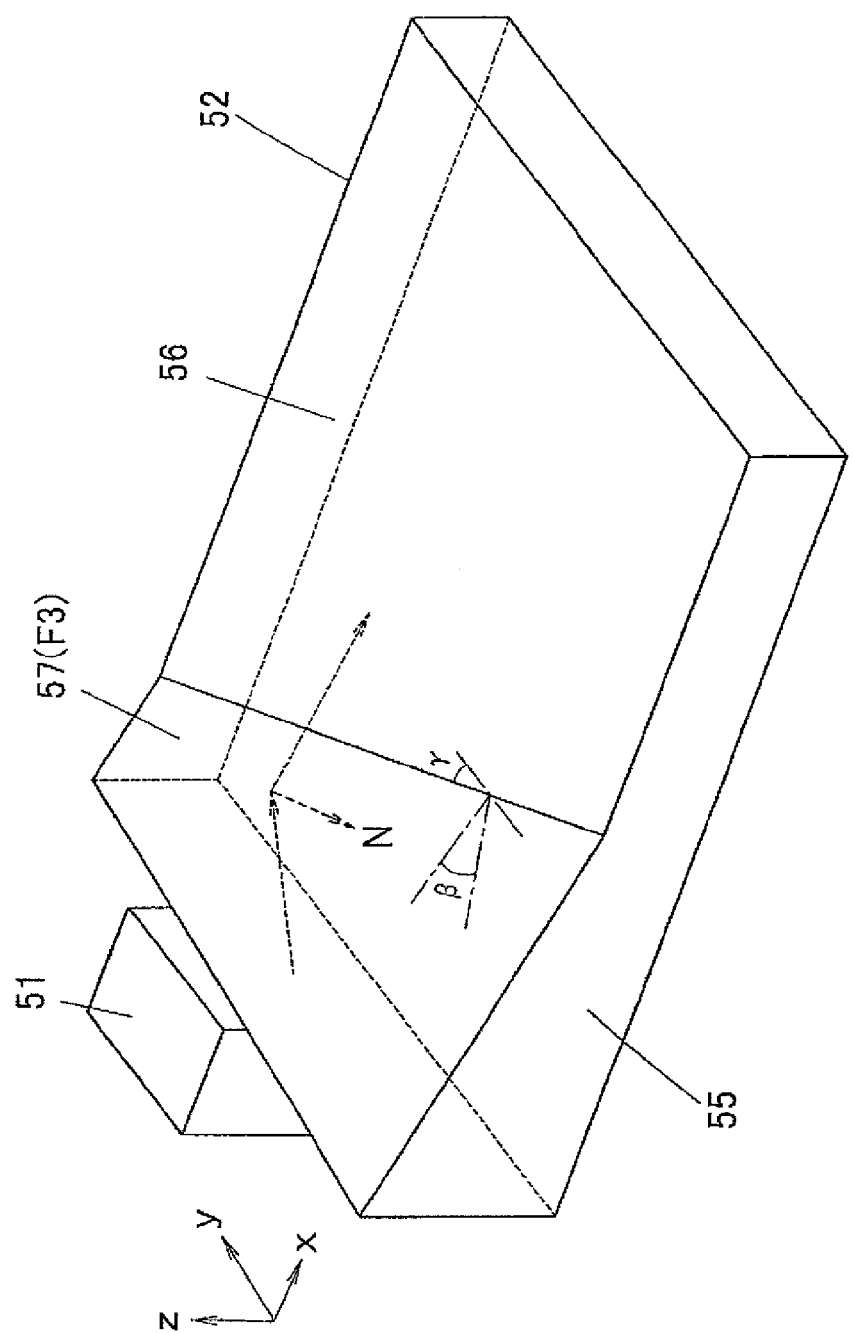
FIG. 30 is a perspective view of the surface light source apparatus including a three-dimensional tapered portion.

In the surface light source apparatus including the two-dimensional tapered portion 55 as shown in FIG. 17, the directivity characteristics S3 overlaps the sphere G1 having a radius of sin α in the xy plane of the direction cosine space and the light leaks, as shown in FIGS. 22(a) and 22(b), if the inclination angle θ of the inclined surface 57 is 15°. In the surface light source apparatus including the three-dimensional tapered portion 55 as shown in FIG. 30, on the other hand, the directivity characteristics S3 tilts about the x-axis even if the inclination angle β is the same 15° if the rotation angle γ about the z-axis is 55°, whereby the directivity characteristics S3 overlapping the sphere G1 in the xy plane of FIG. 22(b) tilts about the x-axis and no longer overlaps the sphere G1 as in FIG. 32(b). In other words, a point R″ of the directivity characteristics S3 that overlapped the sphere G1 in FIG. 22(b) moves to the edge of the sphere G1 as shown with a point Rs in FIG. 32(b). Therefore, according to the three-dimensional tapered portion, all of the light can be confined within the tapered portion by converting the directivity in the vertical direction of the yz plane to the horizontal direction, so that the leakage of light can be eliminated.

Generally, the leakage of light at the inclined surface 57 can be eliminated by choosing an appropriate rotation angle γ even if a large value is used for the inclination angle β of the inclined surface 57 for totally reflecting the light. This phenomenon is alleviated to an extent the incident angle of the light that hits the flat inclined surface 57 does not exceed the critical angle of total reflection since the inclination direction of the inclined surface of the tapered portion 55 changes when the inclined surface 57 of the tapered portion 55 is rotated by γ about the z-axis, and the light is reflected in the diagonal direction at the inclined surface.

Figure 33:
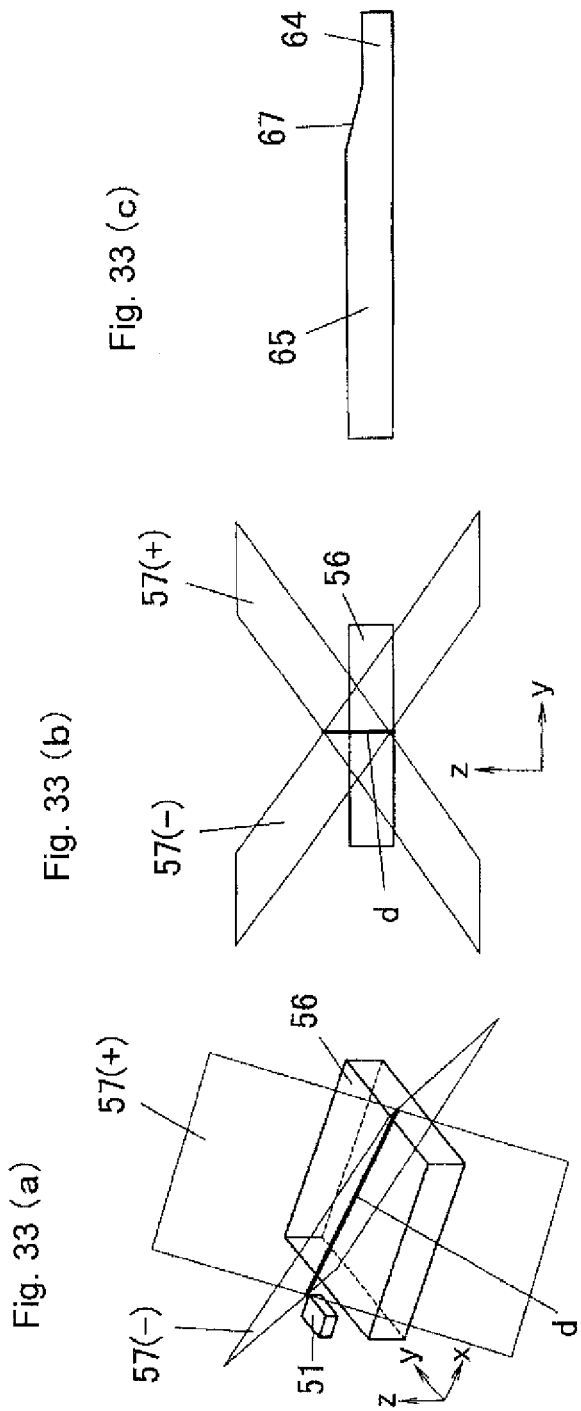
FIGS. 33(a) and 33(b) are views showing two inclined surfaces having a different rotation direction about a z-axis.
FIG. 33(c) is a view describing an inclined surface generated as an intersecting line of the two inclined surfaces.

With respect to the rotation angle γ about the z-axis, the same effect of preventing the light leakage is obtained even when rotated in any direction. For example, even if the inclined surface 57 is rotated +55° or rotated −55° about the z-axis, the effect is the same. As shown in FIGS. 33(a) and 33(b), the V-shaped groove structure 68a of the present embodiment can be formed by arranging the positive rotated inclined surface 57 (+) and the negative rotated inclined surface 57 (−) about the z-axis. Therefore, the directivity converting pattern 68 in which the V-shaped groove structures 68a are lined can be formed by determining the angles β, γ that can prevent the leakage of light, and alternately arranging the positive rotation inclined surface 57 (+) and the negative rotation inclined surface 57 (−), and the leakage of light can be prevented.

An intersecting line d of the positive rotated inclined surface 57 (+) and the negative rotated inclined surface 57 (−) is the ridge line or the valley line of the V-shaped groove structure 68a. FIG. 33(b) shows a state of the intersecting line d of the inclined surfaces 57 (+), 57 (−) when seen from the x-axis direction, where the intersecting line d is tilted with respect to the upper surface of the light guide plate main body 56. Therefore, if the directivity converting pattern 68 is formed by alternately arranging the inclined surfaces 57 (+), 57 (−), the inclined surface 67 of the same inclination angle as the intersecting line d, as shown in FIG. 33(c), can be obtained, the light guide plate main body 64 of small thickness can be formed at one inclined surface 67 and the light introducing section 65 of large thickness can be formed on the other inclined surface.

The orthogonal coordinates x, y, z are used in the above description of the directivity characteristics, but the x-axis direction can be reinterpreted as the light outputting direction (i.e., radial direction of cylindrical coordinate) since the light is radially emitted with the point light source 62 as the center if the point light source 62 is used. Therefore, the V-shaped groove structure 68a is not arranged in a straight line, but is arranged in an arcuate shape with the hit of the point light source 62 as the center, so that the surface light source apparatus 61 of the structure shown in FIG. 23 can be obtained.

Lastly, the expansion in the horizontal direction of the light emitted from the point light source 62 will be considered. The expansion in the horizontal direction (xy plane) of the light entered to the light introducing section 65 is 39° to both sides with the x-axis direction as the center, same as the directivity expansion in the vertical direction. Such directivity expansion in the horizontal direction does not need to be taken into consideration in the case of the two-dimensional tapered portion, but the directivity expansion in the horizontal direction needs to be taken into consideration in the three-dimensional tapered portion and the light guide plate 63 of the first embodiment since the light also performs total reflection within the xy plane.

However, according to a detailed review, confining all lights of directivity characteristics S2 having an expansion of ±39° in the vertical direction and the horizontal direction in the light introducing section 65 is not possible regardless of how the tilt of each surface of the V-shaped groove structure 68a is adjusted. Furthermore, according to a detailed review, the light can be confined in the light introducing section 65 if the directivity expansion in the horizontal direction of the light entered to the light introducing section 65 is limited to be smaller than or equal to ±20° with the x-axis as the center.

FIGS. 34(a), 34(b), and 34(c) are views showing a method of controlling the directivity expansion in the horizontal direction, and each shows a state of the directivity converting pattern 68 seen from the z-axis direction. In FIG. 34(c), an angle formed by a line segment connecting one end of the light outputting window 62a of the point light source 62 and the middle of the edge on the inner peripheral side of the directivity converting pattern 68, and a line segment connecting the middle of the light outputting window 62a and the middle of the edge on the inner peripheral side of the directivity converting pattern 68 is 40°. In this example, the dead space of the light guide plate 63 becomes small since the size of the directivity converting pattern 68 becomes small, but the leakage of light cannot be prevented.

In FIG. 34(a), an angle formed by a line segment connecting one end of the light outputting window 62a of the point light source 62 and the middle of the edge on the inner peripheral side of the directivity converting pattern 68, and a line segment connecting the middle of the light outputting window 62a and the middle of the edge on the inner peripheral side of the directivity converting pattern 68 is 20°. An angle formed by a line segment connecting the other end of the light outputting window 62a of the point light source 62 and the middle of the edge on the inner peripheral side of the directivity converting pattern 68, and a line segment connecting the middle of the light outputting window 62a and the middle of the edge on the inner peripheral side of the directivity converting pattern 68 is also 20°. In this example, the dead space of the light guide plate 63 becomes large since the size of the directivity converting pattern 68 becomes large.

However, the expansion in the horizontal direction of the light at the central part of the directivity converting pattern 68 becomes smaller than 20° due to the refraction when entering the light introducing section 65, and the expansion in the horizontal direction of the light becomes more smaller at the area deviated from the middle of the directivity converting pattern 68, whereby the leakage of light can be prevented with the entire directivity converting pattern 68. According to an experiment, if an angle anticipating from the middle of the inner peripheral edge of the directivity converting pattern 68 to both ends of the light outputting window 62*a* is 40° (±20°), Leakage light/input light≤2% is obtained.

Figure 34:
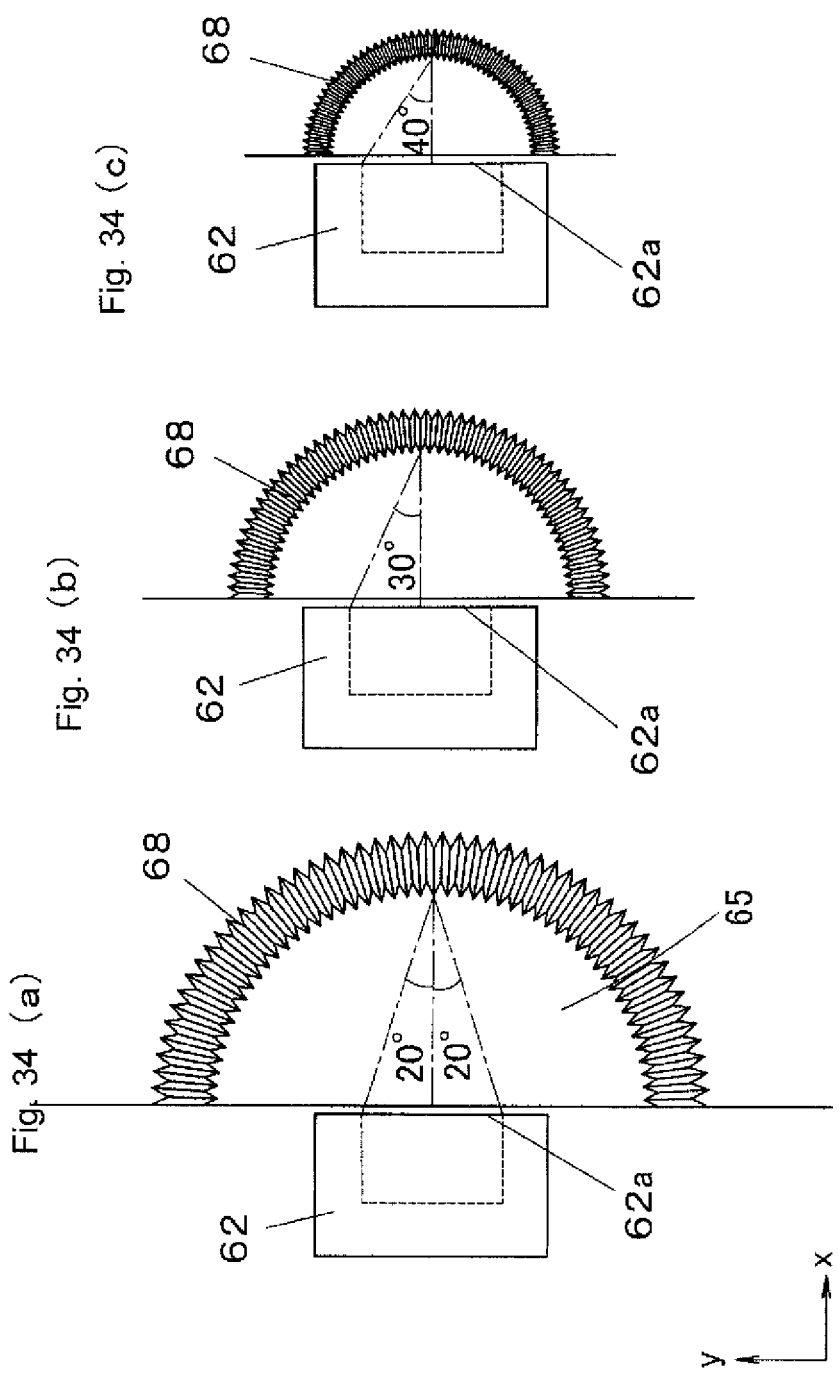
FIGS. 34(a), 34(b), and 34(c) are views showing a method of controlling a directivity expansion in a horizontal direction.

In FIG. 34(*b*), an angle formed by a line segment connecting the other end of the light outputting window 62*a* of the point light source 62 and the middle of the edge on the inner peripheral side of the directivity converting pattern 68, and a line segment connecting the middle of the light outputting window 62*a* and the middle of the edge on the inner peripheral side of the directivity converting pattern 68 is 30°. In this case, Leakage light/input light≤15% is obtained, which is inferior to the case of FIG. 34(*a*), but the effect of confining the light and the effect of reducing the dead space are obtained.

The angle maybe smaller than or equal to 20°, but the directivity converting pattern 68 become large and the dead space of the light guide plate 63 becomes large if the angle is too small, and thus a value close to 20° is desirable.

Figure 35:
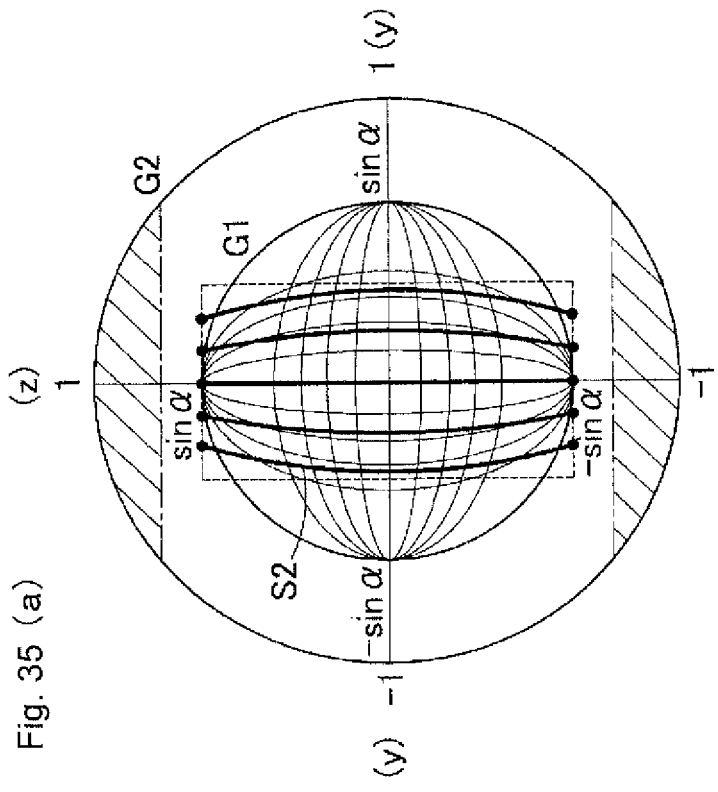
FIG. 35(a) is a view showing the directivity characteristics S2 taking into consideration the directivity expansion in the horizontal direction in the yz plane of the direction cosine space.
FIG. 35(b) is a view showing the directivity characteristics S2 in the xy plane of the direction cosine space.
Figure 35:
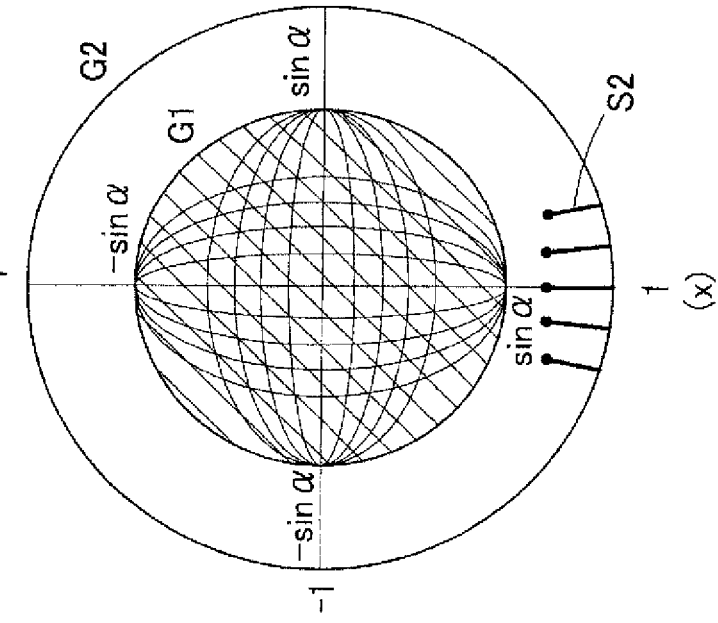
Figure 36:
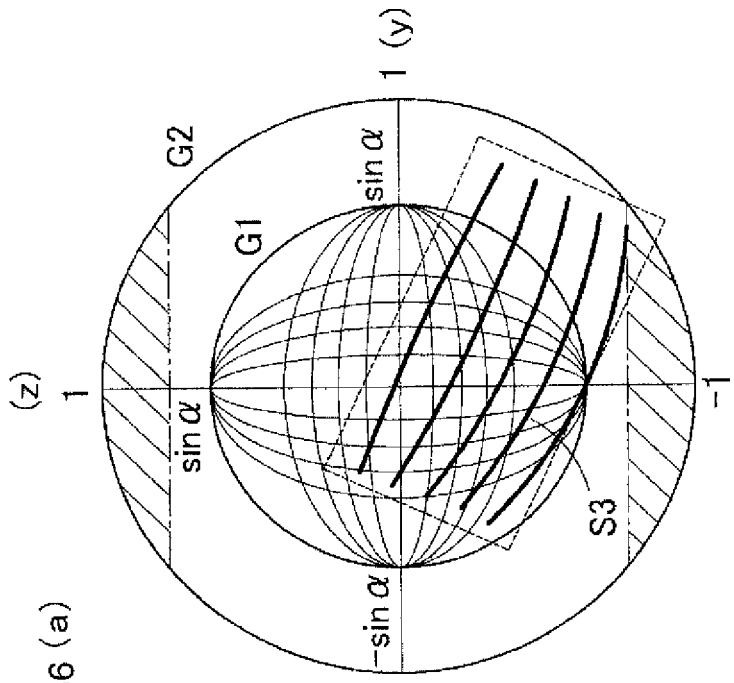
FIG. 36(a) is a view showing the directivity characteristics S3 taking into consideration the directivity expansion in the horizontal direction in the yz plane of the direction cosine space.
FIG. 36(b) is a view showing the directivity characteristics S3 in the xy plane of the direction cosine space.
Figure 36:
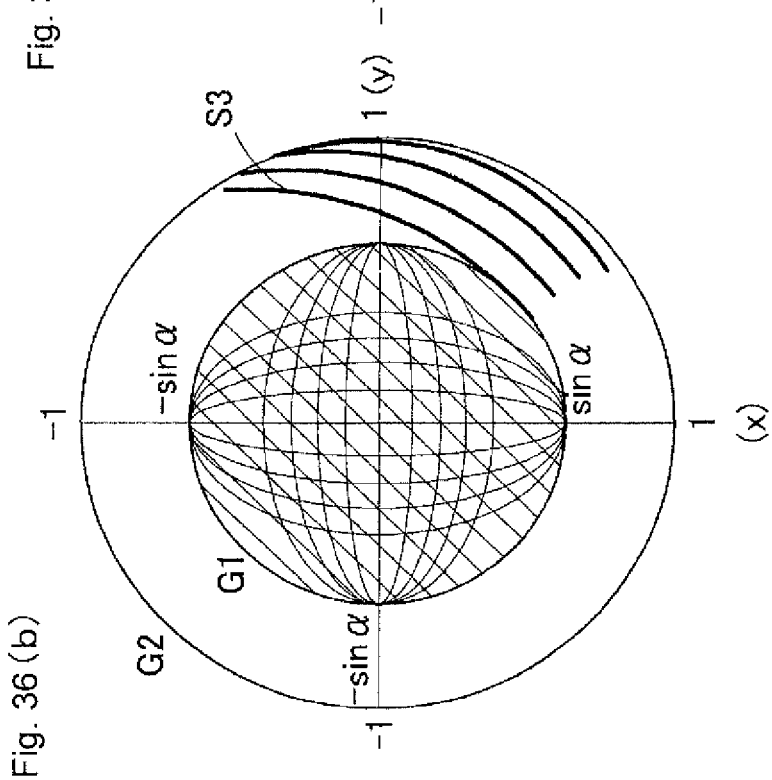

If the directivity expansion in the horizontal direction is limited such that the angle anticipating from the inner peripheral edge of the directivity converting pattern 68 to both ends of the light outputting window 62*a* becomes smaller than or equal to 40°, the directivity characteristics S2 of the light entered to the light introducing section 65 becomes as shown FIG. 35(*a*) and FIG. 35(*b*) in the direction cosine space. In this case, the directivity characteristics in the vertical direction is represented as a continuous curve, but the directivity characteristics in the horizontal direction is represented in a discontinuous manner. As apparent from FIG. 35(*a*), the expansion in the horizontal direction of the directivity characteristics S2 is small compared to the expansion in the vertical direction. Furthermore, FIG. 36(*a*) shows the direction characteristics S3 of the light totally reflected at the inclined surface 67 of the light introducing section 65 in the yz plane of the direction cosine space, and FIG. 36(*b*) shows the directivity characteristics S3 in the xy plane of the direction cosine space. As shown in FIG. 36(*b*), the directivity characteristics S3 deviates and does not overlap the sphere G1 having a radius sin α in the xy plane of the direction cosine space by having the expansion in the horizontal direction of the directivity characteristics S2 narrow. Therefore, the light entered to the light guide plate 63 can be confined in the light introducing section 65, and the leakage of light can be suppressed to a minimum.

FIGS. 37(*a*) and 37(*b*) shows the directivity characteristics S3, when the expansion of the light entered from the point light source 62 is 30° (expansion of 60° to both sides) as shown in FIG. 34(*b*), in the direction cosine space. In the direction cosine space of FIG. 37, one part of the light expansion horizontally overlaps the shaded region, and one part of the light expansion to greater than or equal to 20° leaks out. Through calculation, the leakage rate (=leakage light/input light) is about 15%. As shown in FIG. 34(*b*), the leakage of light occurs if the thickness of the light guide plate main body is reduced when the expansion of light is about 30° on one side, but it is to be put to practical use even with a slight leakage since reducing the dead space is also an important issue other than reducing the thickness in the demand of the surface light source apparatus 61.

A method of fabricating the light guide plate 63 including the directivity converting pattern 68 as above is as follows. First, a metal that is easy to process such as a Cu material is groove processed to a desired shape using a diamond bite to fabricate a master of the directivity converting pattern 68. Plating of Ni and the like is then performed with the master as the basis, and the plating is stripped from the master to obtain a stamper made of Ni. The stamper is then incorporated in a die for molding the light guide plate to simultaneously mold the directivity converting pattern 68 and the light guide plate. Alternatively, the light guide plate including the projection is molded, and thereafter, an ultraviolet curable resin is applied on the inclined surface of the projection and pushed with the stamper, and the ultraviolet curable resin is irradiated with an ultraviolet ray to mold the directivity converting pattern 68 separate from the light guide plate.

The connecting portion (i.e., ridge line or valley line between inclined surface 57 (+) and inclined surface 57 (−)) of the surfaces in the directivity converting pattern 68 may be an earl surface in view of actual molding drip and the like. Since the leakage of light tends to easily occur beyond a control range of a certain surface of a design idea the larger the earl between the surfaces in the directivity converting pattern 68, the earl is desirably as small as possible, and the connecting portion between the surfaces is ideally an acute angle. However, having the connecting portion between the surfaces as an acute angle is not possible in actual processing, whereby the size of the earl varies and a product with a large earl is also produced if the earl is formed by the molding drip. The die and the stamper may be processed such that the curvature radius of the cross-section of the earl surface is about 1 μm, so that even if the earl surface is formed, the formed earl surface is even. The leakage of light at the light introducing section 65 thus can be suppressed to Leakage light/input light≤10% even if an earl of about a radius of 1 μm is provided.

Second Embodiment

Figure 38:
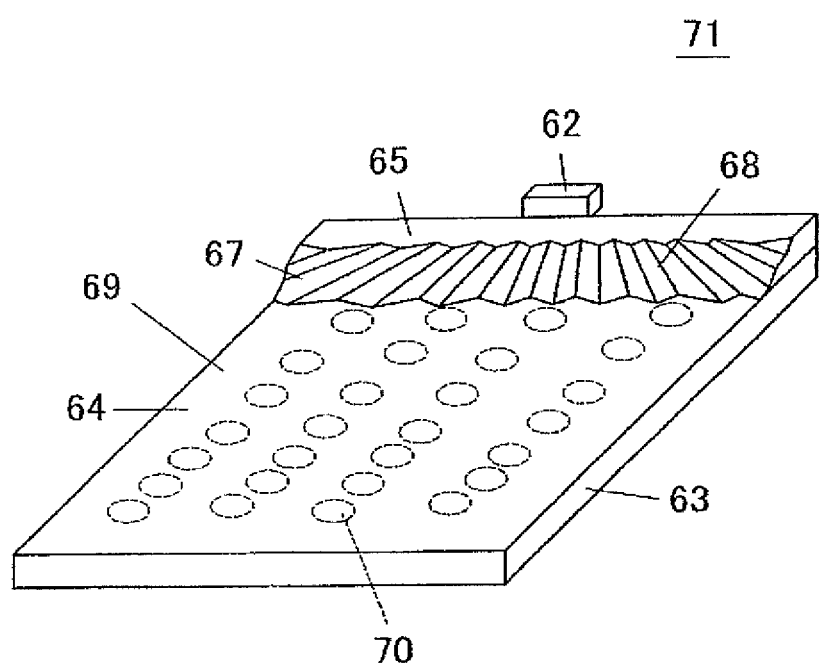
FIG. 38 is a perspective view showing a surface light source apparatus according to a second embodiment of the present invention.
Figure 39:
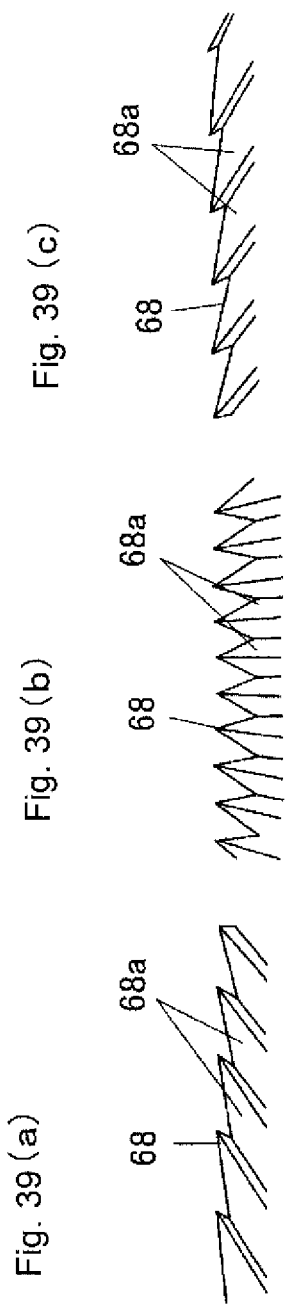
FIG. 39(a) is a schematic view showing a shape of one part of a V-shaped groove structure at a left end portion of a directivity converting pattern.
FIG. 39(b) is a schematic view showing a shape of one part of the V-shaped groove structure at a central part of the directivity converting pattern.
FIG. 39(c) is a schematic view showing a shape of one part of the V-shaped groove structure at a right end portion of the directivity converting pattern.

FIG. 38 is a perspective view showing a surface light source apparatus 71 according to a second embodiment of the present invention. In the surface light source apparatus 71, the envelope curves on the upper end side and the lower end side of the directivity converting pattern 68 respectively have a linear shape. In other words, the light introducing section 65 is formed over the entire width of the end of the light guide plate 63, and the directivity converting pattern 68 is formed over the entire inclined surface of a plane shape of the light introducing section 65. However, the V-shaped groove structure 68*a* arranged in the directivity converting pattern 68 is arranged to radially extend with the point light source 62 as the center when seen from a direction perpendicular to the light outputting surface 69. FIG. 39(*a*) shows a shape of the V-shaped groove structure 68*a* of the left end portion of the directivity converting pattern 68, FIG. 39(*b*) shows a shape of the V-shaped groove structure 68*a* of the central part of the directivity converting pattern 68, and FIG. 39(*c*) shows a shape of the V-shaped groove structure 68*a* of the right end portion of the directivity converting pattern 68.

Figure 40:
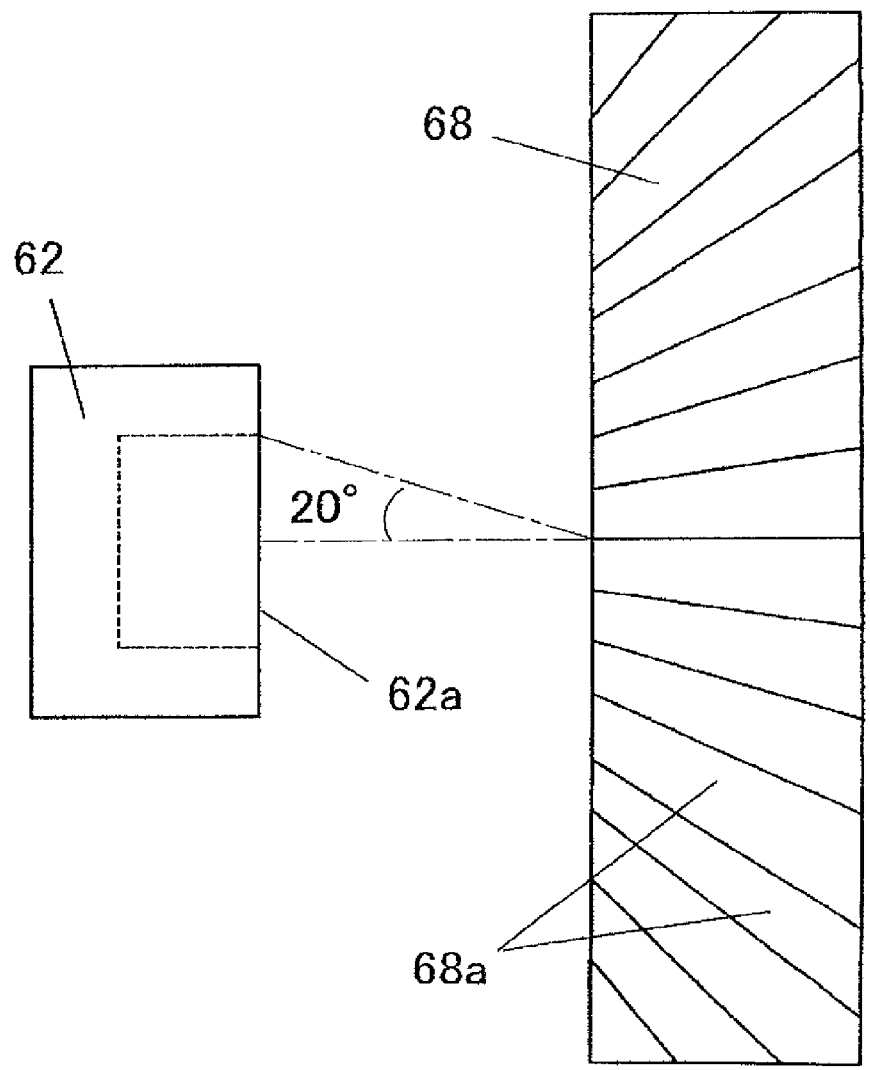
FIG. 40 is a view showing an angle anticipating from an edge on the light source side of the directivity converting pattern to a middle of the light outputting window.

The directivity converting pattern 68 of such a mode is also designed similar to that of the first embodiment. In other words, as shown in FIG. 40, an angle formed by a line segment connecting one end of the light outputting window 62*a* of the point light source 62 and the middle of the edge on the inner peripheral side of the directivity converting pattern 68, and a line segment connecting the middle of the light outputting window 62a and the middle of the edge on the inner peripheral side of the directivity converting pattern 68 is smaller than or equal to 20°, and preferably 20° at the middle of the directivity converting pattern 68. This angle is determined by a distance between the point light source 62 and the envelope curve on the upper end side of the directivity converting pattern 68 and the width of the light outputting window 62a. However, the pitch of the V-shaped groove structure 68a changes depending on a location, where the pitch of the V-shaped groove structure 68a is short at the central part of the directivity converting pattern 68 and the pitch of the V-shaped groove structure 68a becomes longer toward the end of the directivity converting pattern 68.

In such a surface light source apparatus 71, the length of the V-shaped groove structure 68a at the central part of the directivity converting pattern 68 and the length of the V-shaped groove structure 68a at the end of the directivity converting pattern 68 differ, where the length of the V-shaped groove structure 68a at the end is longer. Thus, the light easily reciprocates and enters the V-shaped groove structure 68a twice toward the end, and the leakage of light tends to easily occur. Thus, the efficiency is lower than the first embodiment, but an effect of Leakage light/input light≤10% is obtained.

Figure 41:
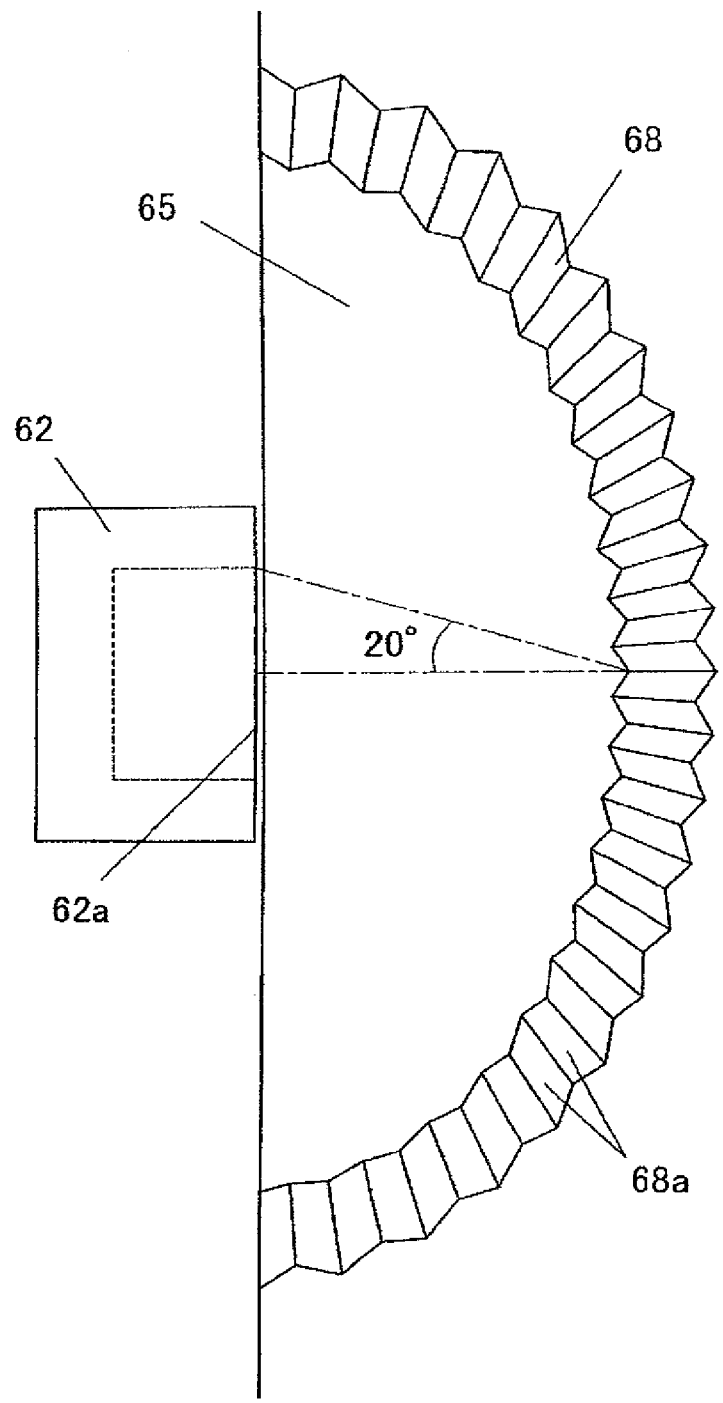
FIG. 41 is a schematic view describing a variant of the second embodiment.

FIG. 41 is a schematic view describing a variant of the second embodiment. In this variant, the envelope curve of the directivity converting pattern 68 is formed to an elliptical shape. Therefore, the shape of the directivity converting pattern 68 itself is not particularly limited, but it should be recognized that the V-shape structure 68a is to be radially formed with the point light source 62 as the center and the directivity expansion in the horizontal direction is to be smaller than or equal to 40°.

Third Embodiment

Figure 42:
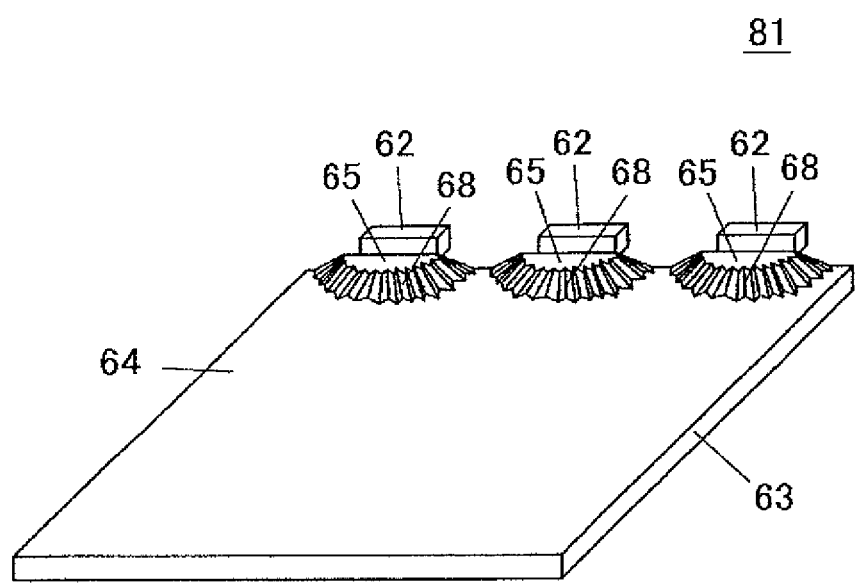
FIG. 42 is a perspective view showing a surface light source apparatus according to a third embodiment of the present invention.

FIG. 42 is a perspective view showing a surface light source apparatus 81 according to a third embodiment of the present invention. The surface light source apparatus 81 includes a plurality of point light sources 62, and a plurality of light introducing sections 65 is arranged facing each point light source 62. The adjacent directivity converting patterns 68 may interfere with each other if the plurality of light introducing sections 65 is arranged, and thus the light introducing sections 65 are preferably arranged at an inter-center pitch of about 5 to 10 mm. In such an embodiment, the surface light source apparatus 81 can be made brighter since a plurality of point light sources 62 is used.

Figure 43A:
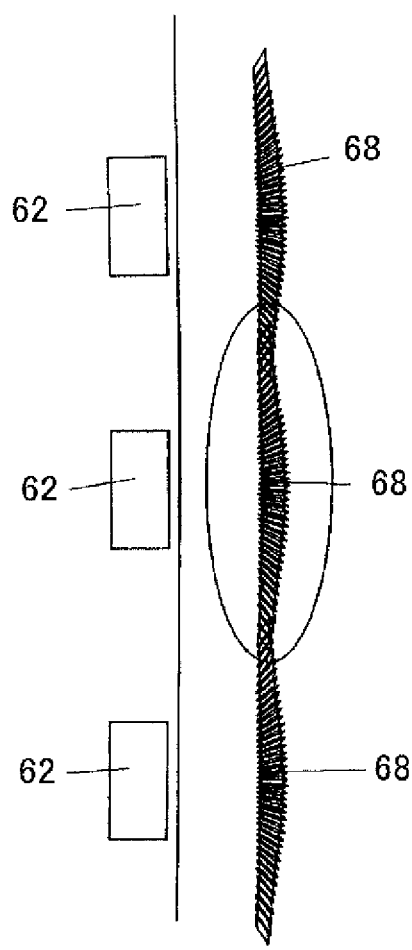
FIG. 43(a) is an explanatory view describing a variant of the surface light source apparatus according to the third embodiment.
Figure 43B:
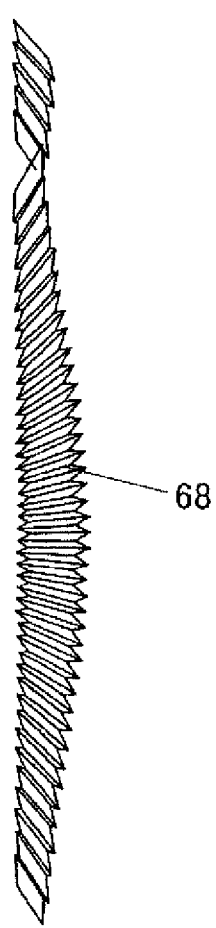
FIG. 43(b) is an enlarged view of a portion surrounded with a circle of FIG. 43(a).

FIG. 43(a) is an explanatory view describing a variant of the surface light source apparatus according to the third embodiment, and FIG. 43(b) is an enlarged view of a portion surrounded with a circle of FIG. 43(a). In this variant, the arrangement pitch of the point light sources 62 is 10 mm, the envelope curve on the upper end side of the directivity converting pattern 68 is made linear, and the envelope curve on the lower end side of the directivity converting pattern 68 is made in an arcuate shape. The adjacent directivity converting patterns 68 may slightly overlap each other. In such a variant, the efficiency of Leakage light/input light≤5% is realized.

Fourth Embodiment

Figure 44:
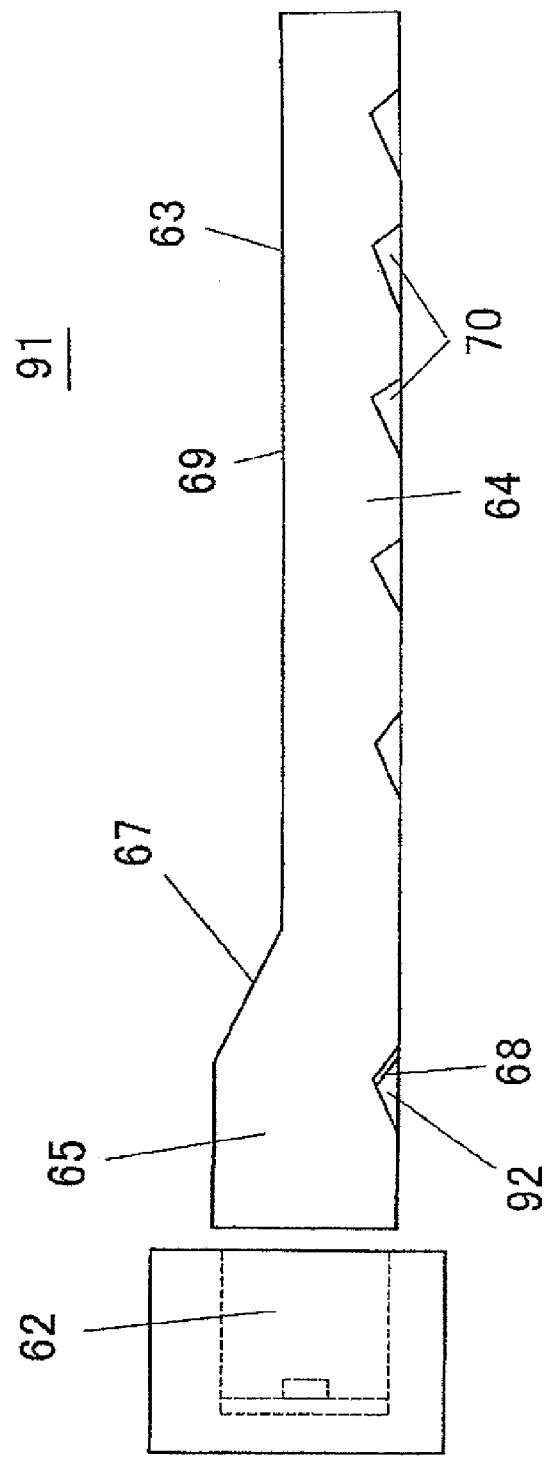
FIG. 44 is a schematic cross-sectional view showing a surface light source apparatus according to a fourth embodiment of the present invention.

FIG. 44 is a schematic cross-sectional view showing a surface light source apparatus 91 according to a fourth embodiment of the present invention. In this embodiment, the inclined surface 67 of the light introducing section 65 is a flat surface without a pattern. A concave portion 92 having a triangular cross-section is formed in the light introducing section 65 on the side opposite to the surface including the inclined surface 67 of the light guide plate 63 and at a position closer to the point light source 62 than the inclined surface 67, and the directivity converting pattern 68 in which the V-shaped groove structure 68a is arranged is formed on the slanted surface of the concave portion 92.

According to such an embodiment, the light from the point light source 62 can be efficiently confined, Leakage light/input light≤2% can be obtained, and the thickness of the surface light source apparatus 81 can be reduced. In such an embodiment, however, the directivity converting pattern 68 is on the light source side, the inclined surface 67 is arranged in a direction far from the light source, and the dead space becomes wider than in the first embodiment.

Figure 45:
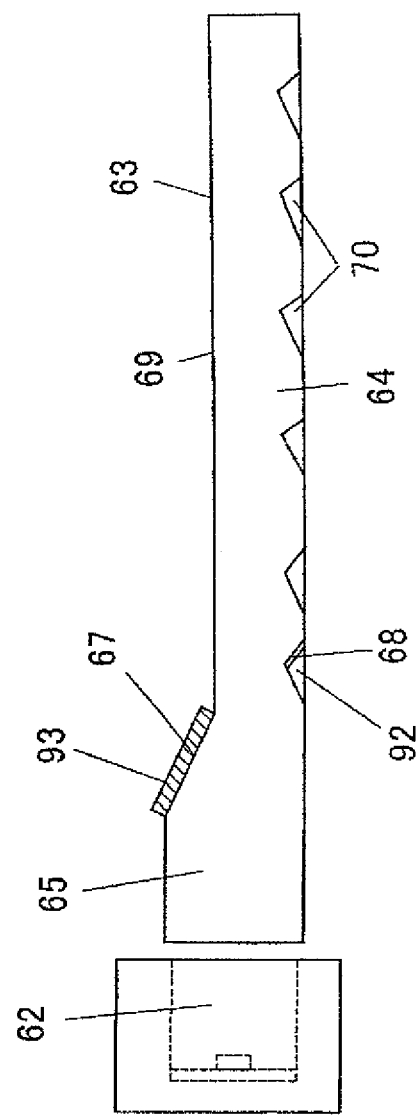
FIG. 45 is a schematic cross-sectional view showing a variant of the fourth embodiment.
Figure 46:
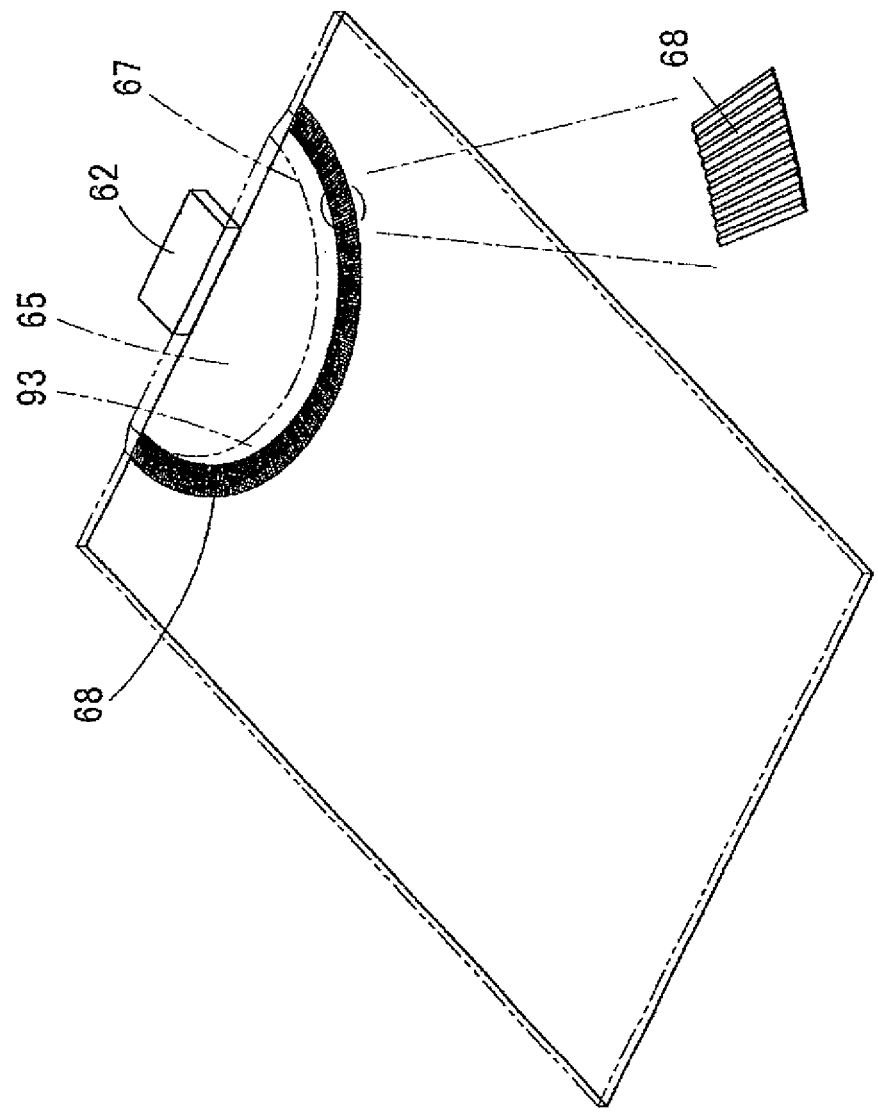
FIG. 46 is a schematic view showing a directivity converting pattern arranged on a back surface of a light guide plate in the variant.

FIG. 45 and FIG. 46 are variants of the forth embodiment, where a reflection plate 93 is attached to the flat inclined surface 67, the directivity converting pattern 68 is arranged at a position distant from the point light source 62 than the reflection plate 93 at the surface opposite to the inclined surface 67, and the directivity converting pattern 68 is included in the light guide plate main body 64. In this embodiment, the light leaked from the inclined surface 67 is reflected at the reflection plate 93, and can be reentered to the light introducing section 65. However, since light is absorbed by an adhesive tape and the like attaching the reflection plate 93, a loss occurs in such a variant, and Leakage light/input light≤10% is obtained.

Figure 47:
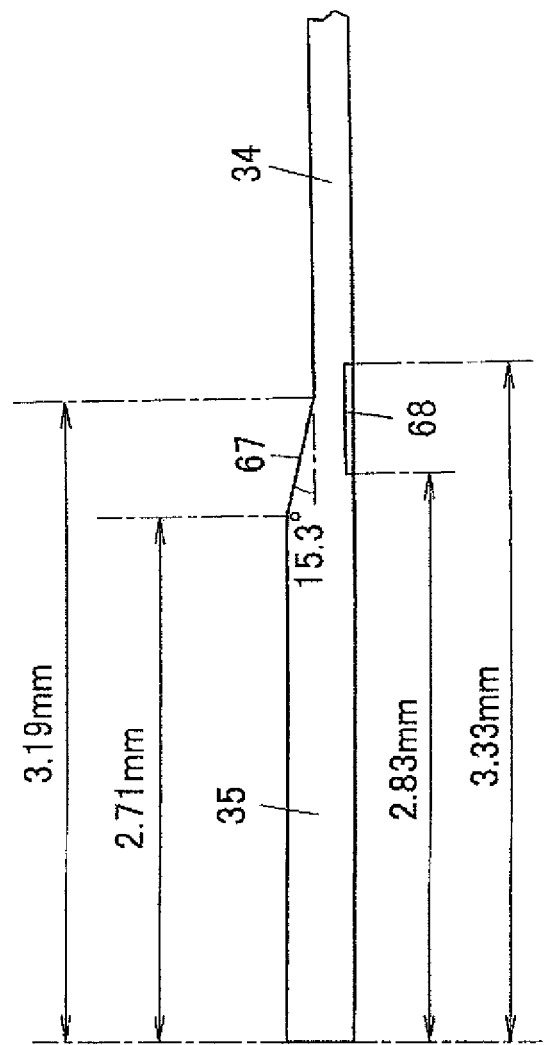
FIG. 47 is a view showing a numerical value example for simulation of the variant of FIG. 45.
Figure 48:
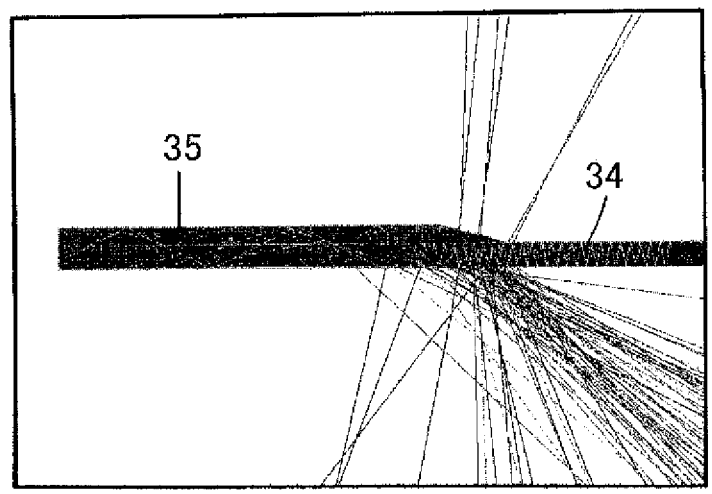
FIG. 48(a) is a view showing a result obtained by simulating a behavior of a light ray in the variant of FIG. 45.
FIG. 48(b) is a view showing a result obtained by simulating a behavior of a light ray in a comparative example in which a directivity converting pattern is not provided.
Figure 48:
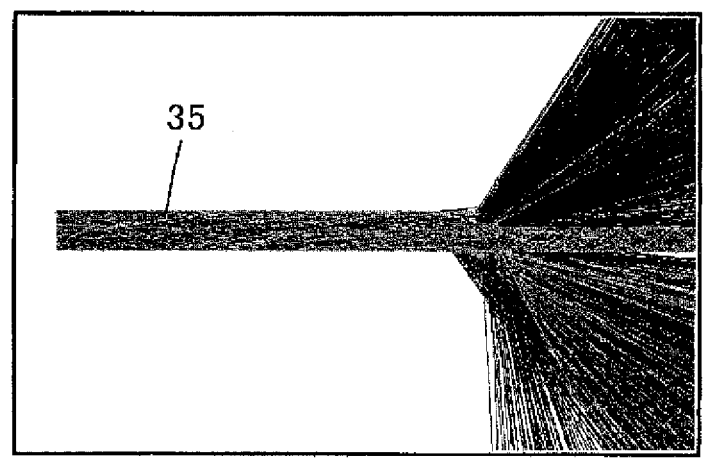

FIG. 48(a) is a view showing a result of simulating a behavior of a light ray when the directivity converting pattern 68 is included in the light guide plate main body 64 on the back surface side of the light guide plate 63 as in FIGS. 45 and 46. FIG. 48(b) is a view showing a result of simulating a behavior of a light ray in a comparative example in which the directivity converting pattern is only on the inclined surface 67 and not on the front surface side nor the back surface side. In the simulation of FIGS. 48(a) and 48(b), the radius of the upper surface of the light introducing section 65 is 2.71 mm, the radius to the edge of the inclined surface 67 is 3.19 mm, and the inclination angle of the inclined surface 67 is 15.3°, as shown in FIG. 47. In the simulation of FIG. 48(a), the radius to the edge on the point light source side of the directivity converting pattern 68 is 2.83 mm, the radius to the edge on the side distant from the point light source of the directivity converting pattern 68 is 3.33 mm, and the directivity converting pattern 68 has the V-shaped groove structure 68a having a vertex angle (φ3) of 120° radially extending with the point light source 62 as the center. The light rays shown in FIGS. 48(a) and 48(b) represent the light rays radially outputted in the different directions deviated from the cross-section and not only those within the illustrated cross-section.

Comparing FIG. 48(a) and FIG. 48(b), the leakage of light is significant in the comparative example of FIG. 48(b), but the leakage of light is small in the embodiment of FIG. 48(a) in which the directivity converting pattern 68 is arranged on the back surface. The loss due to the leakage of light is 10% in the case of FIG. 48(a).

Figure 49:
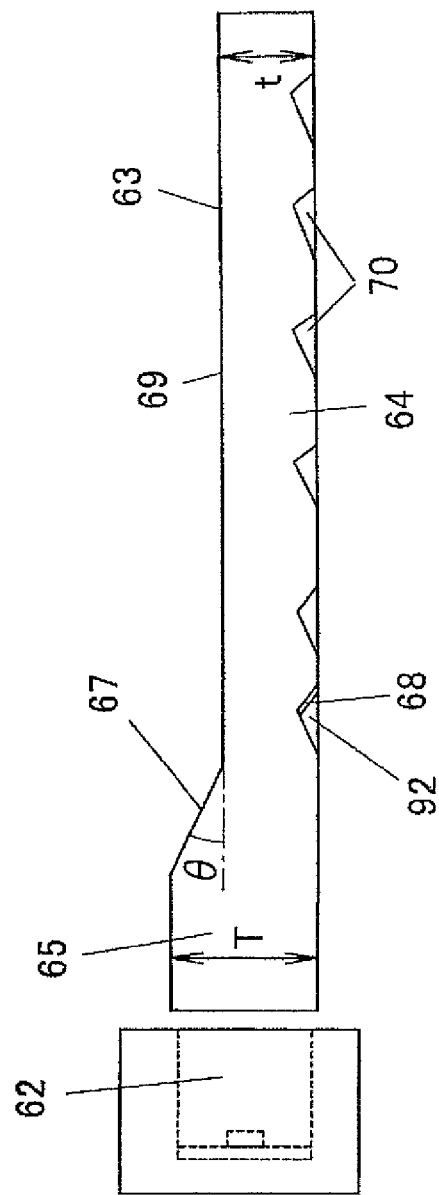
FIG. 49 is a schematic cross-sectional view showing another variant of the fourth embodiment.

FIG. 49 is a cross-sectional view showing another variant of the fourth embodiment of the present invention, and the reflection plate 93 is excluded from the inclined surface 67 in the mode of FIG. 45 in which the directivity converting pattern 68 is on the light guide plate main body 64 side. In this variant, the index of refraction of the light guide plate 63 is 1.59 and the inclination angle θ of the inclined surface 67 is smaller than or equal to 12.1° so that the light does not leak out from the inclined surface 67 even when the reflection plate 93 is removed. If the reflection plate 63 is omitted, the inclination angle θ of the inclined surface 67 become small compared to when the reflection plate 93 is arranged, and thus the dead space becomes large by the light introducing section 65 or the thickness of the light guide plate main body 64 becomes thick with the same dead space (light introducing section 65) if the thickness of the light introducing section 65 and the thickness of the light guide plate main body 64 are the same. Specifically, if the thickness of the light introducing section 65 is T=0.31 mm and the thickness of the light guide plate main body 64 is t=0.18 mm, the dead space becomes large by about 5% (0.14/3) if each thickness is the same, and the thickness t of the light guide plate main body 64 becomes thicker by 16% (0.029/0.18) if the dead space is the same. The member to be attached to the inclined surface 67 is unnecessary if the reflection plate 93 is omitted, and thus this variant may be adopted if there are spare dead space and thickness.

Figure 50:
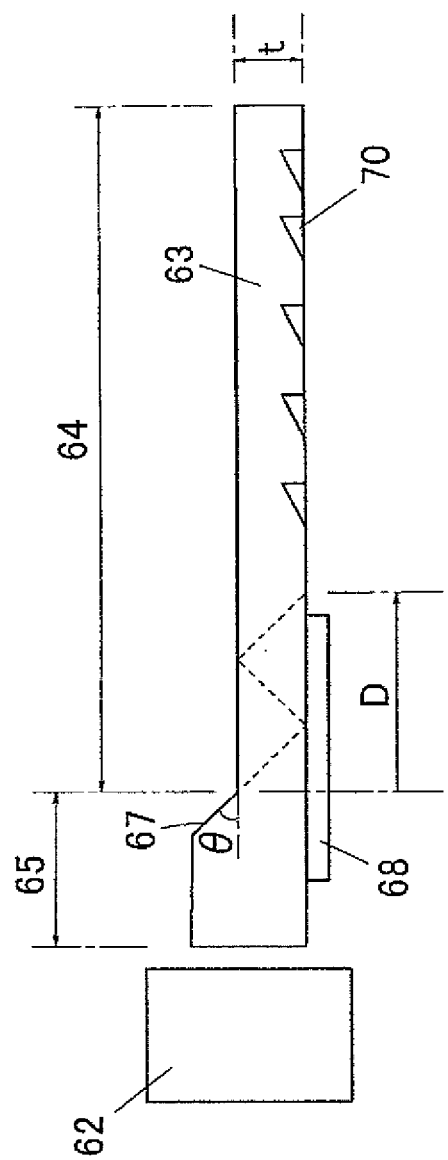
FIG. 50 is a view showing a region arranged with the directivity converting pattern on a surface of a side opposite to the inclined surface of the light guide plate.

FIG. 50 shows a range capable of arranging the directivity converting pattern 68 at the surface on the opposite side of the surface arranged with the inclined surface 67 of the light guide plate 63. The directivity converting pattern 68 maybe arranged over the light introducing section 65 and the region adjacent to the light introducing section 65 of the light guide plate main body 64. Specifically describing, if the thickness of the light guide plate main body 64 is t and the inclination angle of the inclined surface is 0, the directivity converting pattern 68 desirably does not project to the light guide plate main body 64 by greater than or equal to the next distance D toward the light guide plate main body 64 side from the boundary of the inclined surface 67 (light introducing section 65) and the light guide plate main body 64.

$$D=(3 \cdot t)/\tan \theta \quad \text{(equation 11)}$$

If the inclined surface 67 is formed in a form of steps or a curved surface as in FIGS. 53(b) and 53(c), the inclination angle θ is defined by a slope of a line connecting a starting point (upper end) and an ending point (lower end) of the inclined surface 67 when calculating the inclination angle θ. Furthermore, in the case of the inclined surface 67 of step-form as in FIG. 53(b), the maximum inclination angle of the inclination angle of each step is preferably set to an angle the light does not leak out other than the inclination angle as a whole. In the case of the inclined surface 67 of curved surface form as in FIG. 53(c), the maximum inclination angle of the inclination angle (e.g., inclination angle of a tangent line of each point) of the curved portion is preferably set to an angle the light does not leak out. If the shape of the inclined surface 67 of step-form or the curved surface form is set so that some of the light leaks out, adverse effects arise in the bright light due to lowering in efficiency and light leakage, but problems do not arise if the extent thereof is a permissible extent. Furthermore, the inclination angle θ when the inclined surface 67 is linear and not arcuate as in FIG. 38 has a different value of the inclination angle θ for each direction (direction within xy plane seen from point light source 62), and thus the inclination angle θ for each direction is defined as the respective inclination angle θ.

This is due to the following reasons. The light entering the light guide plate main body 64 the most among the light entering the back surface of the light guide plate 63 after being reflected at the inclined surface 67 is light parallel to the inclined surface 67, as the light shown with a broken line in FIG. 50. When such light is reflected by the directivity converting pattern 68 at greater than or equal to 2 degrees, the light leaks out to the outside of the light guide plate 63, and thus the end of the directivity converting pattern 68 is desirably drawn to the point light source 62 side than the position entering the back surface of the light guide plate 53 the second time. The position the light enters the back surface of the light guide plate 63 the second time is a distance of D=(3·t)/tan θ measured from the end of the light guide plate main body 64, as is apparent from FIG. 50. The directivity converting pattern 68 is thus desirably in the region within D measured from the end of the light guide plate main body 64 to prevent the light of greater than or equal to 2 degrees from entering the directivity converting pattern 68. If the directivity converting pattern 68 is formed in a concentric band shape as in FIG. 26, the distance D becomes equal in any direction two-dimensionally, and a concentric circle distant by D to the outer side from the end of the light guide plate main body 64 is formed. If the directivity converting pattern 68 is formed on the linear inclined surface 67 as in FIG. 38, the inclination angle θ changes depending on the direction seen from the point light source 62 in the region deviated from the front direction of the point light source 62, and becomes smaller as the deviation from the front surface becomes larger with the front direction (x-axis direction) of the point light source 62 as a maximum. Therefore, by applying the equation 11, the distance D is the smallest in the front direction and becomes larger as the deviation from the front surface becomes larger. As a result, the line connecting the destination of the distance D extended in each direction is formed to be longer toward the outer side.

If the projecting length of the directivity converting pattern 68 to the light guide plate main body 64 is smaller than or equal to D, the directivity converting pattern 68 may be within the display area of the liquid crystal panel. Since the directivity converting pattern 68 is not a pattern for emitting light to the outside, problems do not arise even if the directivity converting pattern 68 is within the display area.

Fifth Embodiment

Figure 51:
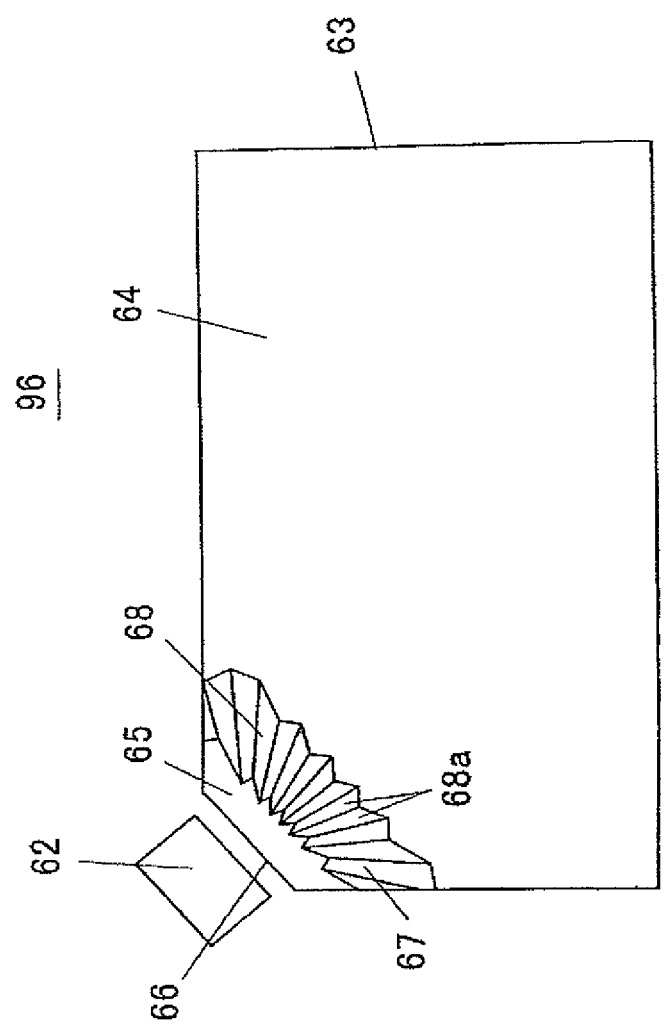
FIG. 51 is a schematic plan view showing a surface light source apparatus according to a fifth embodiment of the present invention.

FIG. 51 is a schematic plan view showing a surface light source apparatus 96 according to a fifth embodiment of the present invention. In this embodiment, the corners of the light guide plate main body 64 are cut diagonally, and the light introducing section 65 is formed linearly along the edge of the cut ends. The inclined surface 67 of such a light introducing section 65 is formed with the directivity converting pattern 68 by a plurality of V-shaped groove structures 68a arranged radially.

Sixth Embodiment

Figure 52:
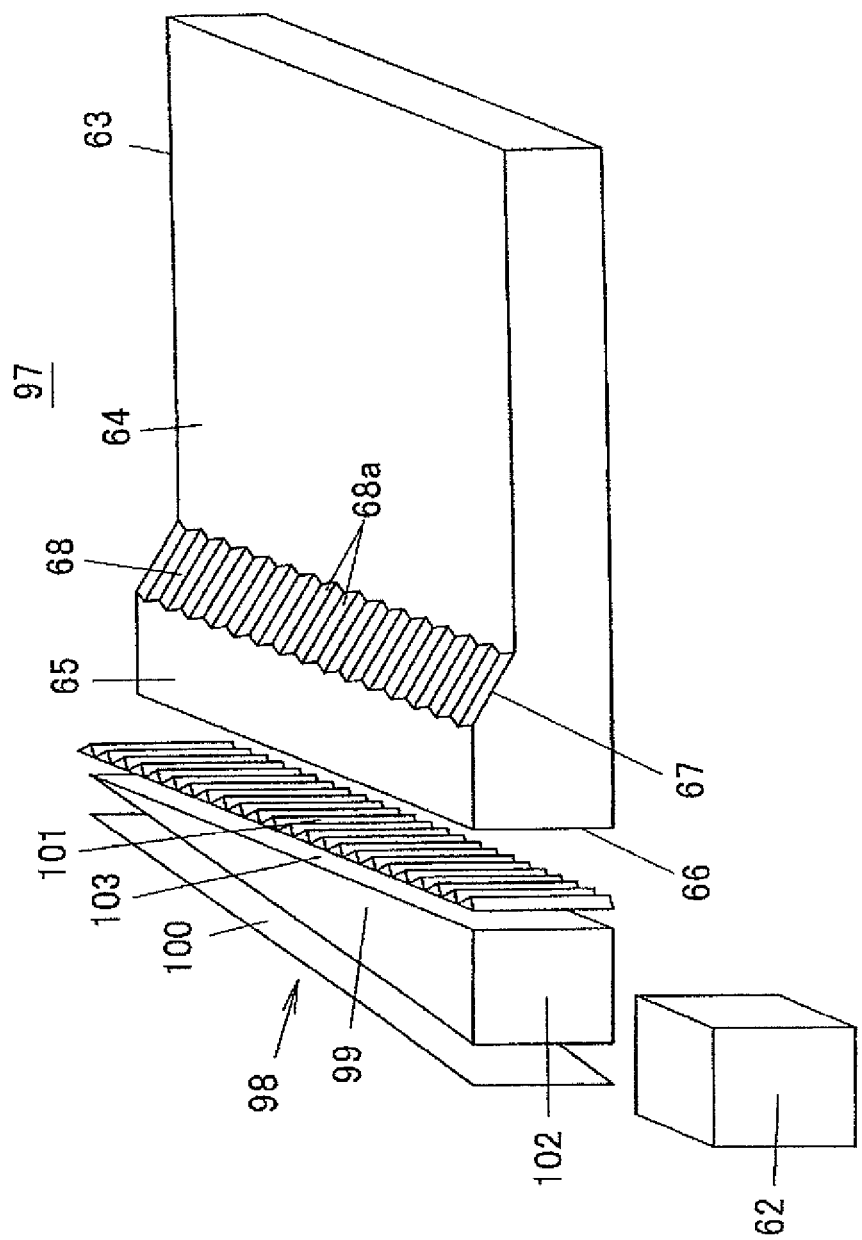
FIG. 52 is a perspective view showing a surface light source apparatus according to a sixth embodiment of the present invention.

FIG. 52 is a perspective view showing a surface light source apparatus 97 according to a sixth embodiment of the present invention. In this embodiment, the light introducing section 65 is arranged linearly along one end side of the light guide plate main body 64. The point light source 62 and a linear light source 98 using a wedge-shaped light guide body 99 are arranged at positions facing the light incident end face 66 of the light introducing section 65. The linear light source 98 has the point light source 62 arranged facing the incident surface 102 of the wedge-shaped light guide body 99 made of transparent resin, a prism sheet 101 arranged facing the outputting surface 103 of the wedge-shaped light guide body 99, and a specular reflection plate 100 arranged facing the opposite surface thereof.

The light emitted from the point light source 62 thus enters the wedge-shaped light guide body 99 from the incident surface 102, and expands over the entire length of the wedge-shaped light guide body 99 while totally reflecting at the outputting surface 103 of the wedge-shaped light guide body 99 and the opposite surface thereof. The light leaked out from the back surface of the wedge-shaped light guide body 99 in the middle is specular reflected at the specular reflection plate 100 and reentered to the wedge-shaped light guide body 99. The light entered to the outputting surface 103 at an incident angle smaller than a critical angle of total reflection is outputted in a direction substantially parallel to the outputting surface 103. The light outputted from the outputting surface 103 of the wedge-shaped light guide body 99 transmits through the prism sheet 101 and has the light ray direction bent, and is outputted in a direction substantially perpendicular to the outputting surface 103 of the wedge-shaped light guide body 99.

Since substantially parallel light is emitted from the linear light source 98 and introduced into the light guide plate 63, the inclined surface 67 of the light introducing section 65 also becomes linear in accordance therewith. The V-shaped groove structure 68a of the directivity converting pattern 68 arranged on the surface light source apparatus 97 is also arranged parallel to each other.

Others

Figure 53:
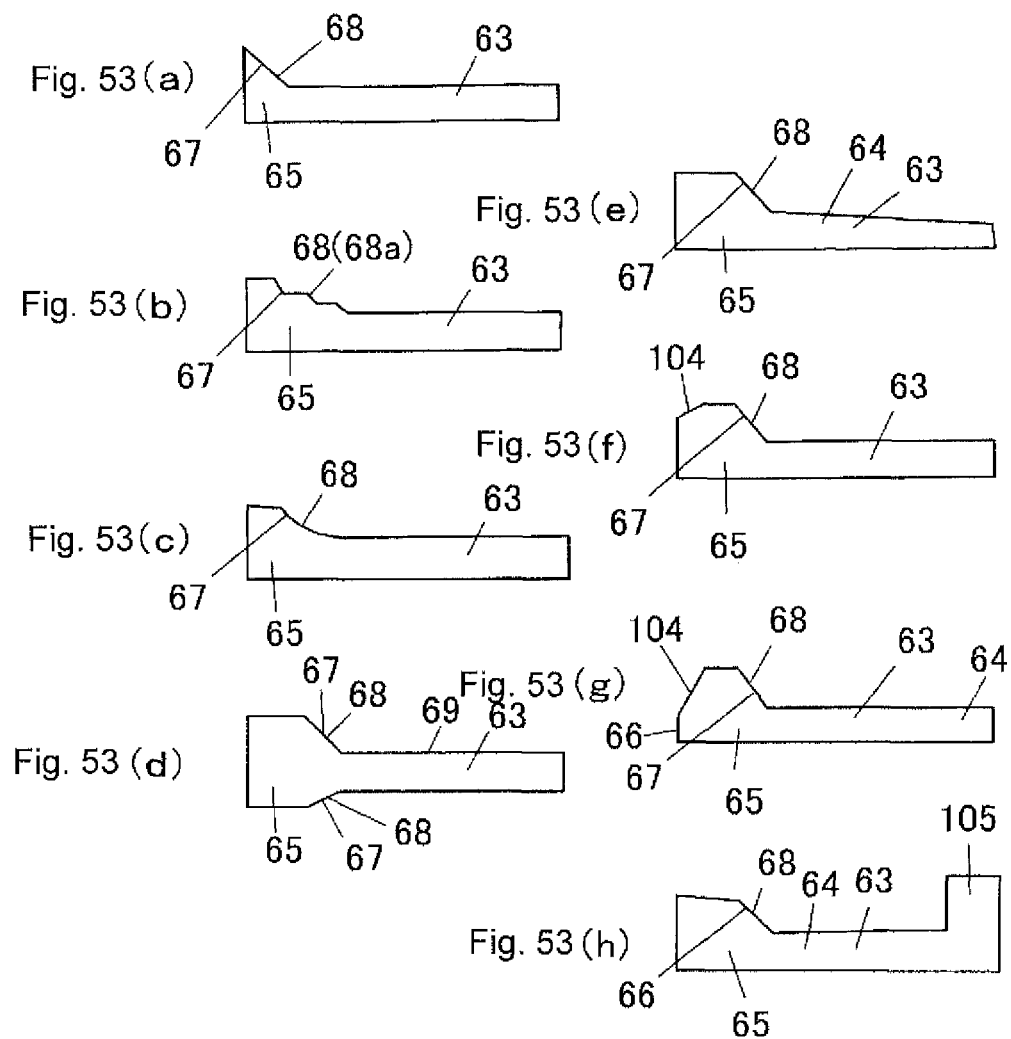
FIGS. 53(a) to 53(h) are schematic views showing various other shapes of the light guide plate.

FIGS. 53(*a*) to 53(*h*) show other shapes of the light guide plate 63. In the light guide plate shown in FIG. 53(*a*), the upper surface of the light introducing section 65 does not have a flat portion, and is configured only by the inclined surface 67.

In the light guide plate shown in FIG. 53(*b*), the inclined surface 67 of the light introducing section 65 is not linear when seen at a cross-section perpendicular to the light outputting surface and has a step form. The directivity converting pattern 68 in which the V-shaped groove structure 68a is lined is formed on the inclined surface 67 formed in a step form.

In the light guide plate shown in FIG. 53(*c*), the inclined surface 67 of the light introducing section 65 is formed by a curved surface. The directivity converting pattern 68 in which the V-shaped groove structure 68a is lined is formed in the curved inclined surface 67.

In the light guide plate shown in FIG. 53(*d*), the projection of the light introducing section 65 is projected to the light outputting surface side and the surface on the opposite side thereof of the light guide plate 63, and the directivity converting pattern 66 is arranged on both surfaces. In this case, the inclination angle of the inclined surface 67 maybe different for the front and the back.

In the light guide plate 63 shown in FIG. 53(*e*), the light guide plate main body 64 is formed in a wedge-shape so as to become thinner the farther from the light source side.

In the light guide plate 63 shown in FIG. 53(*f*), an inclined surface 104 inclined to an inverse tapered shape is arranged on the light source side end of the light introducing section 65.

Figure 54:
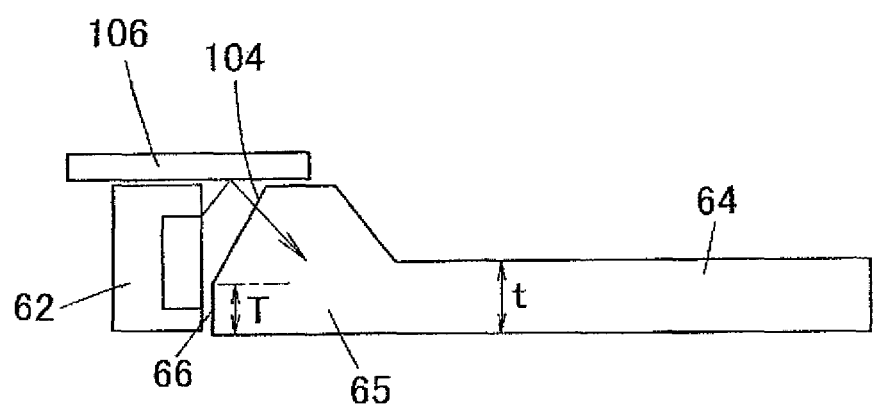
FIG. 54 is a schematic view showing a usage mode of the light guide plate shown in FIG. 53G.

In particular, as shown in FIG. 53(*g*), the height of the end face (light incident end face 66) of the light introducing section 65 may be smaller than the thickness of the light guide plate main body 64 by arranging the inverse tapered inclined surface 104. As shown in FIG. 54, if the height T of the light incident end face 66 is smaller than the thickness t of the light guide plate main body 64, the light outputting window of the point light source 62 runs out to the outside of the light incident end face 66 and the light leaks outside, whereby a loss of light occurs. However, the light outputted to the outside of the light incident end face 66 from the point light source 62 can be reflected at the reflection sheet 106 and can be entered from the inclined surface 104 to the light introducing section 65 by covering the gap between the upper surface of the point light source 62 and the upper surface of the light introducing section 65 with a member for reflecting the light from the point light source 62 such as the reflection sheet 106.

Therefore, the present invention can be applied not only when the thickness of the light incident end face 66 of the light introducing section 65 is larger than the thickness of the light guide plate main body 64 but also when the thickness of the light incident end face 66 of the light introducing section 65 is smaller than the thickness of the light guide plate main body 64 as long as the maximum thickness of the light introducing section 65 is greater than the thickness of the light guide plate main body 64.

In the light guide plate 63 shown in FIG. 53(*h*), the projection 105 (rib) is arranged at the end on the side opposite to the light introducing section 65 of the light guide plate main body 64, and one part of the light guide plate 63 is made larger than the thickness of the light introducing section 65.

Seventh Embodiment

In the embodiments described above, a method of eliminating the leakage of light from the light guide plate by a more or less precise structure has been considered, but a more generalized principle will be described below. In other words, the leakage of light at the inclined surface 67 or a vicinity thereof can be reduced if the directivity of the light reflected at the directivity converting pattern 68 is expanded in a direction orthogonal to the light source direction (direction connecting with the center of the point light source 62) (i.e., directivity in the vertical direction is expanded in the horizontal direction). This principle will be described below.

To simplify the description, a case in which the directivity converting pattern 68 is arranged on a surface on the side opposite to the inclined surface 67 will be described (see e.g., FIG. 49). Assume that the inclination angle of the inclined surface 67 is set to an angle that the light does not leak out (e.g., inclination angle of inclined surface 67 is 12.1° if index of refraction of light guide plate 63 is 1.59).

The light entered to the light introducing section 65 has conical directivity characteristics (see FIG. 13(*a*)), but the directivity characteristics of the light entered to a certain point positioned in the x-axis direction is the directivity characteristics shown in FIG. 55(*a*) when seen from the z-axis direction perpendicular to the light guide plate 63 (see FIG. 19(*b*)). The concave portion and/or convex portion (hereinafter referred to as convex-concave structure 68b) configuring the directivity converting pattern 68 has a shape of isotropically diffusing light as with the cone, as shown in plane in FIG. 56(*a*) and in cross-section in FIG. 56(*b*) (only one convex-concave structure 68b is shown). When the light from the point light source 62 enters the conical convex-concave structure 68b, to which direction the light reflected at the convex-concave structure 68b only once is directed is obtained by calculation in FIG. 55(*b*). FIG. 55(*b*) also shows the direction cosine space seen from the z-axis direction. The light reflected in an f1 region of FIG. 56(*a*) is outputted to an f1 region of FIG. 55(*b*), the light reflected in an f2 region of FIG. 56(*a*) is outputted to an f2 region of FIG. 55(*b*), and the light reflected in an f3 region of FIG. 56(*a*) is outputted to an f3 region of FIG. 55(*b*). In the direction cosine space, the light rays in the circle G2 on the inner side leaks to the outside of the light guide plate 63, and thus the light reflected at the inclined plane (f1 region) on the side opposite to the point light source 62 of the convex-concave structure 68b leaks to the outside. The light reflected at the region (inclined plane on light source side) surrounded with a heavy line in FIG. 56(a) of the f2, f3 regions includes those that hit the inclined plane on the side opposite to the point light source 62. Thus, when the light hits the inclined plane of the convex-concave structure 68b twice, the light becomes the light that leaks out to the outside of the light guide plate 63, and thus it is not preferable to reflect the light in such regions. The convex-concave structure 68b configuring the directivity converting pattern 68 includes the V-shaped groove structure 68a.

As described above, in FIG. 56(a), the light reflected at the inclined plane (f1 region) on the side opposite to the point light source and the light reflected at the inclined plane on the point light source side surrounded with the heavy line are lights that leak outside, and the light of other regions is the light that does not leak outside. Therefore, in order to reduce the light that leaks outside, the proportion of the region where the light leaks of the convex-concave structure 68b is to be reduced and the other regions are to be made large. In other words, the convex-concave structure 68b is to be extended so as to be long in the direction (light source direction) connecting with the center of the point light source 62, as shown in FIGS. 57(a) and 57(b).

Figure 58A:
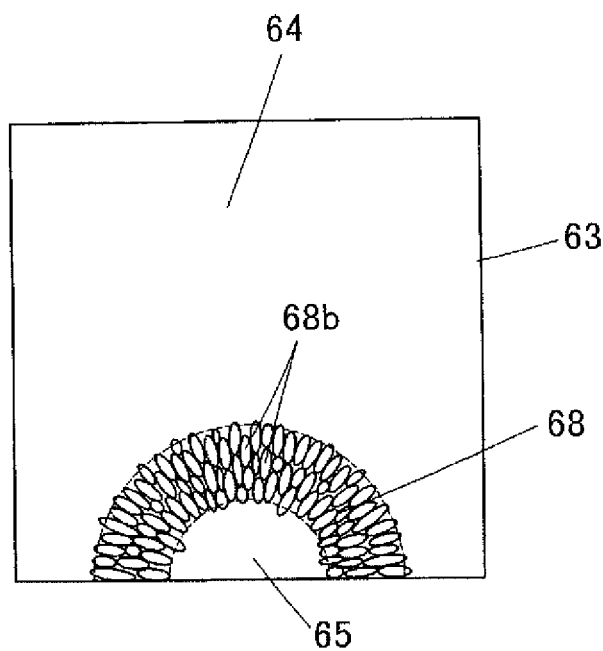
FIG. 58(a) is a schematic plan view of the light guide plate including the directivity converting pattern for expanding the directivity of light in a direction orthogonal to a light source direction.
Figure 58B:
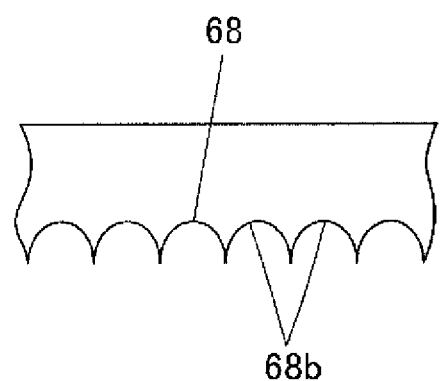
FIG. 58(b) is an enlarged cross-sectional view of the directivity converting pattern.
Figure 59A:
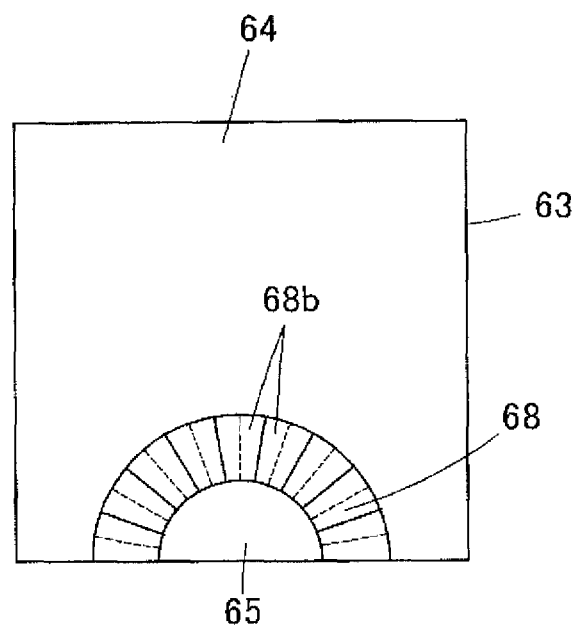
FIG. 59(a) is a schematic plan view of the light guide plate including a different directivity converting pattern for expanding the directivity of light in the direction orthogonal to the light source direction.
Figure 59B:
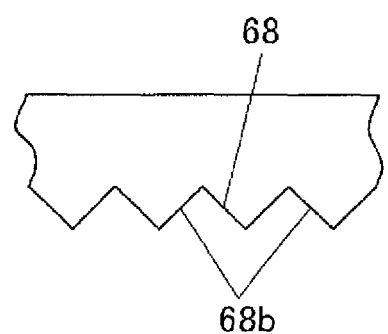
FIG. 59(b) is an enlarged cross-sectional view of the directivity converting pattern.
Figure 60A:
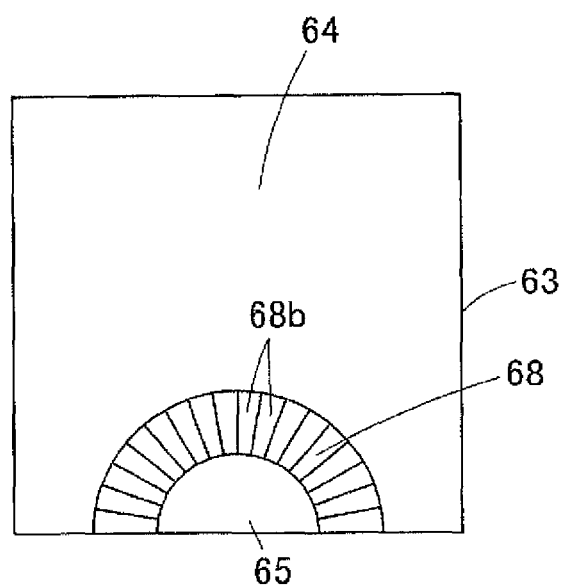
FIG. 60(a) is a schematic plan view of the light guide plate including another further directivity converting pattern for expanding the directivity of light in the direction orthogonal to the light source direction.
Figure 60B:
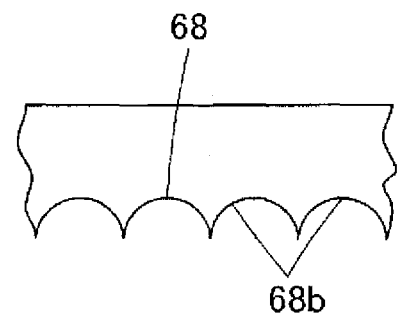
FIG. 60(b) is an enlarged cross-sectional view of the directivity converting pattern.
Figure 61A:
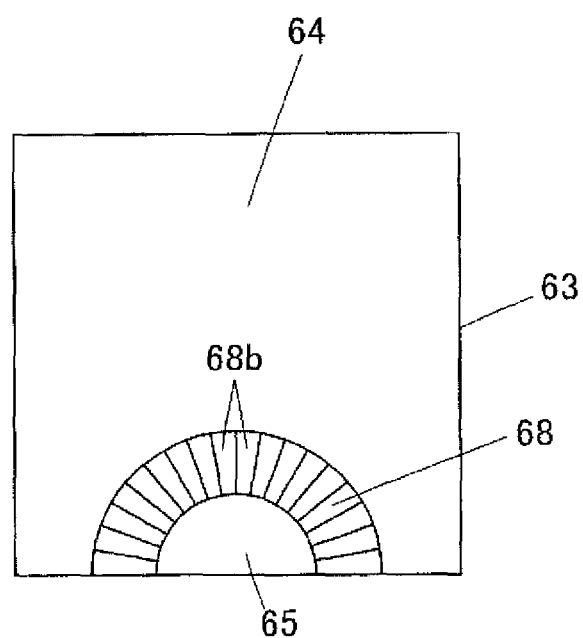
FIG. 61(a) is a schematic plan view of the light guide plate including another further directivity converting pattern for expanding the directivity of light in the direction orthogonal to the light source direction.
Figure 61B:
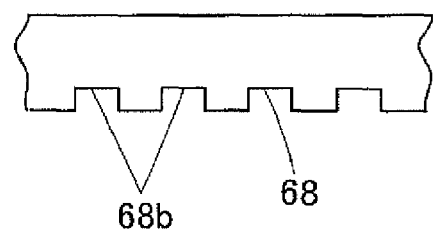
FIG. 61(b) is an enlarged cross-sectional view of the directivity converting pattern.
Figure 62:
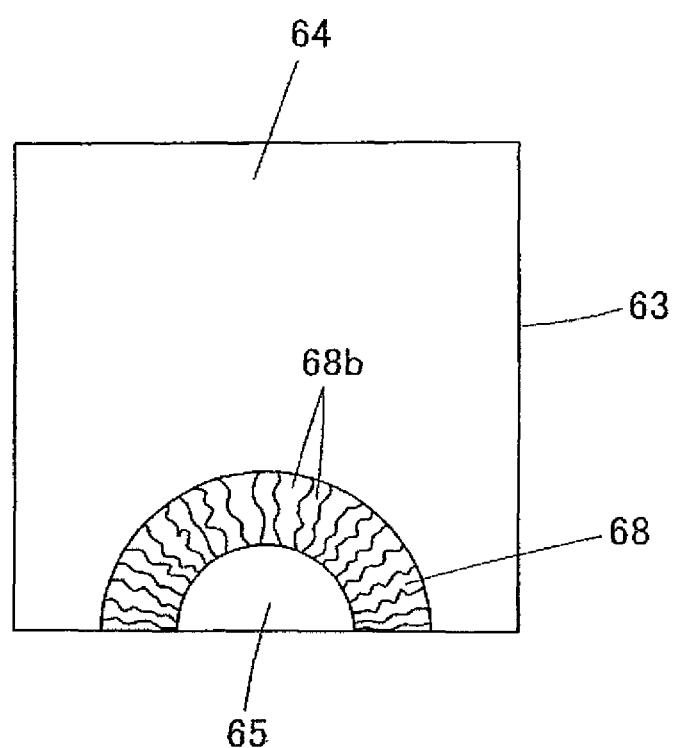
FIG. 62 is a schematic plan view of the light guide plate including another further directivity converting pattern for expanding the directivity of light in the direction orthogonal to the light source direction.

The convex-concave structure 68b merely needs to be such that the directivity of the light that hits the convex-concave structure 68b is converted to expand in the direction orthogonal to the light source direction, and may include the convex-concave structure 68b shown in FIGS. 58(a), 58(b) to FIG. 62. In FIGS. 58(a) and 58(b), the convex-concave structure 68b having a cylindrical lens shape or an elliptical groove shape (elliptical sphere surface shape) is radially arranged so that the longitudinal direction of each convex-concave structure 68b is substantially parallel to the light source direction with the point light source 62 as the center to form the directivity converting pattern 68. In FIGS. 59(a) and 59(b), the convex-concave structure 68b having a V-shaped groove shape is radially arranged so that the longitudinal direction of each convex-concave structure 68b is substantially parallel to the light source direction with the point light source 62 as the center to form the directivity converting pattern 68. In FIGS. 60(a) and 60(b), the convex-concave structure 68b having a U-groove shape is radially arranged so that the longitudinal direction of each convex-concave structure 68b is substantially parallel to the light source direction with the point light source 62 as the center to form the directivity converting pattern 68. In FIGS. 61(a) and 61(b), the convex-concave structure 68b having a diffraction grating shape is radially arranged so that the longitudinal direction of each convex-concave structure 68b is substantially parallel to the light source direction with the point light source 62 as the center to form the directivity converting pattern 68. In FIG. 62, the convex-concave structure 68b twisted to meander when seen from the z-axis direction is radially arranged so that the longitudinal direction of each convex-concave structure 68b is substantially parallel to the light source direction with the point light source 62 as the center to form the directivity converting pattern 68.

As described in the above principle, the convex-concave structure 68b may be a polygon such as a pentagon or a hexagon or a combination thereof, or a combination of a polygon and a curved surface other than the shapes shown in FIGS. 58 to 62 as long as the relationship between the diffusion degree in the direction parallel to the light source direction and the direction orthogonal to the light source direction is strong in the orthogonal direction. The convex-concave structure 68b, however, is desirably arranged without providing any space on the surface of the light guide plate 63.

If a pattern is concentrically arranged with the point light source 62 as the center, the pattern is radially expanded so that the width (p1) on the side close to the point light source 62 of the one convex-concave structure 68b is small and the width (p2) on the side distant from the point light source 62 is large, similar to FIG. 28.

In the convex-concave structure 68b having a cylindrical lens shape as in FIGS. 58(a) and 58(b), the shape seen from the z-axis direction may be such that the width is larger on the side distant from the point light source 62 than on the close side, or the width may be the same.

Expression by Average Inclination Angle

Consider associating the directivity converting pattern 68 capable of expanding the directivity of the reflected light in the direction orthogonal to the light source direction (direction connecting with center of point light source 62) with a concept of an average inclination angle.

The concept of average inclination angle will be made apparent. In this case, description will be made for the average inclination angle of when scanning parallel to the light source direction and the average inclination angle of when scanning in the direction orthogonal to the light source direction. First, the average inclination angle of when scanning parallel to the light source direction will be described. The average inclination angle $\theta x^*$ of when the shape of the directivity converting pattern 68 is scanned in the light source direction is defined with the following equation, where $\theta xi$ (i=1, 2, . . . ) is the inclination angle measured from the bottom surface of each passing convex-concave structure 68b, and $\Delta Xi$ is the length of the corresponding bottom side, as shown in FIG. 63(a).

$$\theta x^* = \Sigma |\theta xi \times \Delta Xi| / \Sigma |\Delta Xi| \qquad \text{(equation 12)}$$

Where $\Sigma$ is a sum related to i, and a sum is obtained for the absolute value.

Figures 63A, 63B:
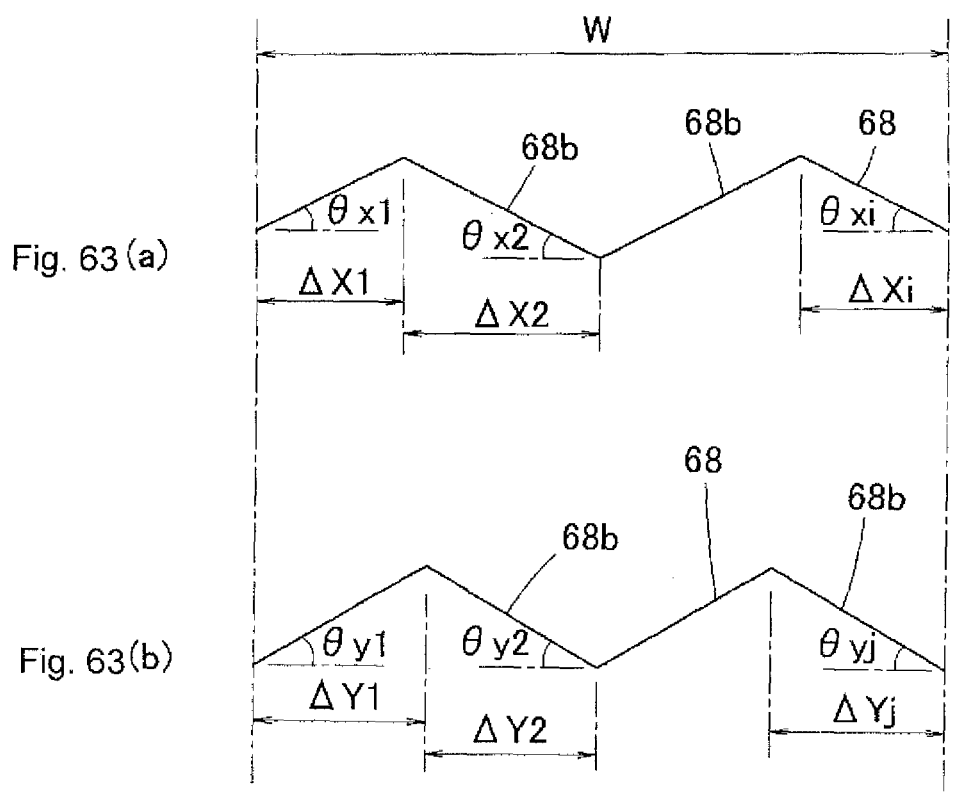
FIGS. 63(a) and 63(b) are views for describing a definition of an average inclination angle.
Figure 64A:
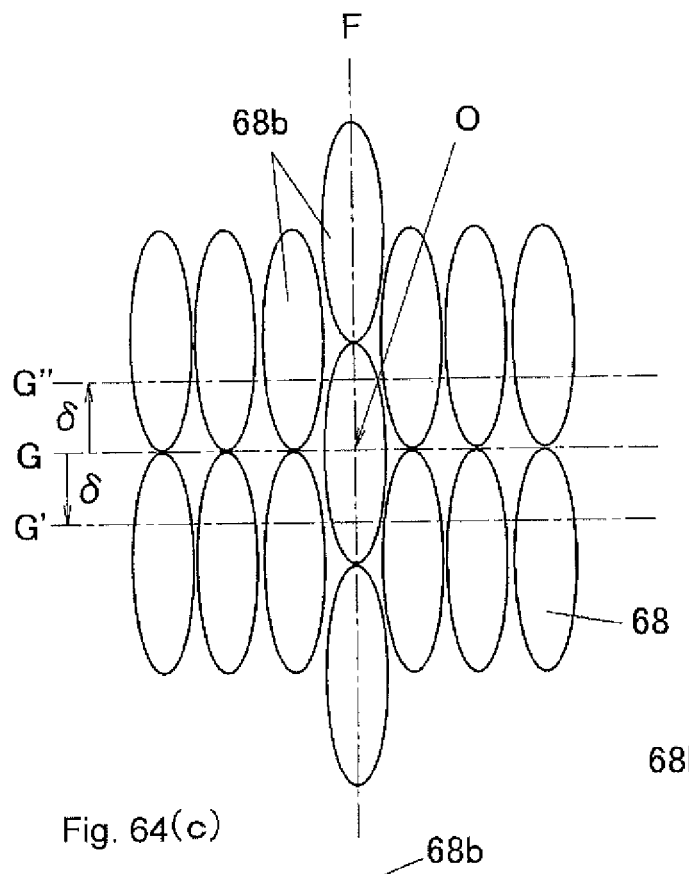
FIG. 64(a) is a view showing one example of an arrangement of the directivity converting pattern.
Figure 64B:
FIG. 64(b) is a view showing a cross-section along line F.
Figure 64C:
FIG. 64(c) is a view showing a cross-section along line G.
Figure 64D:
FIG. 64D is a view showing a cross-section along line G'.
Figure 64E:
FIG. 64(e) is a view showing a cross-section along line G".

The average inclination angle $\theta y^*$ of when scanning in the direction orthogonal to the light source direction is defined with the following equation, where $\theta yj$ (j=1, 2, . . . ) is the inclination angle measured from the bottom surface of each passing convex-concave structure 68b, and $\Delta Yj$ is the length of the corresponding bottom side, as shown in FIG. 63(b).

$$\theta y^* = \Sigma |\theta yj \times \Delta Yj| / \Sigma |\Delta Yj| \qquad \text{(equation 13)}$$

Where $\Sigma$ is a sum related to j, and a sum is obtained for the absolute value.

When obtaining the average inclination angle $\theta y^*$ of when scanning in the direction orthogonal to the light source direction, calculation is carried out for the range (scanning distance) W equal to when the average inclination angle $\theta x^*$ of when scanning in the light source direction is obtained. In particular, if the pattern is periodically repeated in one of the directions of the light source direction or the direction orthogonal to the light source direction, the average inclination angle is desirably calculated for two periods defined in the direction the pattern is periodically repeated. If the pattern is periodic in both the light source direction and in the direction orthogonal thereto, a range that is worth two periods in one of the directions is the comparing range. If the pattern is not periodic in both the light source direction and in the direction orthogonal thereto, the range of about 500 µm is the comparing range. The extraction of the cross-sectional shape is not limited to two periods or a numerical value of 500 µm, and can be appropriately changed as long an appropriate convex-concave portion representing the entire cross-sectional shape can be obtained.

The scanning line F in obtaining the average inclination angle θx* when scanning the light source direction and the scanning line G in obtaining the average inclination angle θy* of when scanning in the direction orthogonal to the light source direction are defined to pass through a point O where one of the directivity converting patterns 68 has a maximum height, as shown in FIG. 64(*a*). For the average inclination angle θx* in the light source direction, the value of the average inclination angle θx* is obtained according to the equation 12 for the cross-section along the scanning line F, as shown in FIG. 64(*b*).

In the direction orthogonal to the light source direction, on the other hand, the scanning lines G', G" moved in parallel to both sides by a predetermined distance δ (e.g., δ=50 μm) with respect to the scanning line G are defined in addition to the scanning line G passing the point O, as shown in FIG. 64(*a*). The values of the respective average inclination angle θy* are obtained for the cross-sections along three scanning lines G, G', G" as shown in FIGS. 64(*c*), 64(*d*), 64(*e*). A largest value of the three obtained values is the average inclination angle θy* in the direction orthogonal to the light source direction.

Figure 65:
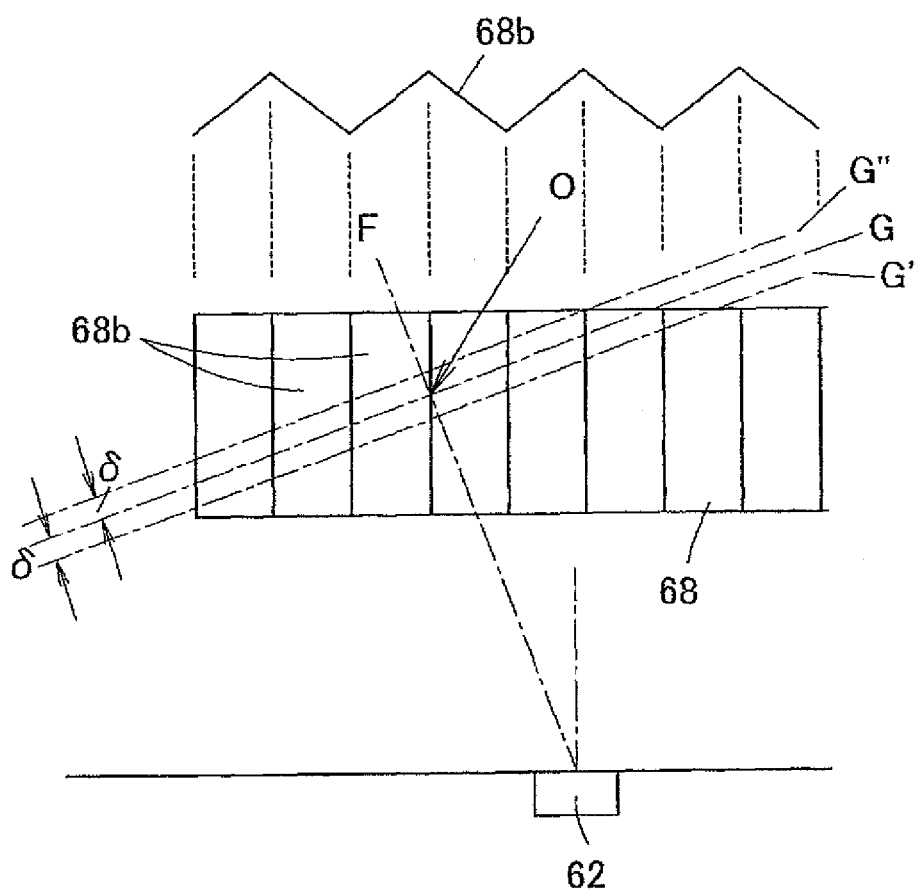
FIG. 65 is a view describing a method of determining the scanning line F parallel to the light source direction and the scanning line G, G', G" parallel to the direction orthogonal to the light source direction.

If the scanning direction is deviated from the front direction, the scanning position in the orthogonal direction is determined so that the scanning line F in the light source direction and the scanning line G in the direction orthogonal to the light source direction intersect at the point O where the height of the convex-concave structure 68*b* becomes a maximum when scanned along the scanning line F in the light source direction, as shown in FIG. 65 when scanning in the direction orthogonal to the light source direction. If the point of maximum height is not provided and is constant in the light source direction F, it is the vicinity of the center of the scanning line F in the pattern forming region.

After the scanning line G passing the intersecting position is determined, the scanning lines G', G" shifted by a constant distance δ (50 μm) to both sides of the scanning line G at the middle are determined, and the largest value of the average inclination angles calculated for the three scanning lines G, G', G" is set as the average inclination angle θy* in the direction orthogonal to the light source direction. If the directivity converting pattern 68 is formed on the inclined surface 67, the average inclination angles θx*, θy* are obtained and compared with the influence of the inclined surface 67 eliminated.

Figure 66:
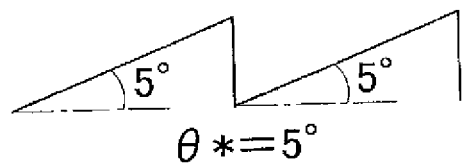
FIGS. 66(a) to 66(d) are views showing the directivity converting pattern and the average inclination angle of various cross-sections.
Figure 66:
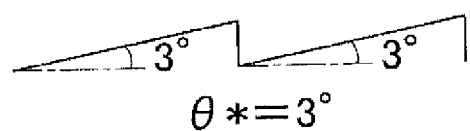
Figure 66:
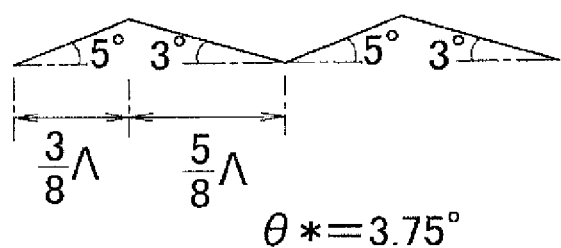
Figure 66:
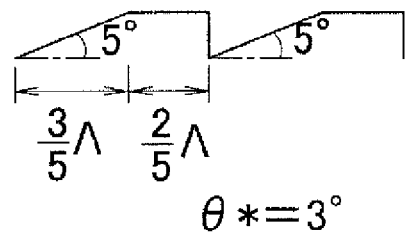

Specific examples of the average inclination angle for various patterns will be shown in FIGS. 66(*a*) to 66(*d*). Since the scanning direction is not an issue, the average inclination angle is expressed as θ*. FIG. 66(*a*) shows a saw tooth-form pattern having an inclination angle of 5°, FIG. 66(*b*) shows a saw tooth-form pattern having an inclination angle of 3°, and the average inclination angle is θ*=5°, θ*=3°, respectively. FIG. 66(*c*) is a triangular wave pattern having an inclination angle of 5° (bottom length 3Λ/8; Λ is period) and an inclination angle of 3° (bottom length 5Λ/8), and the average inclination angle is θ*=3.75°. Furthermore, in the V-shaped groove or trapezoidal pattern shown in FIG. 66(*d*), θ*=3°. In the flat surface, the average inclination angle θ* is 0°.

To reduce the leakage of light, the convex-concave structure 68*b* is desirably formed to a shape elongated in the light source direction with respect to the point light source 62, as described above, which can be expressed using the average inclination angle. In other words, when the shape of the convex-concave structure 68*b* is an elongate shape in the light source direction than the direction orthogonal to the light source direction, this is expressed using the average inclination angle θx* and θy* as, Average inclination angle θy* in direction orthogonal to light source direction>average inclination angle θx* in light source direction (equation 14).

The average inclination angle can be extended to a pattern other than the shape configured by a plane as in FIG. 66. For example, when the convex-concave structure 68*b* is a curved surface, the average inclination angle |θx1×ΔX1+θx2×ΔX2+ ... |/|ΔX1+ΔX2+ ... | is obtained for a broken line shape inscribing or circumscribing the convex-concave structure 68*b*, and the extreme value of the average inclination angle when approaching the length ΔX1, ΔX2 ... of each broken line to zero is defined as the average inclination angle of the pattern, as shown with a thin line in FIG. 67(*a*).

Figure 67A:
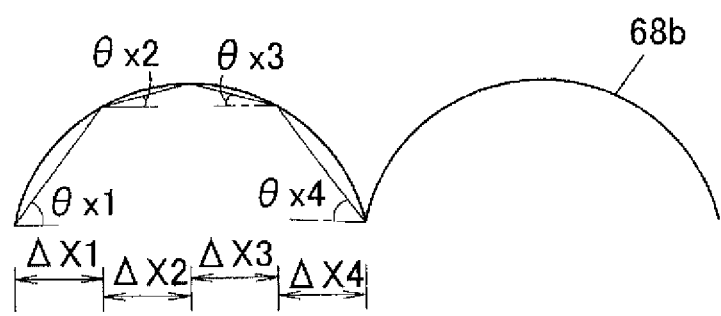
FIGS. 67(a) and 67(b) are views describing a method of obtaining an average inclination angle of the directivity converting pattern formed by a curved line.
Figure 67B:
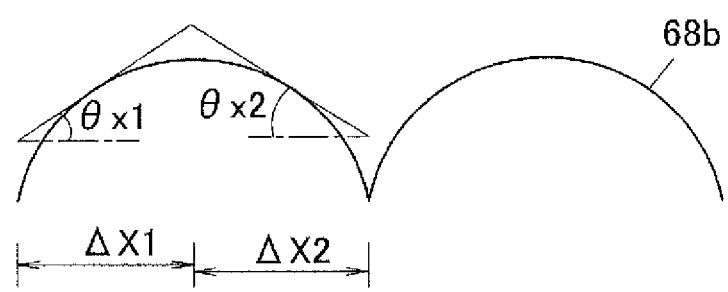

Alternatively, in the case of the pattern of a cylindrical lens shape as shown in FIG. 67(*b*), the average inclination angle may be obtained by approximating the curved surface pattern to a triangular pattern by a tangent line drawn to both sides thereof. In the case of a fine and random diffusion pattern, the roughness of the diffusion surface and the average inclination angle can be associated.

Figure 68:
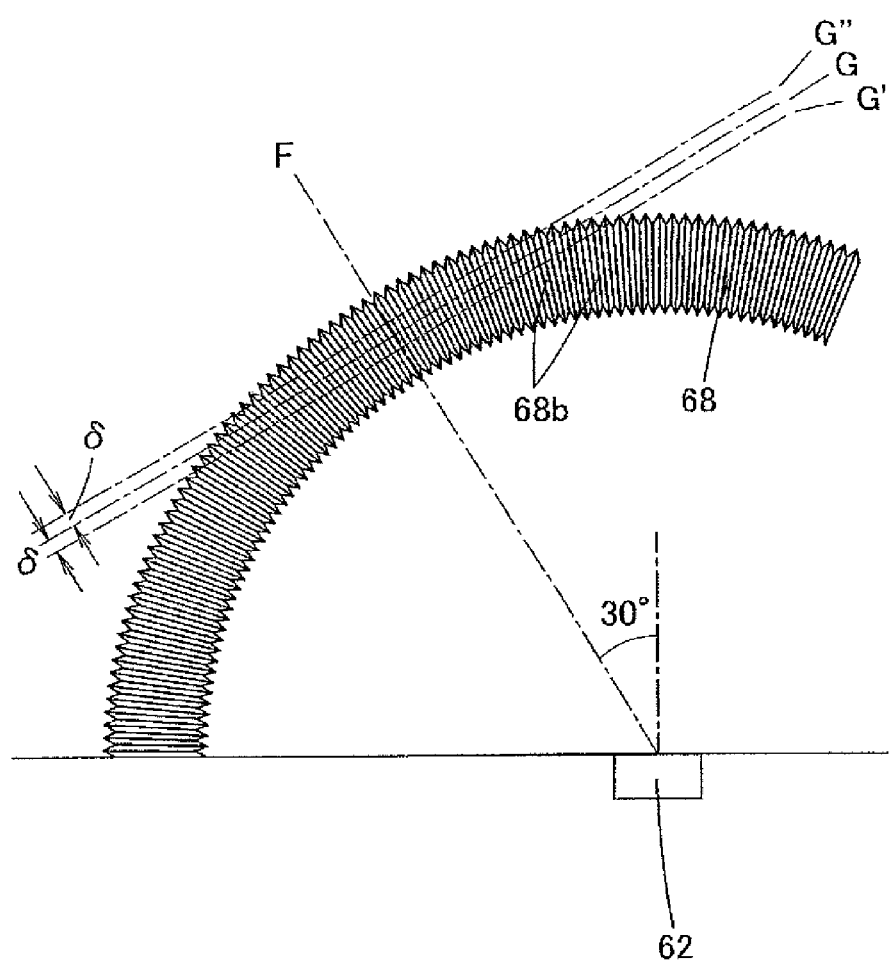
FIG. 68 is a view showing the directivity converting pattern radially arranged in an arcuate region having the point light source as a center.
Figure 69:
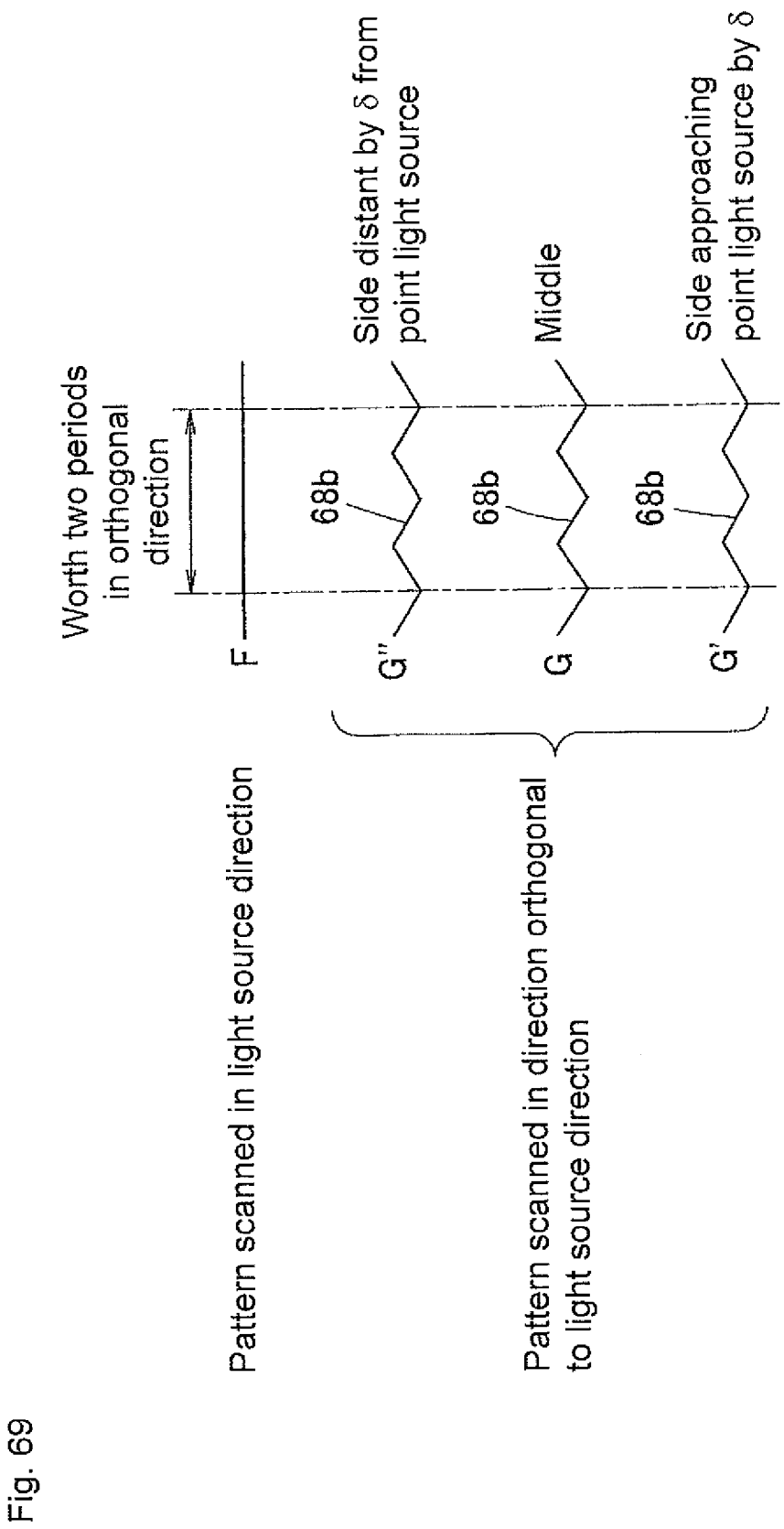
FIG. 69 is a view showing a pattern shape when the directivity converting pattern of FIG. 68 is scanned along the scanning line F parallel to the light source direction and a pattern shape when scanned along the scanning lines G, G', G" in the direction orthogonal to the light source direction.

FIG. 68 shows the directivity converting pattern 68 including the convex-concave structure 68*b* radially arranged in the arcuate region having the point light source 62 as the center. FIG. 69 shows the pattern shape when the directivity converting pattern 68 is scanned along the scanning line F in the light source direction, and the pattern shape when the directivity converting pattern 68 is scanned in the direction orthogonal to the scanning line F in the light source direction. The pattern along the scanning line G is a cross-section at the middle in the light source direction of the directivity converting pattern 68, the pattern along the scanning line G" is a cross-section at the position shifted to the side distant from the point light source 62 by δ (50 μm) from the middle in the light source direction, and the pattern along the scanning line G' is a cross-section at the position shifted to the side approaching the point light source 62 by δ (50 μm) from the middle in the light source direction.

Obtaining the average inclination angle θx* when scanned in the light source direction from FIG. 69, Average inclination angle in light source direction F: 0° is obtained. Obtaining the average inclination angle θy* when scanned in the direction orthogonal to the light source direction, Average inclination angle (middle) in direction G orthogonal to light source direction: 30.8°

Average inclination angle (50 μm to point light source side) in direction G' orthogonal to light source direction: 30.9°

Average inclination angle (50 μm to distant side) in direction G" orthogonal to light source direction: 30.7°.

The calculation of each average inclination angle θx*, θy* is performed at a length of two periods in the direction orthogonal to the light source direction for the light source direction and for the direction orthogonal to the light source direction. Therefore, in the direction orthogonal to the light source direction, 30.9°, which is the highest of the three values, is the average inclination angle θy* in the direction orthogonal to the light source. In this case, the average inclination angle θy* in the direction orthogonal to the light source direction>average inclination angle θx* in the light source direction is satisfied.

Figure 70:
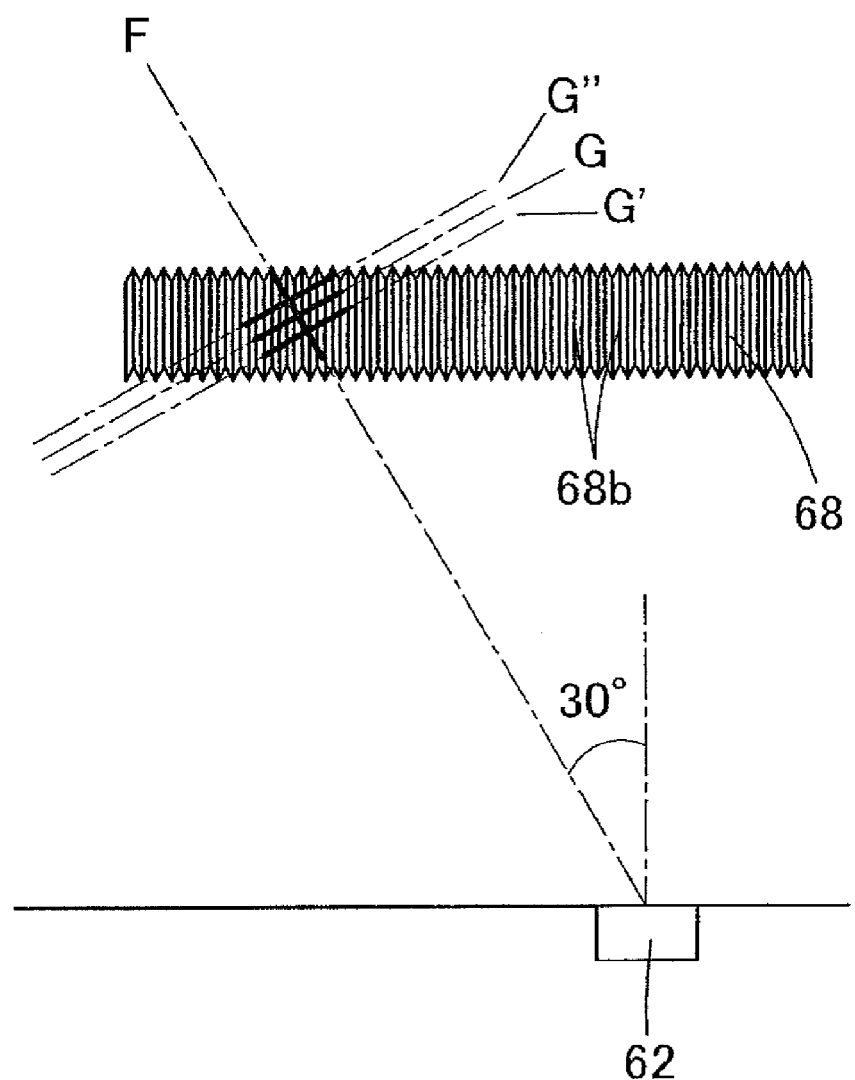
FIG. 70 is a view showing the directivity converting pattern arranged to be parallel to each other in a linear region.
Figure 71:
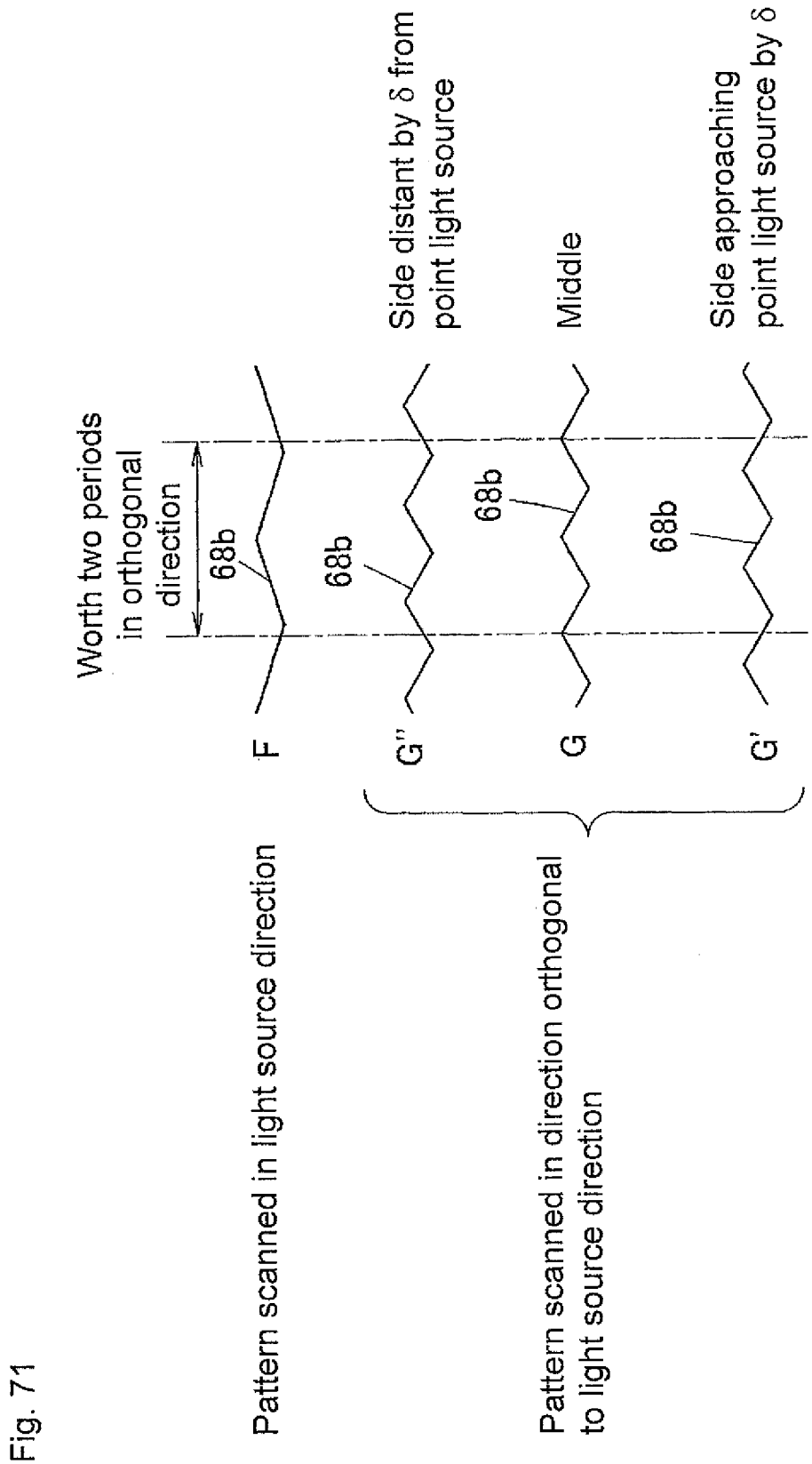
FIG. 71 is a view showing a pattern shape when the directivity converting pattern of FIG. 70 is scanned along the scanning line F parallel to the light source direction and a pattern shape when scanned along the scanning lines G, G', G" in the direction orthogonal to the light source direction.

FIG. 70 shows the directivity converting pattern 68 configured by arranging the convex-concave structure 68*b* extending in one direction so as to be parallel to each other in a linear region. FIG. 71 shows the pattern shape when the directivity converting pattern 68 is scanned along the scanning line F in the light source direction, and the pattern shape when the directivity converting pattern 68 is scanned in the direction orthogonal to the light source direction. The pattern along the scanning line G is a cross-section along the direction orthogonal at a point of maximum height of the directivity converting pattern 68 the scanning line F passes, the pattern along the scanning line G" is a cross-section at the position shifted to the side distant from the point light source 62 by δ (50 μm) from the position passing the point of maximum height, and the pattern along the scanning line G' is a cross-section at the position shifted to the side approaching the point light source 62 by δ (50 μm) from the point of maximum height.

Obtaining the average inclination angle θx* when scanned in the light source direction from FIG. 71, Average inclination angle in light source direction F: 16.6° is obtained. Obtaining the average inclination angle θy* when scanned in the direction orthogonal to the light source direction, Average inclination angle (middle) in direction G orthogonal to light source direction: 27.1°

Average inclination angle (50 μm to point light source side) in direction G' orthogonal to light source direction: 27.1°

Average inclination angle (50 μm to distant side) in direction G" orthogonal to light source direction: 27.1°.

The calculation of each average inclination angle is performed at a length of two periods in the direction orthogonal to the light source direction for the light source direction and for the direction orthogonal to the light source direction.

Therefore, in the direction orthogonal to the light source direction, 27.1°, which is the highest of the three values, is the average inclination angle θy* in the direction orthogonal to the light source. In this case, the average inclination angle θy* in the direction orthogonal to the light source direction>average inclination angle θx* in the light source direction is satisfied.

Expression by Concave-Convex Extent or Number of Concave-Convex Portion

The directivity converting pattern 68 capable of expanding the directivity of the reflected light in the direction orthogonal to the light source direction (direction connecting with center of point light source 62) is associated with the concept of concave-convex extent or the number of concave-convex portion. When the concave portion and/or the convex portion configuring the directivity converting pattern 68 is periodically repeated, the concave-convex extent in the light source direction and the concave-convex extent in the direction orthogonal to the light source can be compared. The concave-convex extent referred to herein is the number of concave portion and/or convex portion contained in a predetermined distance (e.g., length worth two periods of the pattern).

Figure 72:
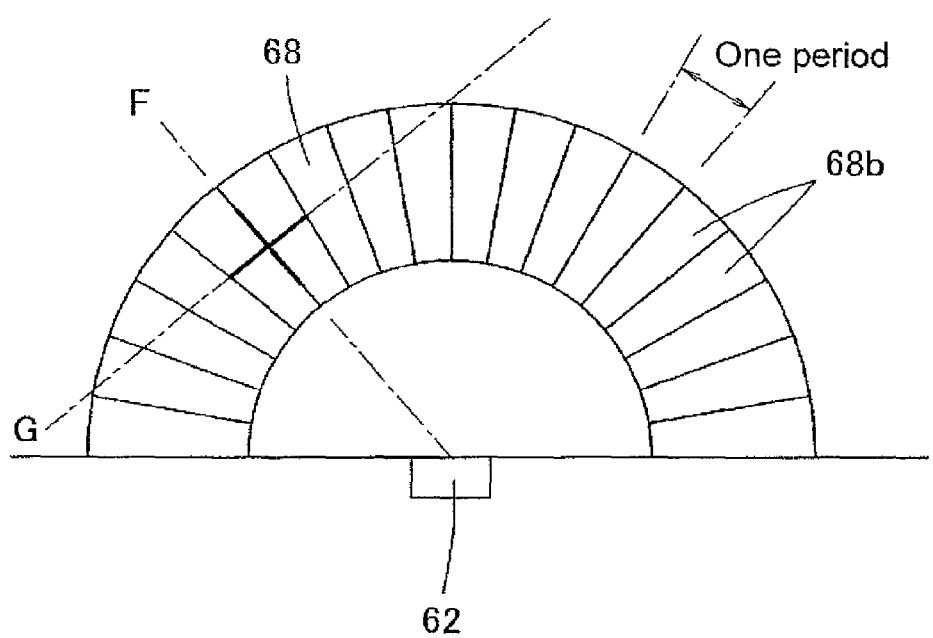
FIG. 72 is a view showing the directivity converting pattern arranged to an arcuate shape.
Figure 73:
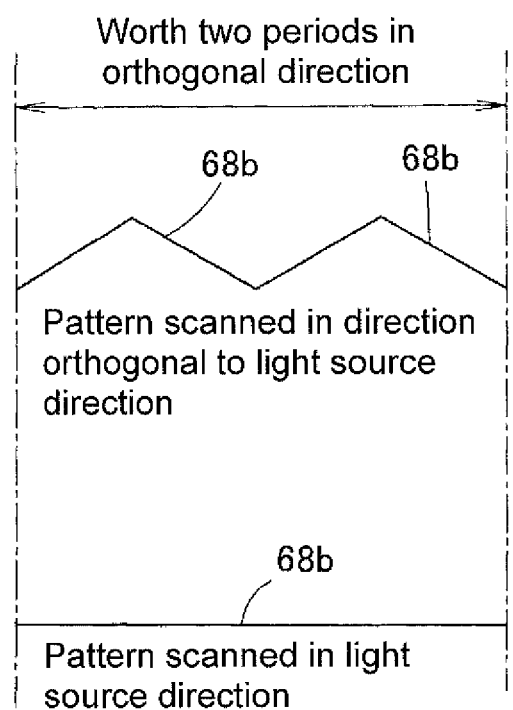
FIGS. 73(a) and 73(b) are views showing a cross-section of the directivity converting pattern in the F direction of FIG. 72 and a cross-section of the directivity converting pattern in the G direction of FIG. 72.

For example, as shown in FIG. 72, if the convex-concave structure 68b is periodically repeated in a direction orthogonal to the light source direction, the number of concave-convex portion (number of convex-concave structure 68b) contained in the two periods in the direction orthogonal to the light source direction and the number of concave-convex portion in the light source direction contained in the same distance are compared. If the convex-concave structure 68b is arcuately lined at a constant pitch, the number of concave-convex portion in the light source direction is zero, as shown in FIG. 73(a) and the number of concave-convex portion in the direction orthogonal to the light source direction is two, as shown in FIG. 73(b).

If the number of concave-convex portion in the direction orthogonal to the light source direction is greater than the number of concave-convex portion in the light source direction contained in the same distance, which means that the shape of the convex-concave structure 68b is long in the light source direction, and thus the leakage of light from the light guide plate 63 can be reduced.

Figure 74:
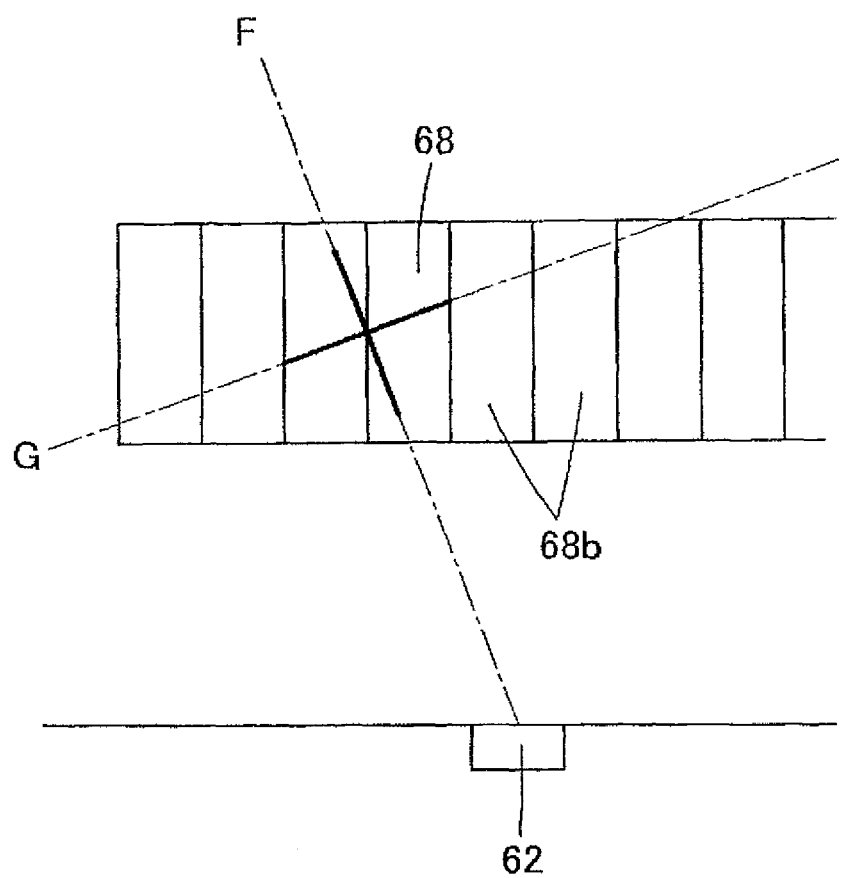
FIG. 74 is a schematic view showing the directivity converting pattern arranged to be parallel to each other in the linear region.
Figure 75A:
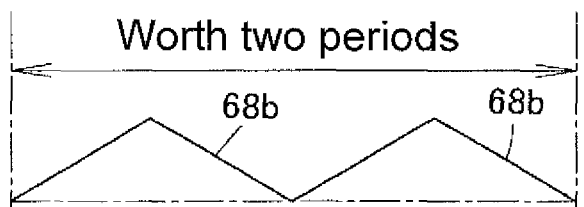
FIGS. 75(a) and 75(b) are views showing a cross-section of the directivity converting pattern in the F direction of FIG. 74 and a cross-section of the directivity converting pattern in the G direction of FIG. 74.
Figure 75B:
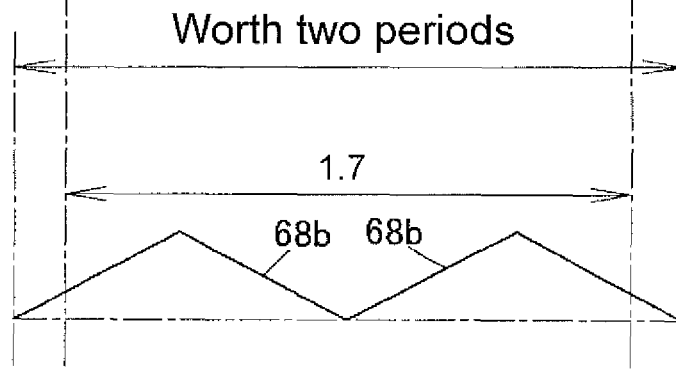

FIG. 74 shows the directivity converting pattern 68 in which the convex-concave structure 68b extending in one direction is arranged so as to be parallel to each other in a linear region. FIG. 75 shows the pattern shape when the directivity converting pattern 68 is scanned along the light source direction F, and the pattern shape when the directivity converting pattern 68 is scanned in the direction G orthogonal to the light source direction. Considering the number of concave-convex portion contained in the repeated two periods in the direction orthogonal to the light source direction, the number of concave-convex portion in the direction orthogonal to the light source is two, but the number of concave-convex portion in the light source direction is 1.7. Therefore, in this case as well, the number of concave-convex portion in the direction orthogonal to the light source direction is greater than the number of concave-convex portion in the light source direction contained in the same distance, and the leakage of light from the light guide plate 63 can be reduced.

Angular Range in Extending Direction of Pattern

Figure 76:
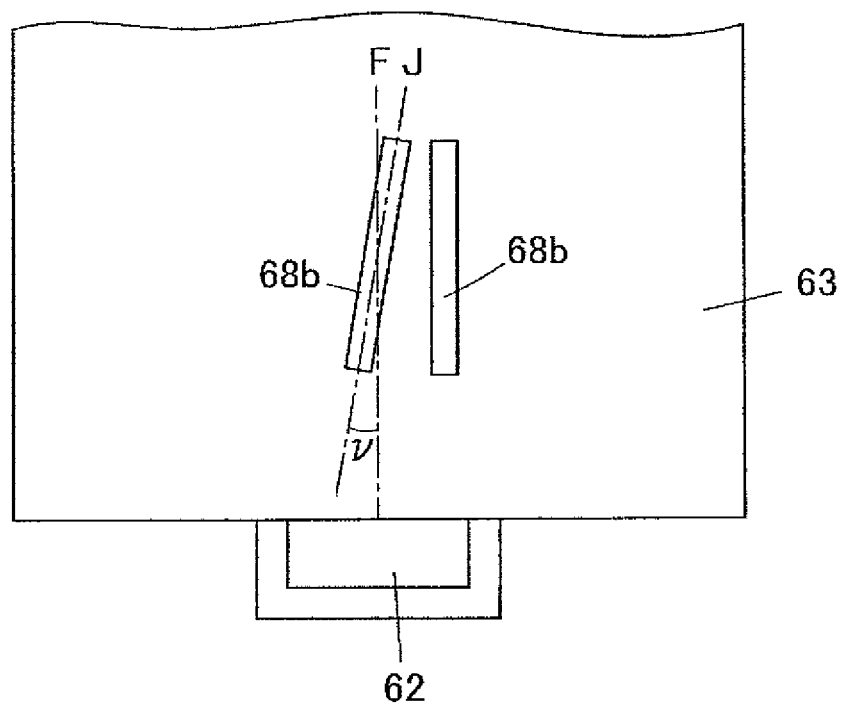
FIG. 76 is a view describing an angular range in an extending direction of the convex-concave structure.

The angular range (tilt) in the extending direction of the convex-concave structure 68b will now be described. When each convex-concave structure 68b of the directivity converting pattern 68 is radially arranged with the point light source 62 as the center, the extending direction of each convex-concave structure 68b is parallel to the light source direction. However, as shown in FIG. 76, the convex-concave structure 68b may be arranged tilted from the light source direction. An extending direction J of the directivity converting pattern 68 is desirably such that an angle ν with respect to the light source direction F is within 20° (i.e., ±20°) in all directions. The extending direction J is the direction in which the cross-sectional shape of the convex-concave structure 68b does not change, or the longitudinal direction. The direction the convex-concave portion changes by the convex-concave structure 68b may be periodic or may not be periodic.

Figure 77:
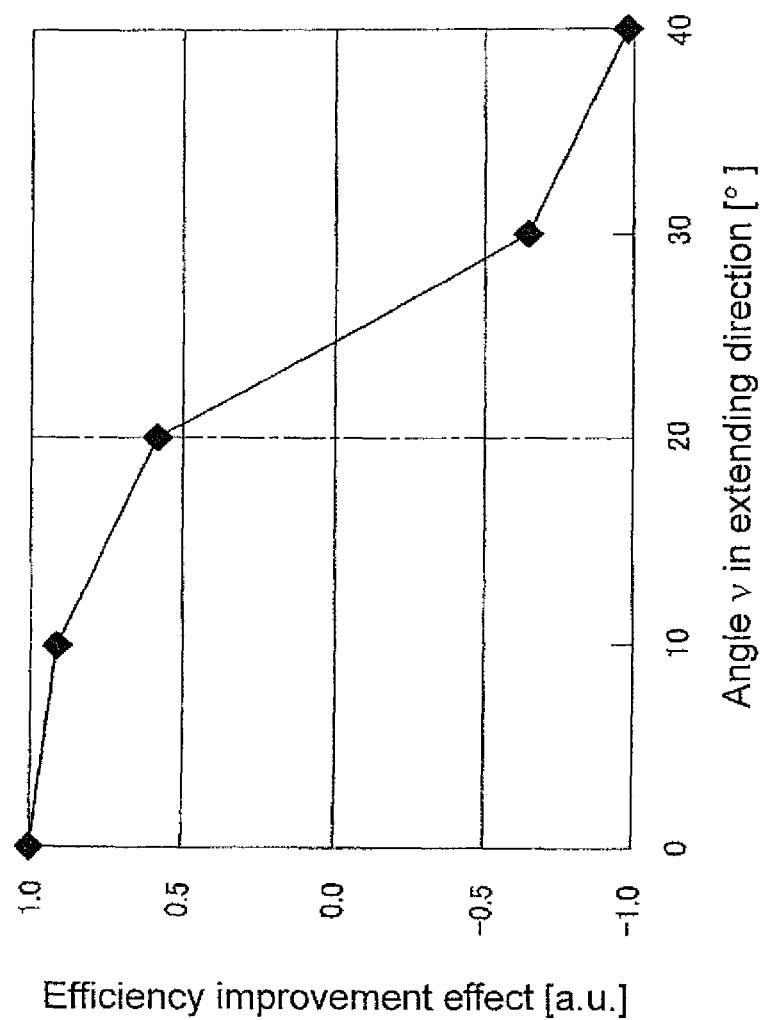
FIG. 77 is a view showing a change in an efficiency improvement effect when the angle in the extending direction of the directivity converting pattern with respect to the light source direction is changed.

In FIG. 77, the angle ν formed by the extending direction J of the convex-concave structure 68b with respect to the light source direction F is changed, and the efficiency improvement effect at the time is calculated. As a model, the effect of when each of a plurality of V-shaped groove structures 68a of FIG. 26 is rotated all in the same direction seen from the light outputting surface side, and the pattern is tilted is calculated. The efficiency improvement effect is the efficiency indicating to what proportion the light is transmitted from the light introducing section 65 to the light guide plate main body 64 without leaking, where the efficiency when the directivity converting pattern 68 is not present is zero, a case in which the efficiency improvement effect of preventing light leakage is present (reduce light leakage) is positive, and a case in which the efficiency of preventing light leakage is lowered (increase light leakage) is negative. Specifically, with a light quantity transmitted to the light guide plate main body 64 when the convex-concave structure 68b is arranged in a certain extending direction as Iv, and a light quantity transmitted to the light guide plate main body 64 without the pattern as Io, the effect is expressed as (Iv−Io)/Io. The efficiency improvement effect shown in FIG. 77 is standardized to one with a point the efficiency improvement effect becomes the highest. In the calculation, calculation is performed with the model of the V-shaped groove structure for the directivity converting pattern 68, but the tendency does not greatly change even if the shape of the directivity converting pattern is changed.

As is apparent from FIG. 77, when the angle ν exceeds 20°, the efficiency improvement effect rapidly lowers, and the opposite effect is obtained when exceeding 25°. The directivity converting pattern 68 is desirably such that the angle formed by the extending direction J with respect to the light source direction F is smaller than or equal to 20°.

Aspect Ratio of Pattern

Figure 78:
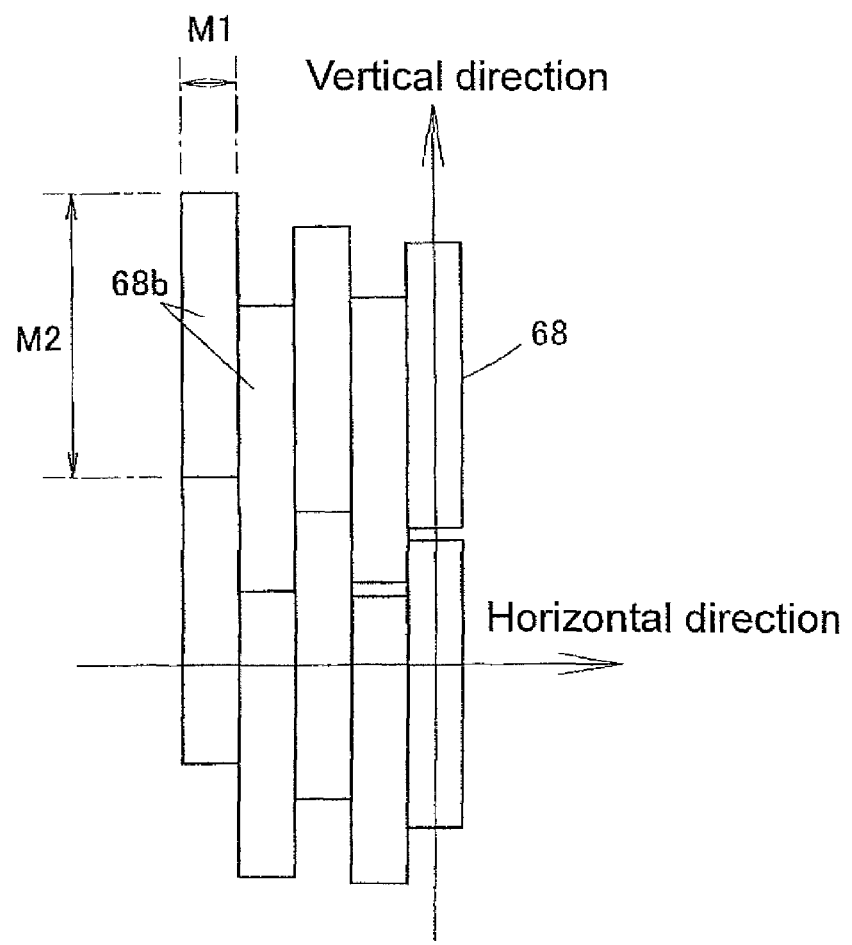
FIG. 78 is a view describing an aspect ratio in plan view of the directivity converting pattern.

Furthermore, as shown in FIG. 78, if the convex-concave structure 68b of the directivity converting pattern 68 extends to one direction when seen from the upper surface of the light guide plate 63, the aspect ratio in plan view of the convex-concave structure 68b, that is, a ratio M1/M2 of a length M1 in the direction orthogonal to the vertical direction and the direction the cross-section changes or the short direction (horizontal direction) with respect to a length M2 in the direction the cross-section of the directivity converting pattern 68 does not change or the longitudinal direction (vertical direction=extending direction J) is desirably smaller than or equal to 0.5 times. If the lengths of the pitches p1 and p2 differ as shown in FIG. 28, the average of the pitches p1 and p2 is considered the length M1.

Figure 79:
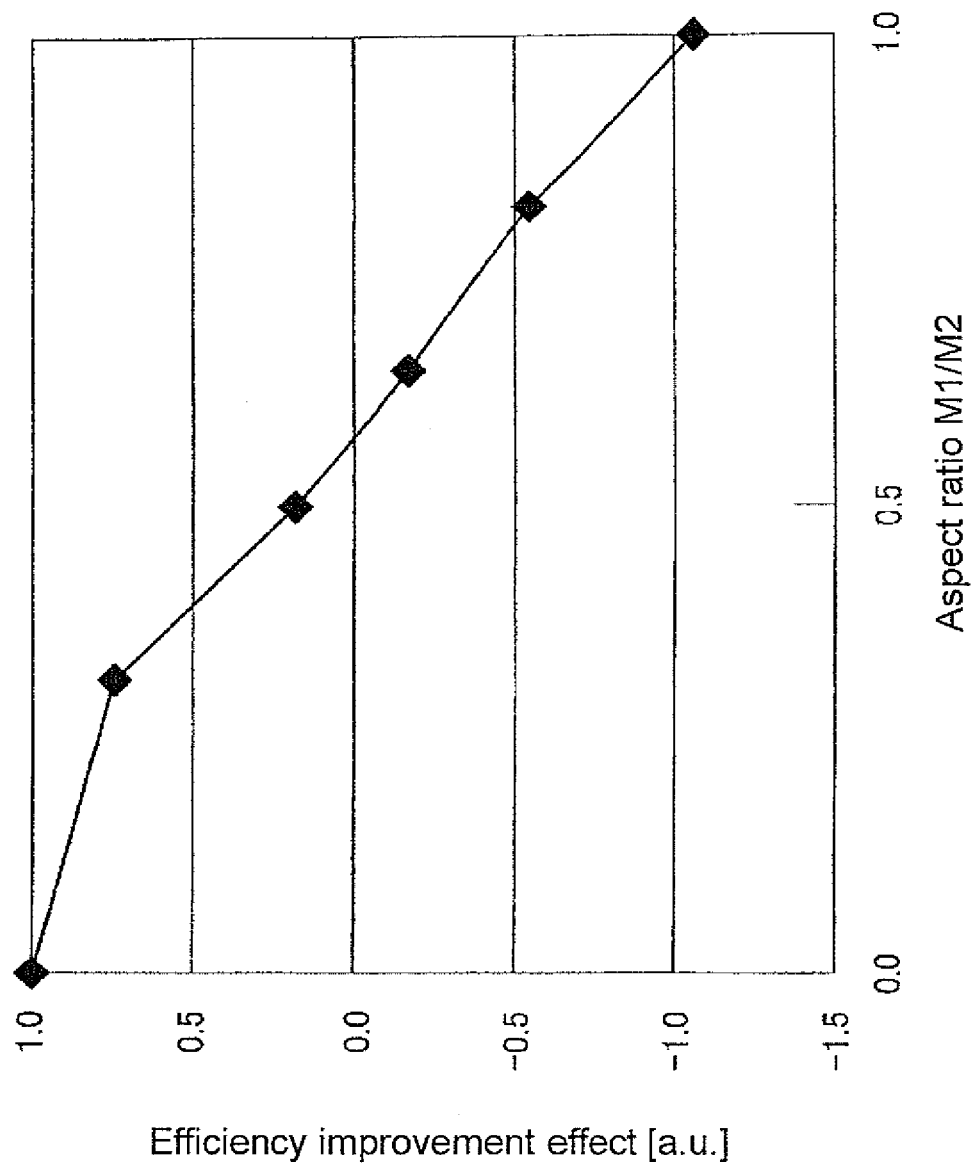
FIG. 79 is a view showing a change in the efficiency improvement effect when the aspect ratio of the directivity converting pattern is changed.

FIG. 79 shows the result of calculating the efficiency improvement effect when the aspect ratio M1/M2 of the convex-concave structure 68b is changed. As a model, the effect is calculated using the model shown in FIGS. 82 to 84. Similar to FIG. 77 as well, in FIG. 79 as well, the efficiency when the directivity converting pattern is not present is zero, a case in which the efficiency improvement effect of preventing light leakage is present (reduce light leakage) is positive, a case in which the efficiency of preventing light leakage is lowered (increase light leakage) is negative, and the effect is standardized to one with a point the efficiency improvement effect becomes the highest. As is apparent from the result, the efficiency improvement effect is positive if the aspect ratio M1/M2 is smaller than or equal to 0.5, and the opposite effect is obtained if larger. The aspect ratio for the vertical and horizontal directions of the directivity converting pattern 68 seen in plan view is desirably smaller than or equal to 0.5.

Installation Range of Pattern

Figure 80:
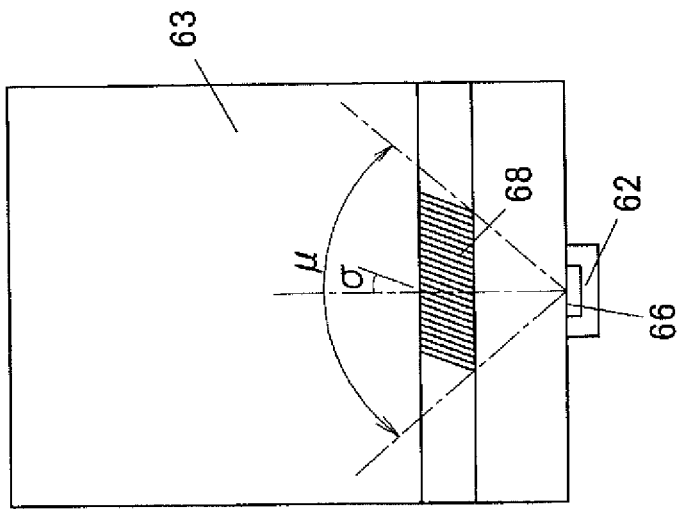
FIGS. 80(a) and 80(b) are views describing an angular range (pattern expansion angle μ) of installing the directivity converting pattern.
Figure 80:
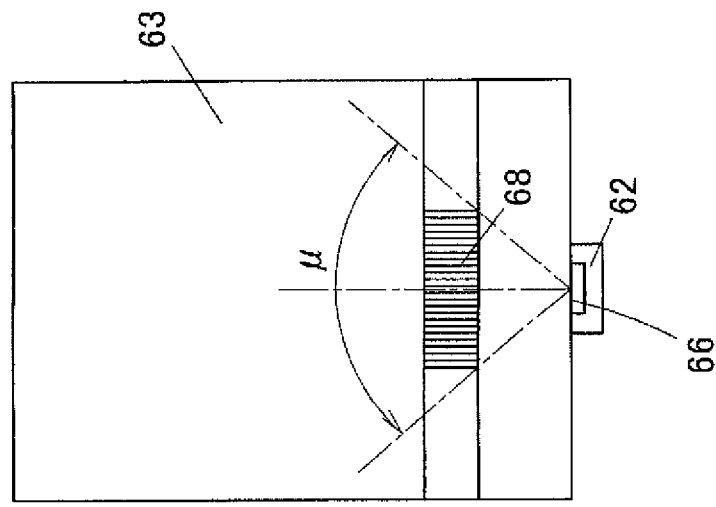

Furthermore, as shown in FIG. 80(a), when the directivity converting pattern 68 extending in one direction with respect to the light incident end face 66 of the light guide plate 63 is repeatedly arranged in a certain finite region, such a region is desirably within a expansion of 80° seen from the center of light emission of the point light source 62. Assume the range of expansion of the pattern seen from the center of light emission of the point light source 62 is a pattern expansion angle μ. The range of expansion of the pattern is preferably substantially symmetric with respect to the front direction of the point light source 62, that is, preferably the expansion of within ±40° from the front direction.

Figure 81:
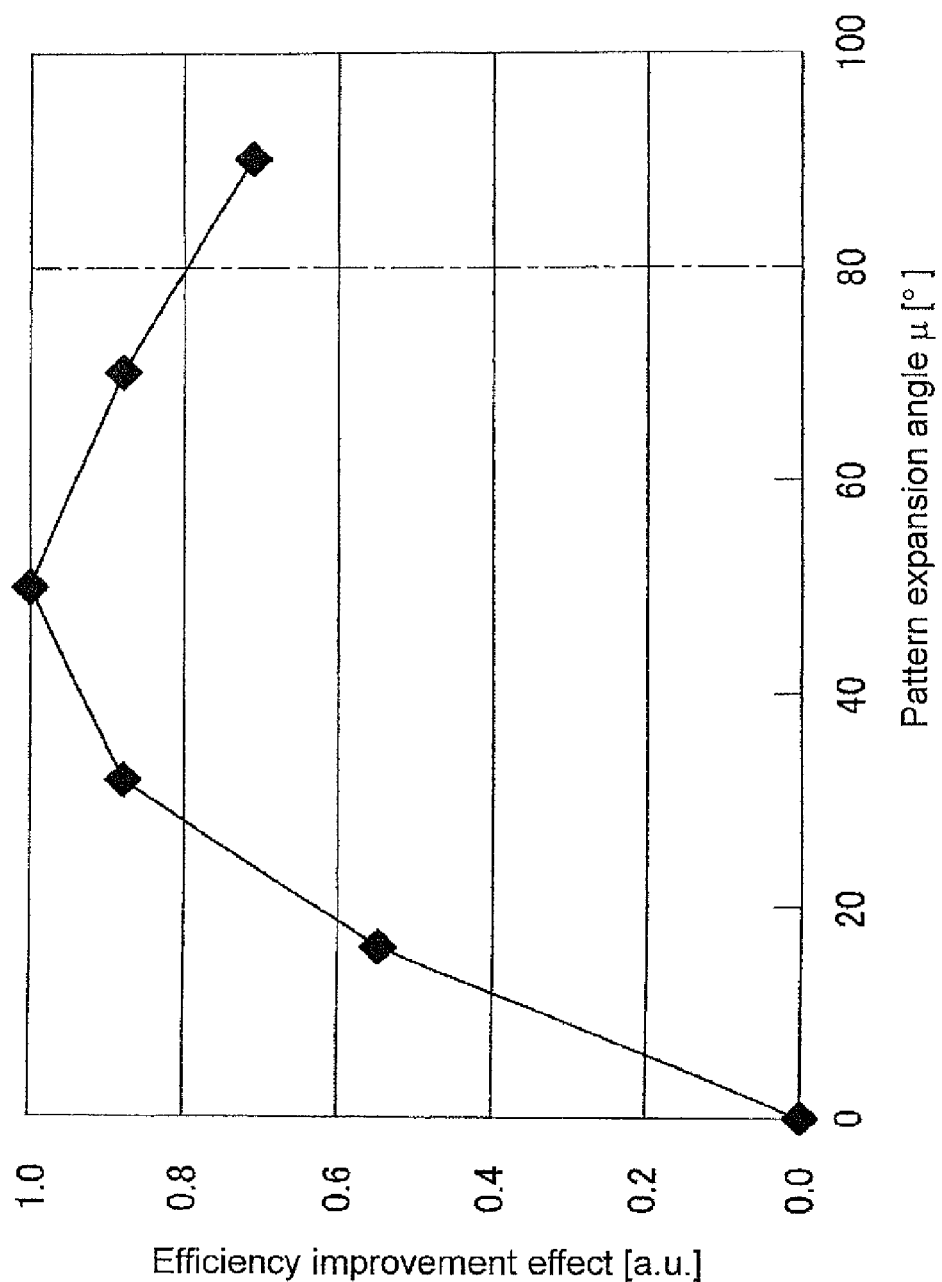
FIG. 81 is a view showing a relationship between the angular range (pattern expansion angle μ) of installing the directivity converting pattern and the efficiency improvement effect.

The graph of FIG. 81 shows calculation of a relationship of the angular range (pattern expansion angle μ) of installing the directivity converting pattern and the efficiency improvement effect. As a model, the effect is calculated using the model of the V-shaped groove structure parallel to the front direction of the point light source 62 as shown in FIG. 80(a). For example, the pattern expansion angle μ of 0° is a state in which the directivity converging pattern 68 is not arranged, and the pattern expansion angle μ of 40° is a state in which the directivity converting pattern 68 is arranged in the range in which μ is 40°. The efficiency improvement effect has a peak at the pattern expansion angle μ of 50° and the efficiency improvement effect starts to lower when the range becomes wider than 50°, and a high efficiency improvement effect is obtained only up to about 80°. In the case of this example, the efficiency near the front surface is high since the pattern in the front direction is substantially parallel to an advancing direction of the light and the extending direction of the directivity converting pattern, and the efficiency gradually drops as it deviates from the front surface, but the influence of the ends is small as the directivity converting pattern in the front direction is dominant in the entire efficiency. In this calculation as well, the model of the V-shaped groove structure is used for the directivity converting pattern 68, but the tendency does not greatly change even if the shape of the convex-concave structure 68b is changed.

As shown in FIG. 80(b), a tilt σ in the extending direction of the directivity converting pattern 68 represents the angle tilted with respect to the front direction of the point light source 62, and the extending direction of the directivity converting pattern 68 is tilted, but the tilt σ is preferably within ±20° and more preferably within ±5° from a point of efficiency.

Eighth Embodiment

Figure 82:
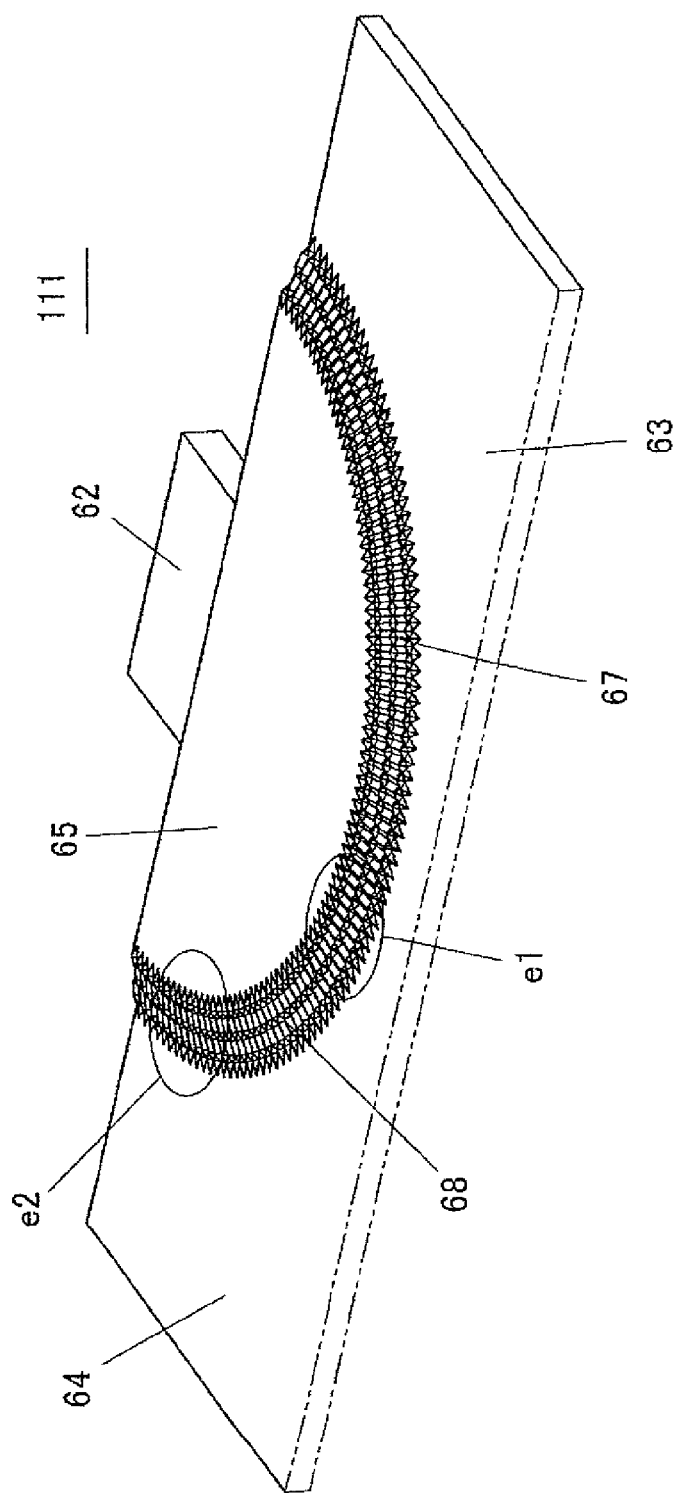
FIG. 82 is a partially broken perspective view showing a surface light source apparatus according to an eighth embodiment of the present invention.
Figure 83:
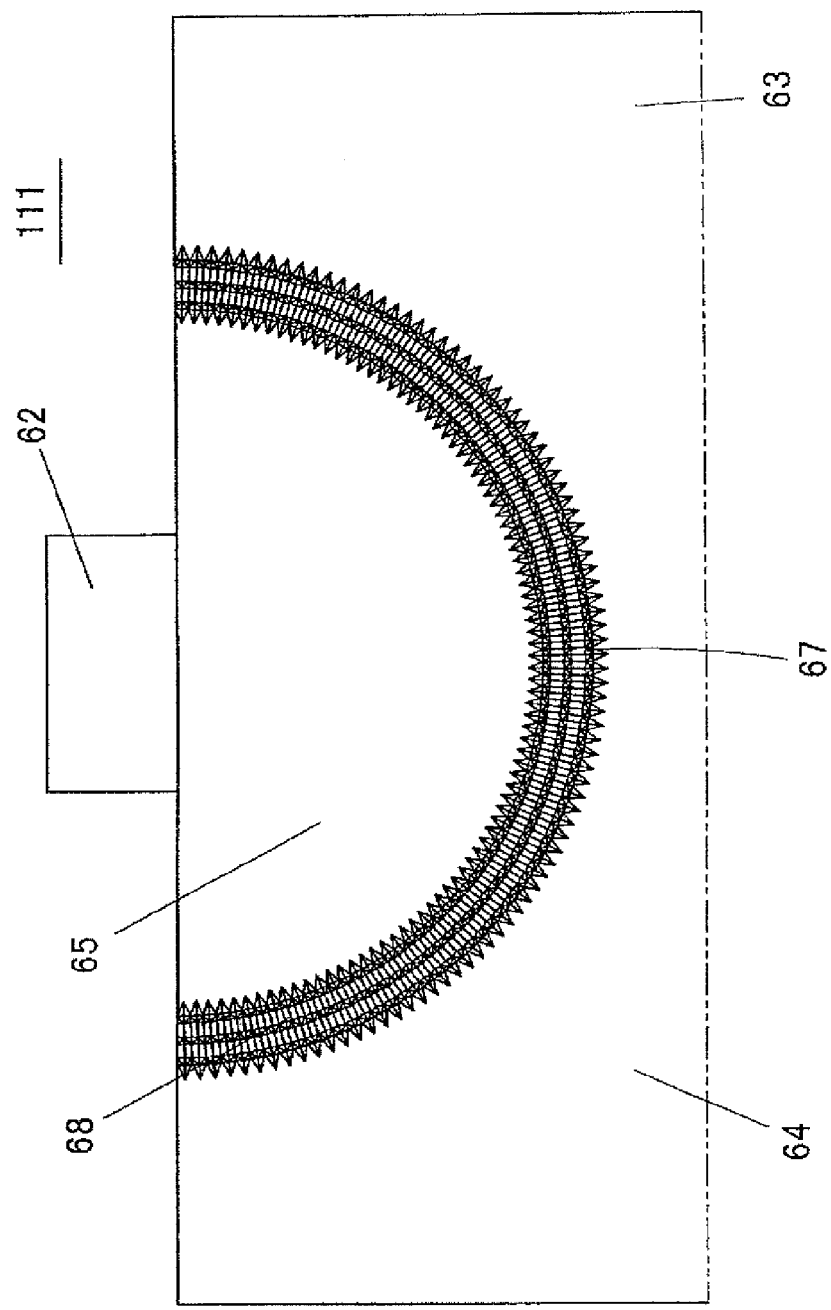
FIG. 83 is a partially broken plan view of the surface light source apparatus according to the eighth embodiment.
Figure 84A:
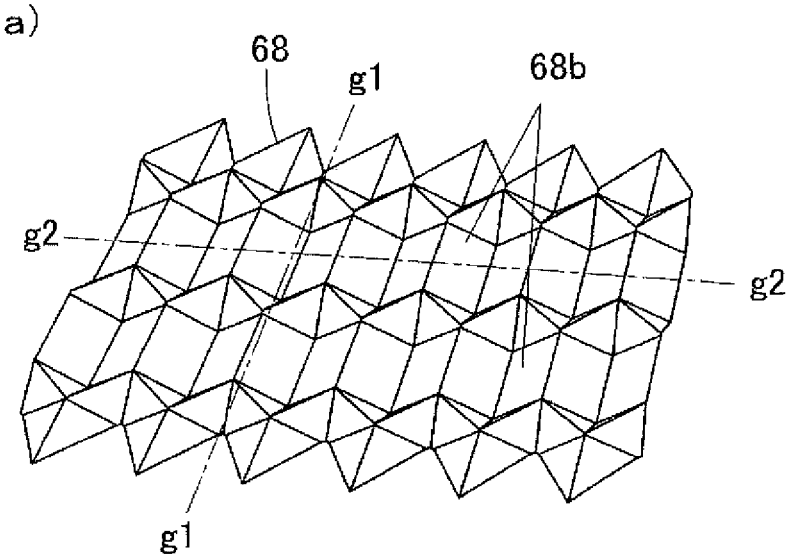
FIG. 84(a) is an enlarged view of a portion e1 of FIG. 82.
Figure 84B:
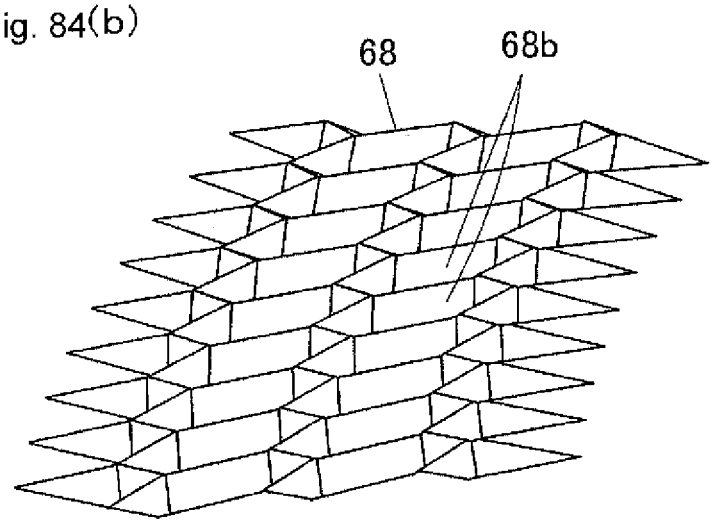
FIG. 84(b) is an enlarged view of a portion e2 of FIG. 82.

FIG. 82 is a partially broken perspective view showing a surface light source apparatus 111 according to an eighth embodiment, FIG. 83 is a partially broken plan view of the surface light source apparatus 111, FIG. 84(a) is an enlarged view of a portion e1 of FIG. 82, and FIG. 84(b) is an enlarged view of a portion e2 of FIG. 82.

The directivity converting pattern 68 of the surface light source apparatus 111 is arranged on the inclined surface 67. The directivity converting pattern 68 has the V-groove shaped convex-concave structure 68b arranged in the circumferential direction, as is apparent from the enlarged views of FIGS. 84(a) and 84(b). Furthermore, the convex-concave structure 68b is arranged in a double arcuate shape of an inner peripheral side and an outer peripheral side, where a hill shape on the inner peripheral side and a valley shape on the outer peripheral side or a valley shape on the inner peripheral side and a hill shape on the outer peripheral side formed by the convex-concave structure 68b are lined in the light source direction, and the gap in between is connected by a plurality of microscopic triangular inclined surfaces. The inner peripheral edge of the convex-concave structure 68b on the inner peripheral side and the outer peripheral edge of the convex-concave structure 68b on the outer peripheral side are formed with a microscopic barrack-shaped inclined surface.

Figure 85A:
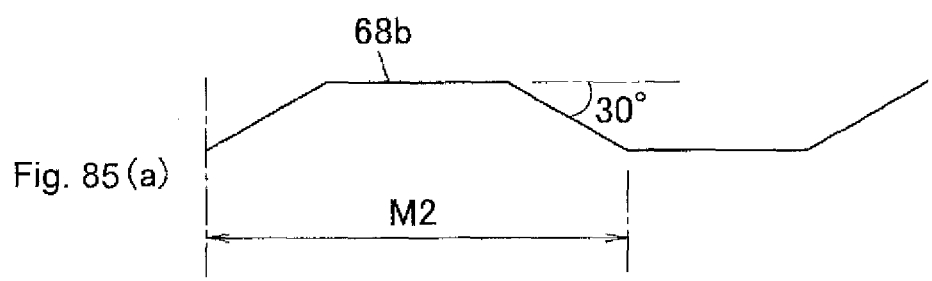
FIG. 85(a) is a view showing a cross-section taken along line g1-g1 along the light source direction of FIG. 84(a)
Figure 85B:
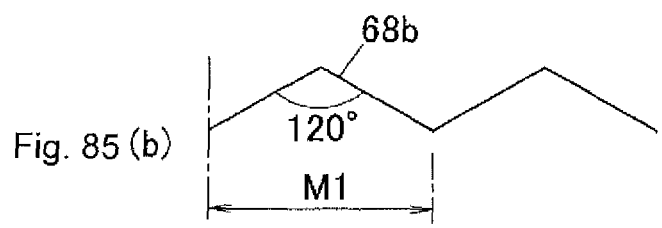
FIG. 85(b) is a view showing a cross-section taken along line g2-g2 along the direction orthogonal to the light source direction of FIG. 84(a).

FIG. 85(a) shows a cross-section taken along line g1-g1 along the light source direction of FIG. 84(a), and FIG. 85(b) shows a cross-section taken along line g2-g2 along the direction orthogonal to the light source direction of FIG. 84(a). The vertex angle at the cross-section taken along line g2-g2 of the directivity converting pattern 68 is 120°, and the inclination angle of the inclined plane at the cross-section along line g1-g1 is 30°. The ratio (aspect ratio) of the length M1 of the convex-concave structure 68b in the direction orthogonal to the light source direction and the length M2 of the convex-concave structure 68b in the light source direction is, $$M1/M2 = 0.5.$$

The efficiency improvement effect is recognized if the aspect ratio is smaller than or equal to 0.5, and thus the efficiency improvement effect is obtained in this embodiment.

Figure 86:
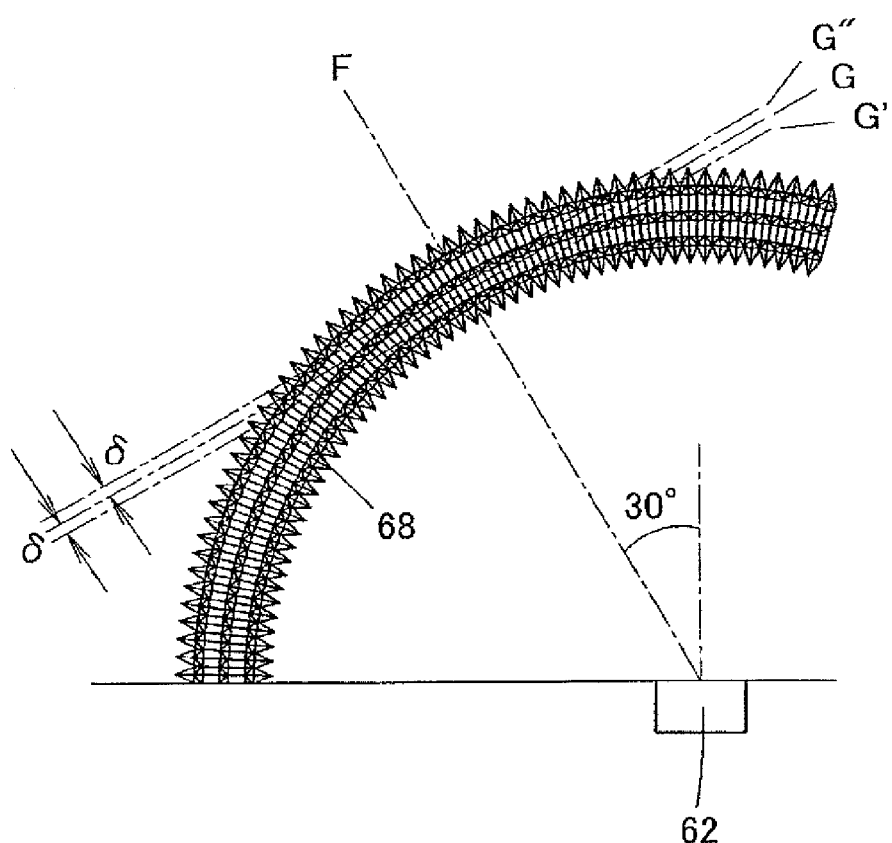
FIG. 86 is a plan view showing one part of the directivity converting pattern of the eighth embodiment.
Figure 87:
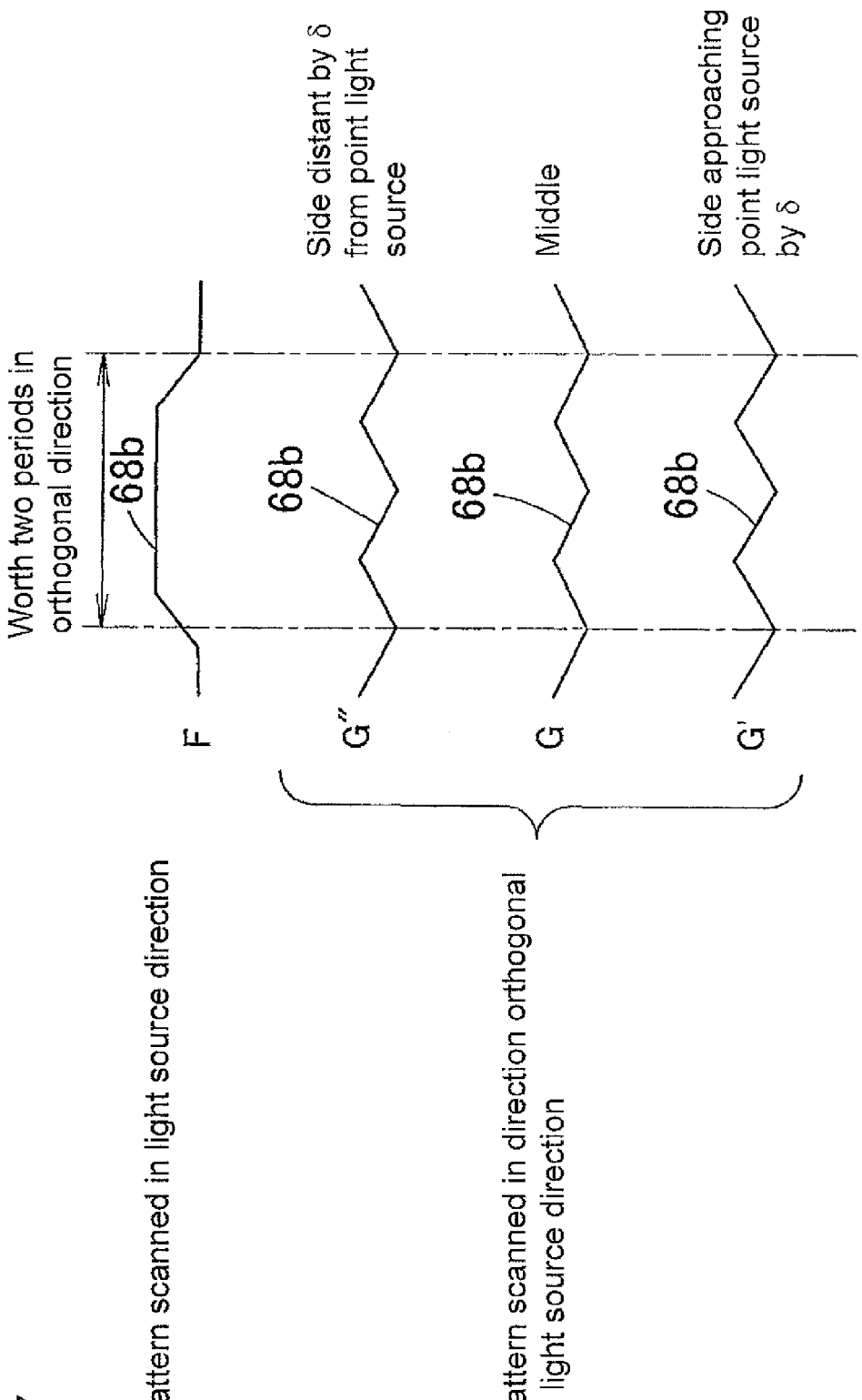
FIG. 87 is a view showing a pattern shape when the directivity converting pattern of FIG. 86 is scanned along the scanning line F parallel to the light source direction and a pattern shape when scanned along the scanning lines G", G, G' in the direction orthogonal to the light source direction.

In FIG. 86, the convex-concave structure 68b is arranged in two rows on the inner peripheral side and the outer peripheral side in the arcuate region to form the directivity converting pattern 68. FIG. 87 shows a pattern shape when the convex-concave structure 68b is scanned in the light source direction F, and a pattern shape when scanned in the direction orthogonal to the light source direction F. The pattern along the scanning line G is a cross-section passing the middle in the light source direction, the pattern along the scanning line G" is a cross-section at the position shifted to the side distant from the point light source 62 by δ (50 μm) from the middle, and the pattern along the scanning line G' is a cross-section at the position shifted to the side approaching the point light source 62 by δ (50 μm) from the middle.

Obtaining the average inclination angle θx* when scanned in the light source direction from FIG. 87, Average inclination angle in light source direction F: 14.6°
is obtained. Obtaining the average inclination angle θy* when scanned in the direction orthogonal to the light source direction, Average inclination angle (middle) in direction G orthogonal to light source direction: 30.8°

Average inclination angle (50 μm to point light source side) in direction G' orthogonal to light source direction: 30.7°

Average inclination angle (50 μm to distant side) in direction G" orthogonal to light source direction: 28.4°.

The calculation of each average inclination angle is performed at a length of two periods in the direction orthogonal to the light source direction for the light source direction and for the direction orthogonal to the light source direction.

Therefore, in the direction orthogonal to the light source direction, 30.8°, which is the highest of the three values, is the average inclination angle in the direction orthogonal to the light source. In this case as well, the average inclination angle θy* in the direction orthogonal to the light source direction>average inclination angle θx* in the light source direction is satisfied.

Figure 88:
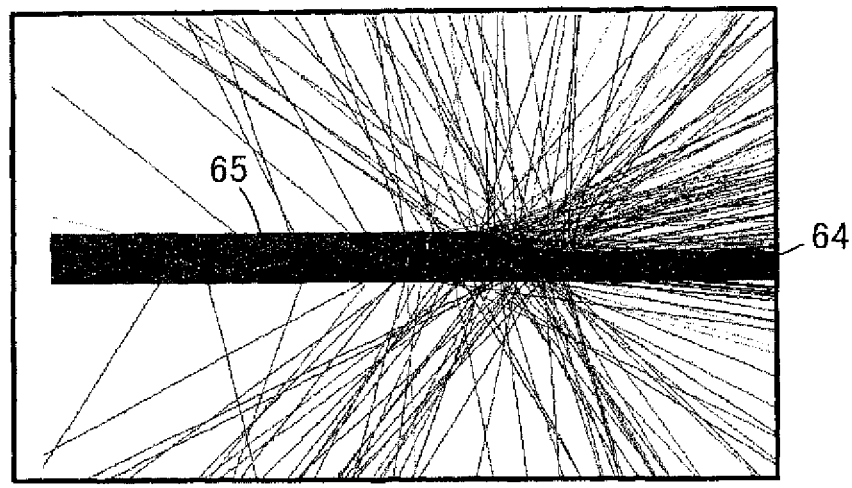
FIG. 88(a) is a view showing results obtained by simulating a behavior of light rays in the surface light source apparatus of FIGS. 82 and 83.
FIG. 88(b) is a view showing a result obtained by simulating a behavior of light rays in a comparative example in which a directivity converting pattern is not provided.
Figure 88:
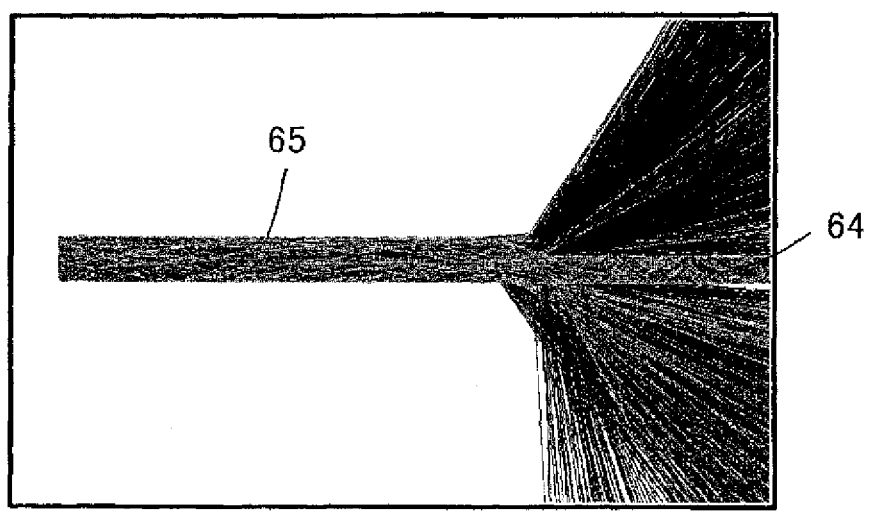

FIG. 88(*a*) is a view showing results of simulating a behavior of light rays in the surface light source apparatus 111 of FIGS. 82 and 83. FIG. 88(*b*) is a view showing the results of simulating the behavior of the light rays in a comparative example in which the inclined surface 67 is merely arranged and the directivity converting pattern is not provided on the front surface side nor the back surface side. Comparing FIGS. 88(*a*) and 88(*b*), it can be recognized that the leakage of light is significant in the comparative example of FIG. 88(*b*) but the leakage of light is small in the embodiment in which the directivity converting pattern 68 is arranged on the back surface.

Ninth Embodiment

Figure 89:
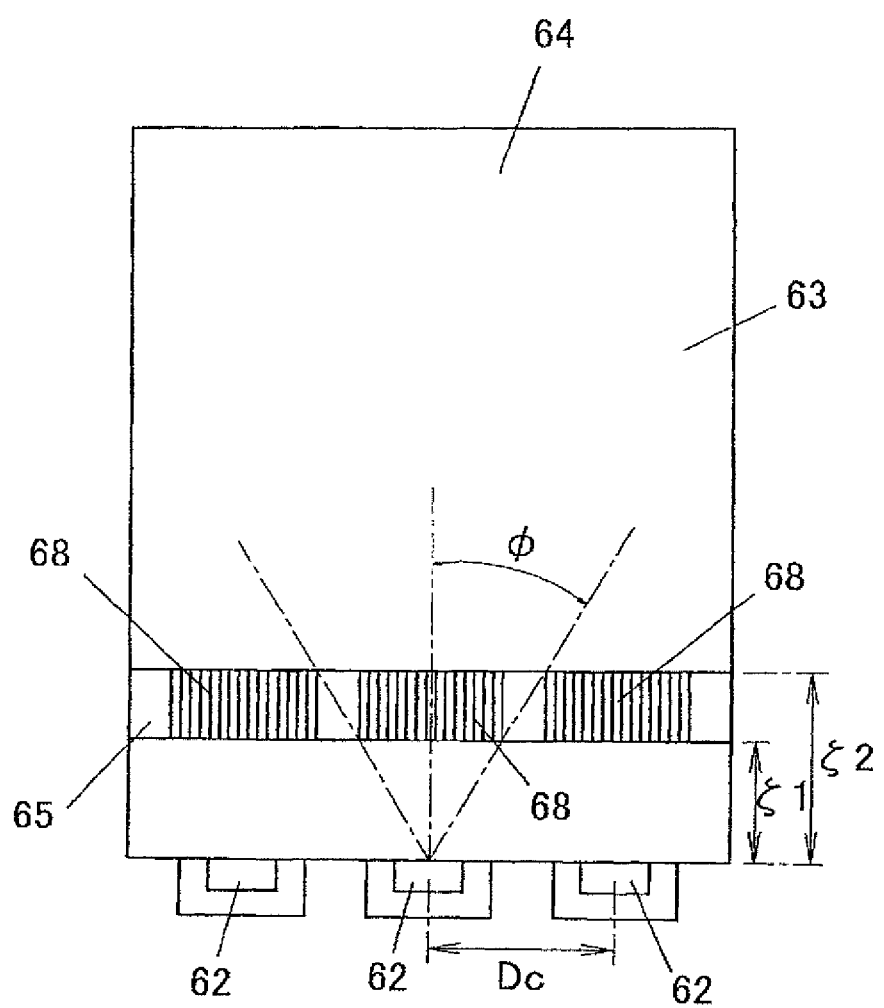
FIG. 89 is a plan view showing a surface light source apparatus according to a ninth embodiment of the present invention.

As shown in FIG. 89, if a plurality of point light sources 62 is used, the directivity converting pattern 68 is arranged in correspondence to each point light source 62 in the region on the front side thereof. However, if the adjacent point light sources 62 or the directivity converting patterns 68 come close and the light emitted from a certain point light source 62 enters the directivity converting pattern 68 positioned on the front side of the adjacent point light source 62, the light leaks out therefrom and tends to be the loss light. Therefore, an inter-center distance Dc between the point light sources 62 is desirably $$Dc \geq (\xi 1 + \xi 2) \times \tan \phi$$

in order to prevent this loss light. In this case, 2φ is a substantial expansion of the light emitted from the point light source 62, and is φ=30°, for example. Furthermore, ξ1 is a distance from the point light source 62 to the end on the side close to the point light source 62 of the region arranged with the directivity converting pattern 68, and ξ2 is a distance from the point light source 62 to the end on the side distant from the point light source 62 of the region arranged with the directivity converting pattern 68. The directivity converting pattern 68 can be appropriately designed from the aspect of easiness in forming the shape and the efficiency to be obtained.

Figure 90:
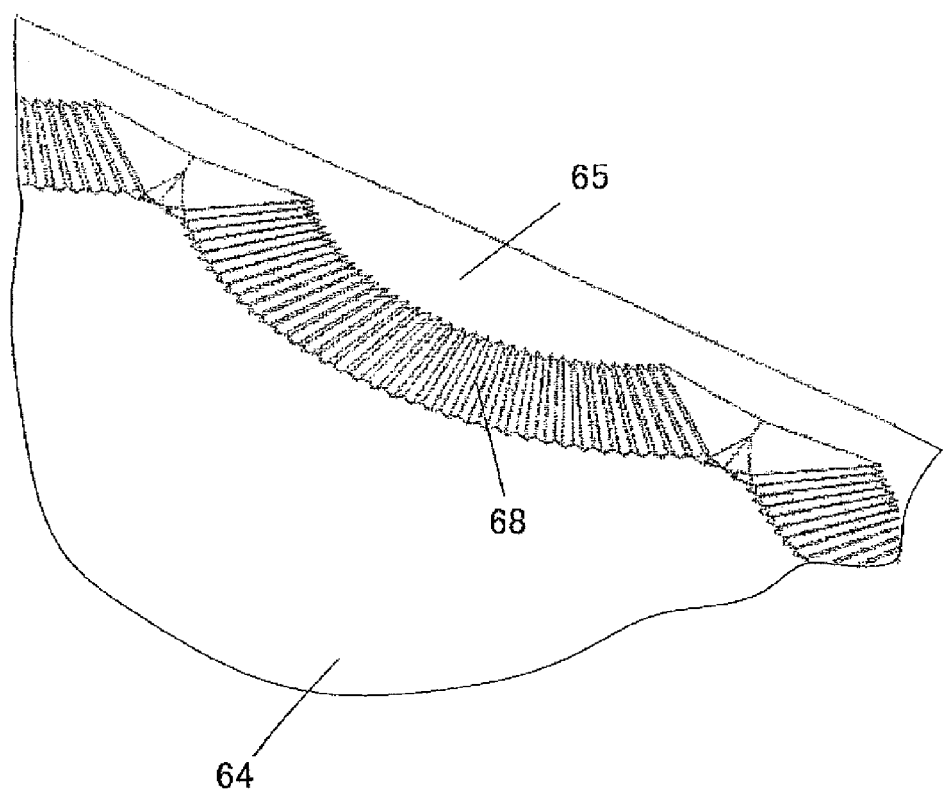
FIG. 90 is a perspective view showing one part of a directivity converting pattern according to a variant of the ninth embodiment.

In FIG. 90, a plurality of point light sources 62 are lined and the directivity converting pattern 68 is arranged in a substantially arcuate shape at the front side of each point light source 62. The light entered from the light incident end face 66 of the light introducing section 65 has conical directivity characteristics, and thus the expansion of the light entered from the light incident end face 66 is smaller than 180° when seen from a direction perpendicular to the light guide plate 63. Thus, when arranging the directivity converting pattern 68 to an arcuate shape as well, the directivity converting pattern 68 does not need to be arranged in the range of 180°, and merely needs to be arranged in a range narrower than 180°. However, the directivity converting patterns 68 of the adjacent regions may not overlap each other.

Tenth Embodiment

Figure 91:
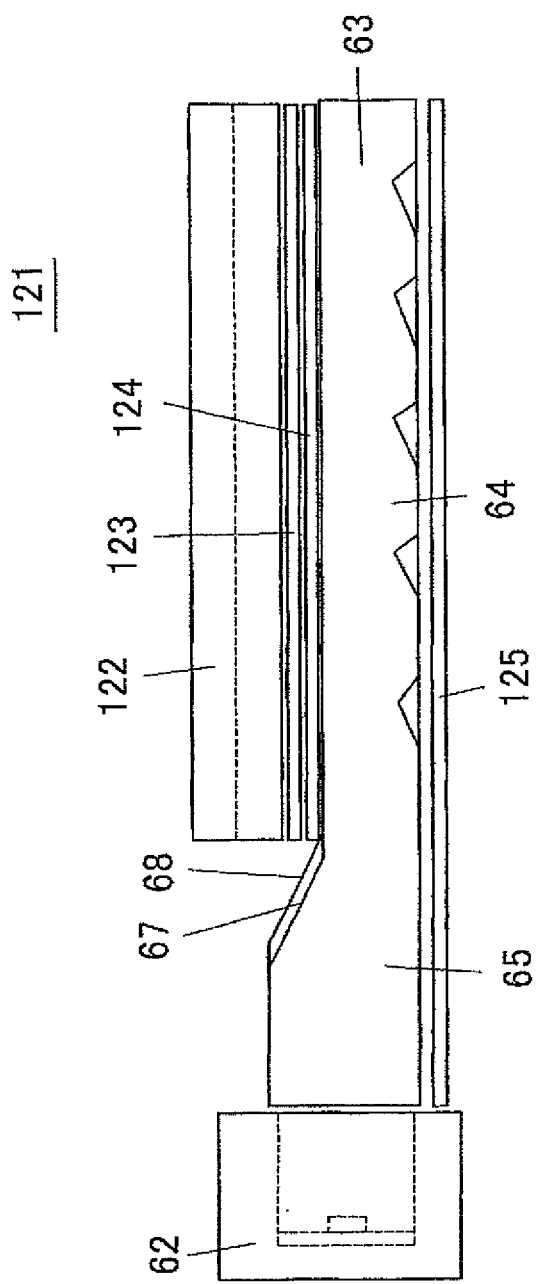
FIG. 91 is a schematic cross-sectional view showing a liquid crystal display device according to a tenth embodiment.

FIG. 91 is a schematic cross-sectional view of a liquid crystal display device 121 using the surface light source apparatus of the present invention (e.g., surface light source apparatus 61 of first embodiment). The liquid crystal display device 121 has the diffusion plate 124, the prism sheet 123, and the liquid crystal panel 122 overlapped facing the light outputting surface side of the light guide plate 63, and the reflection sheet 125 arranged on the back surface side of the light guide plate 63. According to such a liquid crystal display device 121, the characteristics of the surface light source apparatus of the present invention can be fulfilled, the light usage efficiency of the liquid crystal display device 121 can be enhanced so that the screen is more easily viewed, and the thickness of the liquid crystal display device 121 can be reduced.

The invention claimed is:
1. A light guide plate comprising:
a light incident surface configured to be arranged facing a point light source for introducing light from the point light source;
a light outputting surface that outputs the light to an outside of the light guide plate;
a light introducing section for confining the light from the point light source entered from the light incident surface; and
a light guide plate main body having a thickness smaller than a maximum thickness of the light introducing section and being arranged to be continuous with the light introducing section, for outputting the confined light to the outside of the light guide plate from the light outputting surface by a light outputting element,
wherein the light introducing section has an inclined surface that is inclined toward an end of a surface of the light guide plate main body from a surface of a portion having a greater thickness than the light guide plate main body, on a surface on the light outputting side of the light guide plate or on an opposite surface thereof, and
wherein the light guide plate further comprises a directivity converting pattern, for converting a directivity expansion in a thickness direction of the light guide plate of the light entered to the light introducing section to directivity characteristics tilted toward a direction parallel to a surface direction of the light guide plate, on the surface on the light outputting side or on the opposite surface thereof.

2. The light guide plate according to claim 1, wherein the light guide plate has the directivity converting pattern, which is configured by a plurality of planes radially extending with a vicinity of the point light source as a center when seen from a direction perpendicular to the light outputting surface of the light guide plate, on the surface on the light outputting side or on the opposite surface thereof.

3. The light guide plate according to claim 1, wherein an average inclination angle of a cross-section of the directivity converting pattern cut along a plane, which includes a line radially extending with the point light source as a center and which is parallel to the thickness direction of the light guide plate, is smaller than an average inclination angle of a cross-section of the directivity converting pattern cut along a plane, which is orthogonal to the plane and which is parallel to the thickness direction of the light guide plate.

4. The light guide plate according to claim 1, wherein the directivity converting pattern is formed by a convex-concave structure including a concave portion or a convex portion; and the number of the concave portion or the convex portion passed when scanning a length from a certain point in a region formed with the convex-concave structure in a direction of a light source is less than the number of the concave portion or the convex portion passed when scanning the same length in a direction orthogonal to the scanning direction.

5. The light guide plate according to claim 1, wherein the directivity converting pattern is formed by arranging a concave portion or a convex portion extending in one direction in at least two or more extending directions; and the concave portion or the convex portion have the respective extending direction within ±°20 with respect to a direction connecting the respective position and the point light source.

6. The light guide plate according to claim 1, wherein the directivity converting pattern is formed by repeating a concave portion or a convex portion extending in one direction; and when a region formed with directivity converting pattern is seen from the point light source, an expansion of the region is smaller than or equal to 80°.

7. The light guide plate according to claim 1, wherein the directivity converting pattern is configured by a plurality of V-shaped groove structures.

8. The light guide plate according to claim 1, wherein the directivity converting pattern is formed in an arcuate region when seen from a direction perpendicular to the light outputting surface of the light guide plate.

9. The light guide plate according to claim 1, wherein the directivity converting pattern is arranged in at least one part of the inclined surface formed in the light introducing section.

10. The light guide plate according to claim 1, wherein the directivity converting pattern is arranged in at least one part of a merged region of the light introducing section and an adjacent region of the light guide plate main body adjacent to the light introducing section at a surface opposite to the surface formed with the inclined surface of the light guide plate.

11. The light guide plate apparatus according to claim 1, wherein the directivity converting pattern is arranged in a region on a side close to the point light source than a position where the light totally reflected by the inclined surface is totally reflected for a second time at a surface on an opposite side of the light outputting surface at a surface opposite to the surface formed with the inclined surface of the light guide plate.

12. The light guide plate according to claim 1, wherein the directivity converting pattern is formed on a surface opposite to the surface formed with the inclined surface of the light guide plate; and the directivity converting pattern is arranged on a side close to the point light source than a position defined at a distance $D=(3\cdot t)/\tan\theta$ from a position facing an edge on the light guide plate main body side of the inclined surface toward an interior of the light guide plate main body, where t is the thickness of the light guide main body and $\theta$ is the inclination angle of the inclined surface.

13. The light guide plate according to claim 7, wherein each of the V-shaped groove structures configuring the directivity converting pattern forms an angle of greater than or equal to 100° and smaller than or equal to 140°.

14. The light guide plate according to claim 1, wherein an aspect ratio in a vertical direction and a horizontal direction in plan view of a concave portion or convex portion configuring the directivity converting pattern is smaller than or equal to 0.5.

15. A liquid crystal display comprising the light guide plate according to claim 1, and a liquid crystal panel.

* * * * *